(12) United States Patent
Wilkinson et al.

(10) Patent No.: US 10,839,341 B2
(45) Date of Patent: Nov. 17, 2020

(54) SYSTEMS AND METHODS FOR RECEIVING RETAIL PRODUCTS AT A DELIVERY DESTINATION

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 288 days.

(21) Appl. No.: 15/952,494

(22) Filed: Apr. 13, 2018

(65) Prior Publication Data

US 2018/0300677 A1 Oct. 18, 2018

Related U.S. Application Data

(60) Provisional application No. 62/515,675, filed on Jun. 6, 2017, provisional application No. 62/485,045, filed on Apr. 13, 2017.

(51) Int. Cl.
  *G06Q 10/08* (2012.01)
  *G07C 9/00* (2020.01)
(52) U.S. Cl.
  CPC ..... *G06Q 10/0836* (2013.01); *G07C 9/00896* (2013.01); *G07C 2009/0092* (2013.01)
(58) Field of Classification Search
  None
  See application file for complete search history.

(56) References Cited

U.S. PATENT DOCUMENTS

| | | |
|---|---|---|
| 6,240,362 B1 | 5/2001 | Gaspard, II |
| 6,385,537 B2 | 5/2002 | Gaspard, II |
| 6,411,897 B1 | 6/2002 | Gaspard, II |

(Continued)

FOREIGN PATENT DOCUMENTS

| | | |
|---|---|---|
| CN | 106781083 | 5/2017 |
| WO | 2000070481 | 11/2000 |

(Continued)

OTHER PUBLICATIONS

U.S. Appl. No. 15/487,538, dated Apr. 14, 2017, Wilkinson.

(Continued)

*Primary Examiner* — Eric W Golightly
(74) *Attorney, Agent, or Firm* — Fitch, Even, Tabin & Flannery LLP

(57) ABSTRACT

In some embodiments, apparatuses and methods are provided herein useful to receiving retail products at a delivery destination. In some embodiments, there is provided a system for receiving retail products including a housing; a retail product delivery locker formed within the housing; a cleaning system configured to: initiate a first cleaning based on a default cleaning process; and initiate a second cleaning based on a first level-up cleaning process in response to receiving a start-clean signal; a first sensor; a second sensor; and a control circuit configured to: receive a need-clean request from a user at a first time; receive first data indicating an opening of the retail product delivery locker; receive second data indicating at least one compartment is empty; and provide a start-clean signal to the cleaning system in response to the receipt of the first and second data and the need-clean request from the user.

14 Claims, 20 Drawing Sheets

(56) References Cited

U.S. PATENT DOCUMENTS

| | | |
|---|---|---|
| 6,482,358 B1 | 11/2002 | Kelsch |
| 6,806,807 B2 | 10/2004 | Cayne |
| 7,113,071 B2 | 9/2006 | Cayne |
| 7,251,621 B1 | 7/2007 | Weng |
| 7,257,552 B1 | 8/2007 | Franco |
| 7,366,686 B2 | 4/2008 | Azuma |
| 7,840,427 B2 | 11/2010 | O'Sullivan |
| 7,945,469 B2 | 5/2011 | Cohen |
| 7,945,470 B1 | 5/2011 | Cohen |
| 7,976,777 B2 | 7/2011 | Gutman |
| 8,160,972 B1 | 4/2012 | Tannenbaum |
| 8,244,594 B2 | 8/2012 | Barron |
| 8,386,285 B2 | 2/2013 | Chen |
| 8,554,694 B1 | 10/2013 | Ward |
| 9,066,206 B2 | 6/2015 | Lin |
| 9,103,805 B2 | 8/2015 | Gettings |
| 9,202,191 B2 | 12/2015 | Bowen |
| 9,230,292 B2 | 1/2016 | Amin |
| 9,269,103 B1 | 2/2016 | Kumar |
| 9,305,310 B2 | 4/2016 | Radhakrishnan |
| 9,378,479 B2 | 6/2016 | Seifen |
| 9,459,622 B2 | 10/2016 | Abhyanker |
| 9,639,908 B1 | 5/2017 | Reiss |
| 9,718,397 B2 | 8/2017 | Kalanick |
| 9,721,224 B2 | 8/2017 | Waris |
| 9,778,057 B2 | 10/2017 | O'Mahony |
| 9,792,574 B2 | 10/2017 | Lord |
| 9,805,536 B2 | 10/2017 | Lutnick |
| 9,811,838 B1 | 11/2017 | Daire |
| 9,852,551 B2 | 12/2017 | Brinig |
| 9,902,310 B2 | 2/2018 | Fournier |
| 9,904,900 B2 | 2/2018 | Cao |
| 9,928,540 B1 | 3/2018 | Gerard |
| 9,934,530 B1 | 4/2018 | Iacono |
| 2001/0014868 A1 | 8/2001 | Herz |
| 2002/0103724 A1 | 8/2002 | Huxter |
| 2002/0174025 A1 | 11/2002 | Hind |
| 2003/0040944 A1 | 2/2003 | Hileman |
| 2003/0046173 A1 | 3/2003 | Benjier |
| 2003/0065520 A1 | 4/2003 | Jutzi |
| 2003/0126023 A1 | 7/2003 | Crampton |
| 2003/0154135 A1 | 8/2003 | Covington |
| 2005/0189414 A1 | 9/2005 | Fano |
| 2006/0026030 A1 | 2/2006 | Jacobs |
| 2006/0175352 A1 | 8/2006 | Emmendorfer |
| 2007/0088628 A1 | 4/2007 | Hopson |
| 2007/0192111 A1 | 8/2007 | Chasen |
| 2007/0244741 A1 | 10/2007 | Blume |
| 2008/0047282 A1 | 2/2008 | Bodin |
| 2009/0234712 A1 | 9/2009 | Kolawa |
| 2010/0253519 A1 | 10/2010 | Brackmann |
| 2011/0055046 A1 | 3/2011 | Bowen |
| 2011/0059693 A1 | 3/2011 | O'Sullivan |
| 2011/0213661 A1 | 9/2011 | Milana |
| 2012/0030133 A1 | 2/2012 | Rademaker |
| 2012/0060119 A1 | 3/2012 | Aravamudan |
| 2012/0264672 A1 | 10/2012 | Bastigkeit |
| 2013/0073389 A1 | 3/2013 | Heath |
| 2013/0091146 A1 | 4/2013 | Stanger |
| 2013/0185866 A1 | 7/2013 | Cheung |
| 2013/0311324 A1 | 11/2013 | Stoll |
| 2014/0058775 A1 | 2/2014 | Siig |
| 2014/0058794 A1 | 2/2014 | Malov |
| 2014/0058902 A1 | 2/2014 | Taylor |
| 2014/0122228 A1 | 5/2014 | Wical |
| 2014/0149160 A1 | 5/2014 | Argue |
| 2014/0190519 A1 | 7/2014 | Simundic |
| 2014/0214590 A1 | 7/2014 | Argue |
| 2014/0236856 A1 | 8/2014 | Baykhurazov |
| 2014/0249966 A1 | 9/2014 | Zaragoza |
| 2014/0275267 A1 | 9/2014 | Beug-Deeb |
| 2014/0278634 A1 | 9/2014 | Horvitz |
| 2014/0278850 A1 | 9/2014 | Boccuzzi, Jr. |
| 2014/0278851 A1 | 9/2014 | Kopanati |
| 2014/0278875 A1 | 9/2014 | Ganesh |
| 2014/0279208 A1 | 9/2014 | Nickitas |
| 2015/0006005 A1 | 1/2015 | Yu |
| 2015/0032847 A1 | 1/2015 | Van Coppenolle |
| 2015/0081581 A1 | 3/2015 | Gishen |
| 2015/0106291 A1 | 4/2015 | Robinson |
| 2015/0130617 A1 | 5/2015 | Triener |
| 2015/0142594 A1 | 5/2015 | Lutnick |
| 2015/0149443 A1 | 5/2015 | Aravamudan |
| 2015/0161563 A1 | 6/2015 | Mehrabi |
| 2015/0179036 A1 | 6/2015 | Heine |
| 2015/0186840 A1 | 7/2015 | Torres |
| 2015/0199632 A1 | 7/2015 | Chander |
| 2015/0206093 A1 | 7/2015 | Trew |
| 2015/0220979 A1 | 8/2015 | Ouimet |
| 2015/0227890 A1 | 8/2015 | Bednarek |
| 2015/0242753 A1 | 8/2015 | Yarlagadda |
| 2015/0242829 A1 | 8/2015 | Bhaskaran |
| 2015/0278908 A1 | 10/2015 | Nice |
| 2015/0339625 A1 | 11/2015 | Agasti |
| 2015/0347961 A1 | 12/2015 | Gillen |
| 2015/0348173 A1 | 12/2015 | Gillen |
| 2015/0363843 A1 | 12/2015 | Loppatto |
| 2016/0008859 A1 | 1/2016 | Hoxbroe |
| 2016/0012337 A1 | 1/2016 | Kaye |
| 2016/0019669 A1 | 1/2016 | Gopalakrishnan |
| 2016/0048804 A1 | 2/2016 | Paul |
| 2016/0058181 A1 | 3/2016 | Han |
| 2016/0071056 A1 | 3/2016 | Ellison |
| 2016/0078394 A1 | 3/2016 | Fuldner |
| 2016/0086128 A1 | 3/2016 | Geiger |
| 2016/0104112 A1 | 4/2016 | Gorlin |
| 2016/0104113 A1 | 4/2016 | Gorlin |
| 2016/0155072 A1 | 6/2016 | Prodromidis |
| 2016/0171539 A1 | 6/2016 | Ganduri |
| 2016/0171866 A1 | 6/2016 | Dupasquier |
| 2016/0189098 A1 | 6/2016 | Beaurepaire |
| 2016/0195404 A1 | 7/2016 | Prasad |
| 2016/0225115 A1 | 8/2016 | Levy |
| 2016/0239857 A1 | 8/2016 | Milton |
| 2016/0328678 A1 | 11/2016 | Gillen |
| 2016/0345869 A1 | 12/2016 | Rishi |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2016/0379167 A1 | 12/2016 | Raman |
| 2017/0032341 A1 | 2/2017 | Johnsrud |
| 2017/0083862 A1 | 3/2017 | Loubriel |
| 2017/0089710 A1 | 3/2017 | Slusar |
| 2017/0091891 A1 | 3/2017 | Van Der Berg |
| 2017/0124510 A1 | 5/2017 | Caterino |
| 2017/0140326 A1 | 5/2017 | Rhyu |
| 2017/0300856 A1 | 10/2017 | Wilkinson |
| 2017/0300936 A1 | 10/2017 | Wilkinson |
| 2017/0300944 A1 | 10/2017 | Wilkinson |
| 2017/0300946 A1 | 10/2017 | Wilkinson |
| 2017/0300956 A1 | 10/2017 | Cantrell |
| 2017/0300992 A1 | 10/2017 | Wilkinson |
| 2017/0300999 A1 | 10/2017 | Wilkinson |
| 2017/0301000 A1 | 10/2017 | Morgan |
| 2017/0301001 A1 | 10/2017 | Wilkinson |
| 2017/0301002 A1 | 10/2017 | Wilkinson |
| 2017/0301008 A1 | 10/2017 | Houdek-Heis |
| 2017/0310770 A1 | 10/2017 | Samaan |
| 2017/0345033 A1 | 11/2017 | Wilkinson |
| 2017/0351994 A1 | 12/2017 | Waris |
| 2017/0364860 A1 | 12/2017 | Wilkinson |
| 2017/0364925 A1 | 12/2017 | Wilkinson |
| 2017/0364962 A1 | 12/2017 | Wilkinson |
| 2018/0005177 A1 | 1/2018 | Wilkinson |
| 2018/0025365 A1 | 1/2018 | Wilkinson |
| 2018/0040044 A1 | 2/2018 | Mattingly |
| 2018/0053240 A1 | 2/2018 | Jones |
| 2018/0060943 A1 | 3/2018 | Mattingly |
| 2018/0082252 A1 | 3/2018 | Wilkinson |
| 2018/0096414 A1 | 4/2018 | Iacono |
| 2018/0107971 A1 | 4/2018 | Vukin |
| 2018/0108062 A1 | 4/2018 | McHale |
| 2018/0113431 A1 | 4/2018 | Wilkinson |

(56) References Cited

U.S. PATENT DOCUMENTS

| | | |
|---|---|---|
| 2018/0137461 A1 | 5/2018 | Wilkinson |
| 2018/0144397 A1 | 5/2018 | Wilkinson |
| 2018/0174101 A1 | 6/2018 | Mattingly |
| 2018/0174188 A1 | 6/2018 | Wilkinson |
| 2018/0174198 A1 | 6/2018 | Wilkinson |
| 2018/0174223 A1 | 6/2018 | Cantrell |
| 2018/0174224 A1 | 6/2018 | Wilkinson |
| 2018/0233014 A1 | 8/2018 | Wilkinson |
| 2018/0268357 A1 | 9/2018 | Cantrell |
| 2018/0285816 A1 | 10/2018 | Mattingly |
| 2018/0300788 A1 | 10/2018 | Mattingly |

FOREIGN PATENT DOCUMENTS

| | | |
|---|---|---|
| WO | 2001031545 | 5/2001 |
| WO | 2001078022 | 10/2001 |
| WO | 2003036573 | 5/2003 |
| WO | 2007134291 | 11/2007 |

OTHER PUBLICATIONS

U.S. Appl. No. 15/487,728, dated Apr. 14, 2017, Wilkinson.
U.S. Appl. No. 15/487,760, dated Apr. 14, 2017, Morgan.
U.S. Appl. No. 15/487,775, dated Apr. 14, 2017, Houdek-Heis.
U.S. Appl. No. 15/487,792, dated Apr. 14, 2017, Cantrell.
U.S. Appl. No. 15/487,826, dated Apr. 14, 2017, Wilkinson.
U.S. Appl. No. 15/487,882, dated Apr. 14, 2017, Wilkinson.
U.S. Appl. No. 15/487,894, dated Apr. 14, 2017, Wilkinson.
U.S. Appl. No. 15/488,004, dated Apr. 14, 2017, Wilkinson.
U.S. Appl. No. 15/488,015, dated Apr. 14, 2017, Wilkinson.
U.S. Appl. No. 15/488,107, dated Apr. 14, 2017, Wilkinson.
U.S. Appl. No. 15/606,602, dated May 26, 2017, Wilkinson.
U.S. Appl. No. 15/624,030, dated Jun. 15, 2017, Wilkinson.
U.S. Appl. No. 15/625,599, dated Jun. 16, 2017, Wilkinson.
U.S. Appl. No. 15/628,282, dated Jun. 20, 2017, Wilkinson.
U.S. Appl. No. 15/634,862, dated Jun. 27, 2017, Wilkinson.
U.S. Appl. No. 15/655,339, dated Jul. 20, 2017, Wilkinson.
U.S. Appl. No. 15/669,546, dated Aug. 4, 2017, Mattingly.
U.S. Appl. No. 15/678,608, dated Aug. 16, 2017, Jones.
U.S. Appl. No. 15/685,981, dated Aug. 24, 2017, Mattingly.
U.S. Appl. No. 15/704,878, dated Sep. 14, 2017, Wilkinson.
U.S. Appl. No. 15/752,509, dated Oct. 12, 2017, Vukin.
U.S. Appl. No. 15/782,555, dated Oct. 12, 2017, Mattingly.
U.S. Appl. No. 15/782,559, dated Oct. 12, 2017, Wilkinson.
U.S. Appl. No. 15/783,551, dated Oct. 13, 2017, Wilkinson.
U.S. Appl. No. 15/783,645, dated Oct. 13, 2017, Wilkinson.
U.S. Appl. No. 15/783,668, dated Oct. 13, 2017, McHale.
U.S. Appl. No. 15/783,787, dated Oct. 13, 2017, Cantrell.
U.S. Appl. No. 15/783,825, dated Oct. 13, 2017, Wilkinson.
U.S. Appl. No. 15/783,929, dated Oct. 13, 2017, Wilkinson.
U.S. Appl. No. 15/783,960, dated Oct. 13, 2017, Wilkinson.
U.S. Appl. No. 15/921,540, dated Mar. 14, 2018, Cantrell.
U.S. Appl. No. 15/939,788, dated Mar. 29, 2018, Mattingly.
U.S. Appl. No. 15/947,380, dated Apr. 6, 2018, Wilkinson.
U.S. Appl. No. 15/953,113, dated Apr. 13, 2018, Mattingly.
"Amazon Alexa;" Wikipedia; https://web.archive.org/web/20160926125220/https://en.wikipedia.org/wiki/Amazon_Alexa; Sep. 26, 2016; pp. 1-4.
"Amazon Dash Buttons;" Amazon; https://web.archive.org/web/20160623172354/https://www.amazon.com/Dash-Buttons/b?ie=UTF8&node=10667898011; Jun. 23, 2016; pp. 1-8.
"Amazon Dash;" Wikipedia; https://web.archive.org/web/20160310021300/https://en.wikipedia.org/wiki/Amazon_Dash; Mar. 10, 2016; pp. 1-2.
"Amazon Echo;" Amazon; https://web.archive.org/web/20160602024155/https://www.amazon.com/Amazon-Echo-Bluetooth-Speaker-with-WiFi-Alexa/dp/B00X4WHP5E; Jun. 2, 2016; pp. 1-10.
"Predicting Customer Needs with Forward Demand;" Blue Yonder; https://www.blueyonder.com/en/products/forward-demand.html; retrieved on Mar. 16, 2016; pp. 1-11.
Gustafson, Krystina; "The anti-Amazons: Two brands shaking up retail"; http://www.cnbc.com/2016/03/22/the-anti-amazons-two-brands-shaking-up-retail.html; Mar. 28, 2016; pp. 1-8.
Karim, Shah; "Seven Retail Megatrends for 2020;" Chain Store Age; http://www.chainstoreage.com/article/seven-retail-megatrends-2020; Feb. 22, 2015; pp. 1-3.
Kohan, Shelley E.; "5 Retail Trends for 2015;" RetailNext; https://retailnext.net/en/blog/retail-trends-2015/; Feb. 24, 2015; pp. 1-4.
Lu, Haiyun; "Recommendations Based on Purchase Patterns;" International Journal of Machine Learning and Computing; vol. 4, No. 6; Dec. 2014; pp. 501-504.
NEO4J; "Walmart uses Neo4j to optimize customer experience with personal recommendations"; http://info.neo4j.com/rs/neotechnology/images/neo4j-casestudy-walmart.pdf; available at least as early as Mar. 29, 2016; pp. 1-2.
PCT; App. No. PCT/US2018/027228; International Search Report and Written Opinion dated Jul. 20, 2018.
U.S. Appl. No. 15/488,004; Office Action dated Sep. 17, 2019; (pp. 1-22).
U.S. Appl. No. 15/488,004; Office Action dated Mar. 30, 2020.
Korosec, Kirsten; "Volvo's Solution for the Package Theft Epidemic: Your Car's Trunk"; http://fortune.com/2016/05/10/volvo-urb-it-delivery/; May 10, 2016; pp. 1-2.
Postmates; "Ride, Drive, Walk"; https://postmates.com/help; available at least as early as May 28, 2016; pp. 1-4.
Taskrabbit; "Shopping & Delivery"; https://web.archive.org/web/20160410212153/https://www.taskrabbit.com/m/shopping-delivery; available at least as early as Apr. 10, 2016; pp. 1-5.
Tylerdean; "Purchasing Goods from the United States"; https://shipsterusa.com/international-package-forwarding-blog; Jul. 1, 2013; pp. 1-2.
Zipments; "Delivery Your Way"; https://web.archive.org/web/20161003185919/http://zipments.ca/; available at least as early as Oct. 3, 2016; pp. 1-3.

SYSTEMS AND METHODS FOR RECEIVING RETAIL PRODUCTS AT A DELIVERY DESTINATION

CROSS-REFERENCE TO RELATED APPLICATION

This application claims the benefit of U.S. Provisional Application No. 62/515,675, filed Jun. 6, 2017, and U.S. Provisional Application No. 62/485,045, filed Apr. 13, 2017, all of which are incorporated herein by reference in their entirety.

TECHNICAL FIELD

This invention relates generally to receiving retail products at a delivery destination.

BACKGROUND

Retail products are delivered to customers in many different ways. Often, retail products are delivered to mailboxes and/or post office boxes. These retail products are generally non-perishable, dry products. There is a need to improve customer satisfaction in the delivery of retail products.

BRIEF DESCRIPTION OF THE DRAWINGS

Disclosed herein are embodiments of systems, apparatuses and methods pertaining to receiving retail products at a delivery destination. This description includes drawings, wherein.

Figure 1:
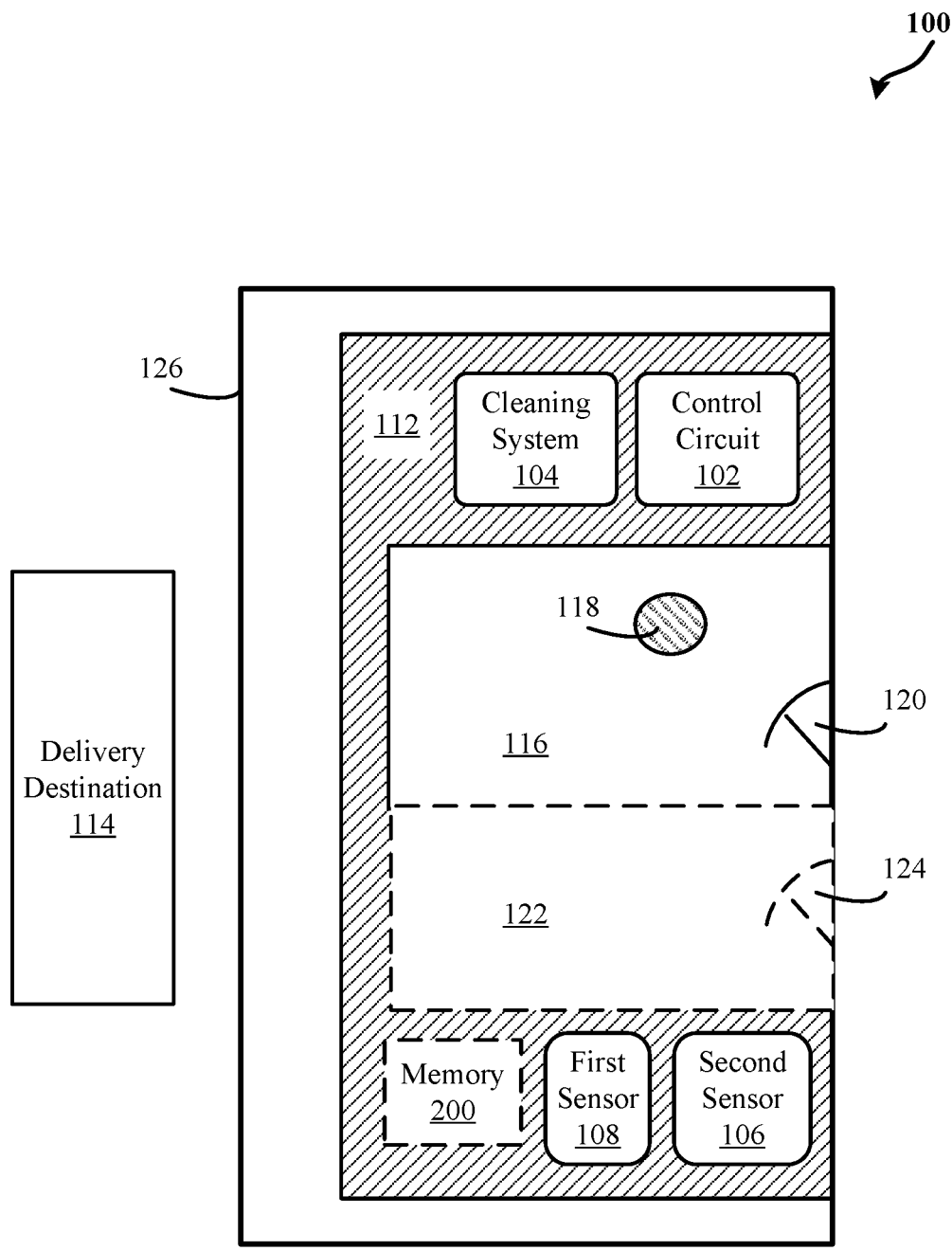
FIG. 1 illustrates a simplified block diagram of an exemplary system for receiving retail products at a delivery destination in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for receiving retail products. In some embodiments, a retail product delivery locker for receiving retail products at a delivery destination includes a housing and a retail product delivery locker formed within the housing. The retail product delivery locker may include at least one compartment configured to store at least one retail product delivered to a delivery destination. By one approach, the retail product delivery locker may include a cleaning system secured to the retail product delivery locker. In one configuration, the cleaning system may initiate a first cleaning of at least a portion of the at least one compartment of the retail product delivery locker. In such a configuration, the first cleaning may be based on a default cleaning process of a plurality of cleaning processes stored in a memory device of the retail product delivery locker. In another configuration, the cleaning system may initiate a second cleaning of at least the portion of the at least one compartment in response to receiving a start-clean signal. In such a configuration, the second cleaning may be based on a first level-up cleaning process of the plurality of cleaning process.

By another approach, the retail product delivery locker may include a first sensor secured to the retail product delivery locker. In one configuration, the first sensor may provide first data in response to an opening of the retail product delivery locker. By another approach, the retail product delivery locker may include a second sensor secured to the retail product delivery locker. In one configuration, the second sensor may provide second data when the at least one compartment is empty in response to the opening of the retail product delivery locker. By another approach, the retail product delivery locker may include a control circuit operably coupled to the first and second sensors and the cleaning system. In one configuration, the control circuit receives a need-clean request from a user of the retail product delivery locker at a first time. In another configuration, the control circuit may receive the first data indicating the opening of the retail product delivery locker. In another configuration, the control circuit may receive the second data indicating the at least one compartment is empty. In yet another configuration, the control circuit may provide the start-clean signal to the cleaning system in response to the receipt of the first and second data and the need-clean request from the user.

In some embodiments, a method for receiving retail products in a retail product delivery locker at a delivery destination includes receiving a need-clean request from a user of a retail product delivery locker at a first time. By one approach, the method may include receiving first data from a first sensor of the retail product delivery locker. In one configuration, the first data may indicate an opening of the retail product delivery locker. By another approach, the method may include receiving second data from a second sensor of the retail product delivery locker. In one configuration, the second data may indicate that at least one compartment of the retail product delivery locker is empty. By another approach, the method may include providing a start-clean signal to a cleaning system of the retail product delivery locker in response to the receiving of the first and second data and the need-clean request from the user. In one configuration, the start-clean signal may initiate a first cleaning of at least a portion of the at least one compartment. In such a configuration, the first cleaning may be based on a first level-up cleaning process of a plurality of cleaning processes accessed through a memory device of the retail product delivery locker.

As such, apparatuses, systems, and/or methods described herein provide for a retail product delivery locker that receives retail products at a delivery destination and automatically cleans at least one compartment, and further may clean the compartment according to a customer's standard of cleanliness. By one approach, the customer's standard of cleanliness may be learned by the retail product delivery locker over a period of time. In such an approach, the retail product delivery locker may create and/or provide a tiered-cleaning process that is customized for a customer. By another approach, the customer's standard of cleanliness may be customized by a customer. In such an approach, the customer may initially provide a tiered-cleaning process that the retail product delivery locker may use. By another approach, the retail product delivery locker may modify the initial customer-provided tiered cleaning process based on a customer's standard of cleanliness learned by the retail product delivery locker. For example, the control circuit may learn the customer's standard of cleanliness by correlating one or more need-clean requests previously received from a user (e.g., a customer), time(s) the one or more need-clean requests were received by the control circuit, a particular tiered cleaning process executed by the control circuit, products that were retrieved prior to receiving the one or more need-clean requests, types of cleaning products that were used in response to the one or more need-clean requests, feedbacks received from the user in response to a cleaning process applied, lack of user's feedback, lack of subsequent requests for cleaning, lack of request for a change in cleaning product or scent, user partiality information, among other possible options from which the control circuit may learn a customer's standard of cleanliness. As such, in some embodiments the retail product delivery locker provides at least one compartment that is automatically cleaned based on the customer's standard of cleanliness. Thus, by automatically cleaning the retail product delivery locker, the control circuit may free up time so that the customer may allocate the freed time for other activities.

Moreover, as used herein, the term retail product delivery locker refers to a delivery locker formed within a housing that includes and/or is secured to a fixture that is configured to be attached to a ground and/or at least a stationary object that does not move without damage to the object. Alternatively, or in addition to, the retail product delivery locker may be detachably secured to the fixture. By one approach, the fixture may be distinct from the retail product delivery locker. By another approach, the fixture may be integrated with the retail product delivery locker. In one configuration, the retail product delivery locker may receive one or more products ordered by one or more customers. As used herein, the term products may comprise products that are at least perishable products and/or non-perishable products. For example, the perishable products may comprise of eggs, milk, vegetables, meat, and/or other types of products subject to spoilage if not used and/or stored properly within a threshold of time. In another example, the non-perishable products may comprise of products that are generally not subject to spoilage.

Figure 2:
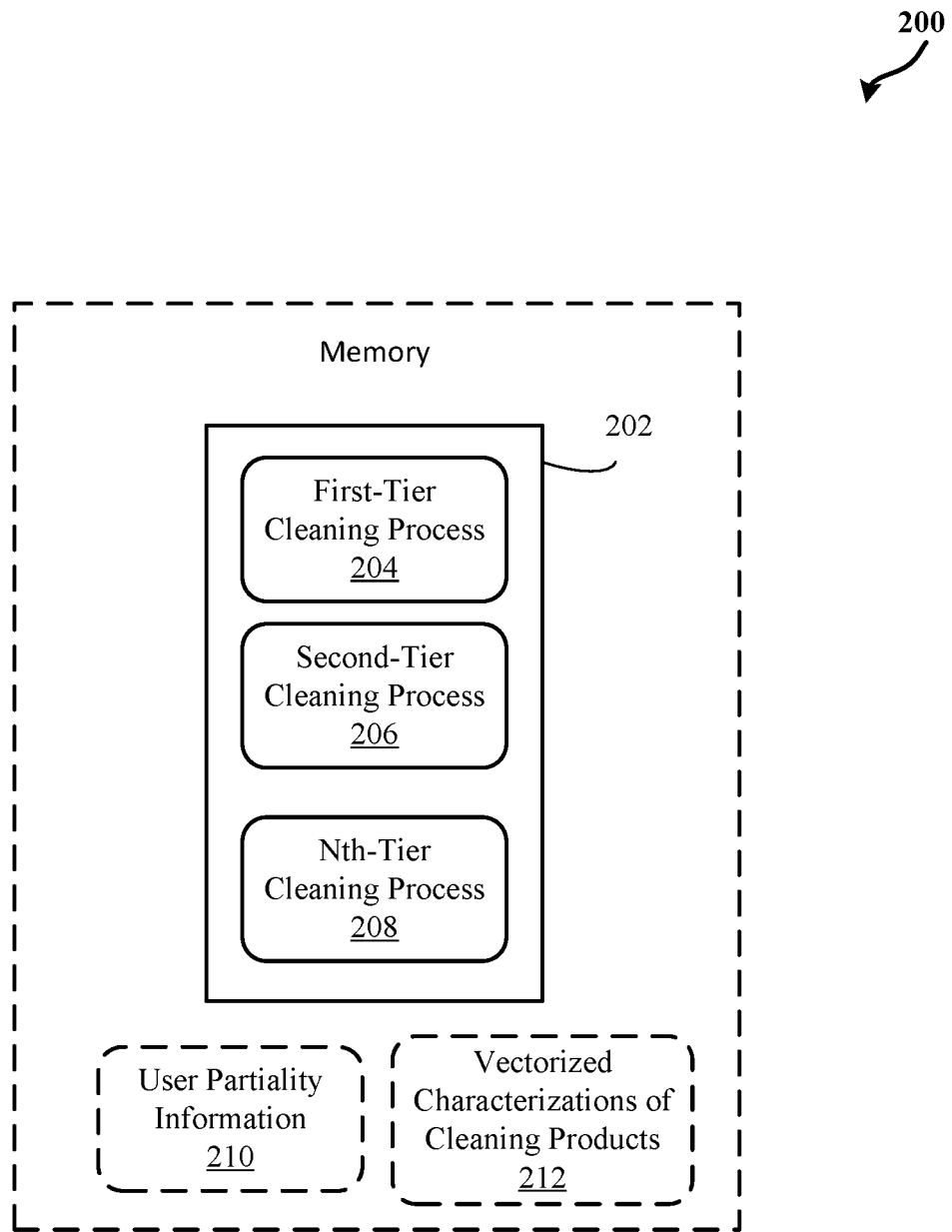
FIG. 2 is a simplified block diagram of a memory of an exemplary system for receiving retail products at a delivery destination in accordance with some embodiments.

To illustrate, FIGS. 1 through 23 are described below. FIG. 1 and FIG. 2 are concurrently described herein. FIG. 1 illustrates a simplified block diagram of an exemplary system 100 that receives retail products at a delivery destination, in accordance with some embodiments. FIG. 2 is a simplified block diagram of a memory 200 of the exemplary system 100 that receives retail products at a delivery destination, in accordance with some embodiments. The system 100 includes a housing 126 and a retail product delivery locker 112 that is formed within the housing 126. The system 100 may include a cleaning system 104 that is positioned relative to the retail product delivery locker 112. By one approach, the housing 126 may be secured to a fixture and/or integrated with the fixture. By another approach, the fixture may be stationary and associated with a delivery destination 114. In one configuration, the system 100 may include a first sensor 108 and a second sensor 106 that are also secured to the retail product delivery locker 112. In another configuration, the system 100 may include a control circuit 102 that is operably coupled to the first and second sensors 106, 108 and the cleaning system 104.

In some embodiments, the cleaning system 104 may include one or more sensors that may be used to detect a change in condition of at least one compartment 116, 122 and/or a presence of foreign material(s) (e.g., crumbs, dirt, debris, or the like) on the at least one compartment 116, 122. By one approach, the one or more sensors may comprise moisture sensor, temperature sensor, weight sensor, optical sensor, and/or other type of sensors capable of detecting the change and/or the foreign material. In one configuration, the cleaning system 104 may include a product cleaner dispenser having one or more sprayers that dispenses a cleaning agent. Alternatively or in addition to, the cleaning system 104 may include a microbial killing system (e.g., radiation generator, for example gamma rays, heater, ultraviolet (UV) light, etc.) to primarily clean and/or additionally clean the at least one compartment 116, 122. In another configuration, the cleaning system 104 may include one or more liners that may be replaceably secured on a surface of at least one of the at least one compartment 116, 122. By one approach, replacement of the one or more liners may be based on the one or more sensors detecting the change in condition of the at least one compartment 116, 122 and/or the presence of the foreign material(s), a predefined replacement schedule of a user and/or a manufacturer, types of retail products delivered to the retail product delivery locker 112, frequency of use of the retail product delivery locker 112, etc. In yet another configuration, the cleaning system 104 may include a scrubber that may be configured to scrub the foreign material(s) and/or wipe the foreign material(s) and/or liquid off the surface of the at least one compartment 116, 122. In one implementation, the control circuit 102 may operate and/or control one or more components of the cleaning system 104 to execute one of a plurality of cleaning processes 202. In another implementation, the cleaning system 104 may include a cleaning control circuit that may receive a start-clean signal from the control circuit 102. By one approach, in response to receiving the start-clean signal, the cleaning control circuit may operate and/or control the one or more components of the cleaning system 104 based on receipt of data indicating a particular one of the plurality of cleaning processes 202 from the control circuit 102. By another approach, the start-clean signal may comprise the particular one of the plurality of cleaning processes 202. As such, the cleaning control circuit may operate and/or control the one or more components of the cleaning system 104 in response to receiving the start-clean signal.

In some embodiments, the retail product delivery locker 112 comprises the at least one compartment 116, 122 that may store at least one retail product 118 that is delivered to the delivery destination 114. By one approach, the cleaning system 104 may initiate a first cleaning of at least a portion of the at least one compartment 116, 122 of the retail product delivery locker 112. The initiated cleaning may be one of multiple different tiered cleaning processes that are configured to provide different levels of cleaning, different durations of cleaning, use different cleaning agents, and/or other such differences. In one configuration, the first cleaning may be based on a default cleaning process of the plurality of cleaning processes 202 that are stored in a memory device 200 of the retail product delivery locker 112. By one approach, the control circuit 102 may associate the default cleaning process with one of the plurality of cleaning processes 202 stored in the memory device 200. By another approach, the default cleaning process may correspond to a cleaning process that is pre-programmed to be executed by the retail product delivery locker 112 to clean the at least one compartment 116, 122 when there is no other cleaning process available and/or determined by the retail product delivery locker 112, the control circuit 102, and/or a user (e.g., a customer) associated with the retail product delivery locker 112 and/or the delivery destination 114. In one configuration, absent a determination and/or a selection by the control circuit 102, and/or the user, the control circuit 102 of the retail product delivery locker 112 may automatically execute the default cleaning process to clean the at least one compartment 116, 122. In another configuration, when another cleaning process(es) of the plurality of cleaning processes 202 is/are available in the memory device 200, the control circuit 102 may identify and/or execute at least one of the plurality of cleaning processes 202 to clean the at least one compartment 116, 122. Alternatively or in addition to, the user may select at least one of the plurality of cleaning processes 202 to clean the at least one compartment 116, 122. By another approach, an initiation of the first cleaning may be in response to a receipt of an auto-clean signal by the cleaning system 104. In such an approach, the control circuit 102 may provide the auto-clean signal to the cleaning system 104 based on a prescheduled cleaning time, a threshold number of product deliveries, a threshold number of products received in the compartment, one or more types of products received in the compartment, other such factors, or combination of two or more of such factors. The prescheduled cleaning time may comprise a threshold of time after an initial application of power to the control circuit 102 and/or a user-determined cleaning time, a threshold time since a cleaning was performed, and/or other such conditions.

Moreover, the plurality of cleaning processes 202 may comprise one or more tier cleaning processes. By one approach, a first-tier cleaning process 204 may correspond to the default cleaning process. A second-tier cleaning process 206 provides a difference in cleaning. For example, the second-tier cleaning process may correspond to a higher tier cleaning process than the first-tier cleaning process. In other implementations, the second-tier cleaning process may provide a similar level of clean while applying a different cleaning agent (e.g., having one or more different cleaning chemicals, different scent, etc.). Similarly, an Nth-tier cleaning process 208 may correspond to a different (e.g., higher, lower, etc.) tier cleaning process than the second-tier cleaning process 206 and the first-tier cleaning process 204. For example, at least one difference of the second-tier cleaning process 206 from the first-tier cleaning process 204 may be that the second-tier cleaning process 206 is a first level-up cleaning process from the default cleaning process (e.g., the first-tier cleaning process 204 may correspond to the default cleaning process). By one approach, differences between each of the plurality of cleaning processes 202 may correspond to differences in at least one of: length of cleaning time, quantity of each of cleaning products used by the cleaning system 104, number of cleaning products available (e.g., accessible) for use by the cleaning system 104, type of cleaning agents associated with the cleaning products used by the cleaning system 104, particular combinations of the cleaning products used by the cleaning system 104, mode of cleaning (e.g., use of cleaning products, the microbial killing system, or the like), among other possible options and/or combinations that provide for a cleaner surface, compartment, and/or storage area. As such, a higher tier cleaning process may correspond to a more enhanced cleaning process than a lower tier cleaning process based on the differences between each of the plurality of cleaning processes 202. By one approach, the lower tier cleaning process may correspond to a previously used and/or applied cleaning process.

In an illustrative, non-limiting example, executing the default cleaning process by the control circuit 102 may indicate to the cleaning system 104 to use one or more natural cleaning solutions (e.g., a solution comprising a mixture of vinegar and water) to clean the at least one compartment 116, 122 for at least a first threshold period of time. By one approach, the plurality of cleaning processes 202 may comprise the default cleaning process. In another illustrative, non-limiting example, the first-tier cleaning process 204 may indicate to the cleaning system 104 to use the one or more natural cleaning solutions for at least a second threshold period of time that is different than the first threshold period of time. By one approach, the second threshold period of time may be greater than the first threshold period of time. In one configuration, the first-tier cleaning process 204 may correspond to the default cleaning process. In another illustrative, non-limiting example, the first-tier cleaning process 204 may indicate to the cleaning system 104 to use the one or more chemically based-cleaning solutions (e.g., Formula 409 Multi-Surface Cleaner). In yet another illustrative, non-limiting example, the second-tier cleaning process 206 may indicate to the cleaning system 104 to use the one or more chemically based-cleaning solutions (e.g., Formula 409 Multi-Surface Cleaner and Clorox Clean-Up). In yet another illustrative, non-limiting example, the first 204, second 206, and Nth-tier 208 cleaning processes may each separately indicate to the cleaning system 104 to use one or more combinations of possible differences between each of the plurality of cleaning processes 202 as described above. By one approach, a determination and/or a selection of the first 204, second 206, and/or Nth-tier 208 cleaning processes may be based, at least in part, on a user partiality information 210 stored in the memory device 200. The user partiality information 210 may be associated with the retail product delivery locker 112 and/or the delivery destination 114. Details regarding the user partiality information 210 are described below.

By one approach, the cleaning system 104 may initiate a second cleaning of at least a portion of the at least one compartment 116, 122 in response to receiving a start-clean signal. In one configuration, the second cleaning may be based on the first level-up cleaning process of the plurality of cleaning process 202 described above. By another approach, after retrieving the at least one retail product 118 from the at least one compartment 116, 122, the user associated with the retail product delivery locker 112 and/or the delivery destination 114 may determine that the at least one compartment 116, 122 may be dirty and/or soiled. In such an approach, the user may provide a need-clean request to the retail product delivery locker 112 to clean the at least one compartment 116, 122 at a first time through a user interface (e.g., display device, buttons, touchscreen, keyboard, etc.) of the retail product delivery locker 112 and/or a user electronic device operably coupled to the retail product delivery locker 112 via a communication network. The electronic device may comprise a tablet, a smartphone, laptop, a desktop, an iPad, and/or the like. For example, one or more software applications (APP) may be initiated by the user to gain access to a displayed graphical user interface that allows the user to establish wireless communication with the retail product delivery locker, and select one or more options, which may include one or more options to request a cleaning, specify a tier, request a type of cleaning, request a type of cleaning solution, etc. Moreover, the communication network may comprise one or more communication protocols over a wireless network, a wired network, a public network, a private network, or the like. By one approach, the control circuit 102 may request an input from the user through the display device whether the need-clean request is based on a previous cleaning of the at least one compartment 116, 122 that is unsatisfactory to the user. By one approach, when the need-clean request is not based on the unsatisfactory previous cleaning, the control circuit 102 may execute the same tiered cleaning process that was used in the previous cleaning.

By another approach, when the user's selection is based on the previous cleaning that is unsatisfactory to the user, the control circuit 102 may determine a higher tiered cleaning process than the lower tiered cleaning process that was used in the previous cleaning. In one scenario, the higher tiered cleaning process may correspond to the Nth-tier cleaning process 208. In another scenario, the lower tiered cleaning process that was used in the previous cleaning may correspond to the second-tier cleaning process 206. Thus, the cleaning system 104 may use the higher tiered cleaning process determined by the control circuit 102 to clean the at least one compartment 116, 122. By one approach, a determination of the higher tiered cleaning process by the control circuit 102 may be based on a previously executed lower tiered cleaning process, availability of cleaning time in between deliveries, remaining quantity of cleaning products available to the cleaning system 104, remaining number of cleaning products left and available for use by the cleaning system 104, type of cleaning agents associated with the cleanings products available for used by the cleaning system 104, and/or the like. Alternatively or in addition to, the control circuit 102 may determine the higher tiered cleaning process based on the user partiality information 210.

To illustrate, the control circuit 102 may maintain a history of cleaning processes relative to cleaning processes implemented in each compartment, and from that history determine which cleaning process was previously executed to clean the at least one compartment 116, 122. In one configuration, upon the determination, the control circuit 102 may identify a cleaning process that is a higher tiered cleaning process than the cleaning process that was previously executed by the control circuit 102. By one approach, the control circuit 102 may execute the identified higher tiered cleaning process to clean the at least one compartment 116, 122 at a subsequent time. In another non-limiting illustration, the control circuit 102 may determine a higher tiered cleaning process by identifying which one of the plurality of cleaning processes 202 is associated with a particular length of cleaning time that fits outside of one or more time periods of scheduled one or more deliveries for a particular time, day, month, and/or year. By one approach, the control circuit 102 may send a message to an electronic device associated with a delivery agent. The message may direct placement of the retail products to other compartment that is not scheduled to be cleaned and/or being cleaned. By another approach, the control circuit 102 may send another message to a user electronic device indicating which compartment stores the retail products. By another approach, the electronic device associated with the delivery agent may provide the scheduled one or more deliveries to the control circuit 102. In another non-limiting illustration, the control circuit 102 may identify cleaning products that are available for use by the cleaning system 104, quantity of each of the cleaning products, and/or type of cleaning agents associated with the cleaning products. By one approach, based on the identification of the cleaning products as described above, the control circuit 102 may compare and find within a threshold match between each of the identified cleaning products and each of the cleaning products associated with the plurality of cleaning processes 202. In such an approach, the control circuit 102 may determine which one of the plurality of cleaning processes 202 is within the threshold match and/or proximately one or more tier above the cleaning process that was previously executed. By one approach, the control circuit 102 may execute the determined one of the plurality of cleaning processes 202 to clean the at least one compartment 116, 122 at a subsequent time.

In one embodiment, prior to the delivery of the at least one retail product 118 in the at least one compartment 116, 122, the control circuit 102 may automatically execute a cleaning of the at least one compartment 116, 122 based on a previously used tiered cleaning process. In one configuration, the control circuit 102 may receive data corresponding to time periods of scheduled deliveries to the retail product delivery locker 112. By one approach, the previously used tiered cleaning process may correspond to a cleaning process that was previously applied by the cleaning system 104 and/or directed, instructed, and/or executed by the control circuit 102. Alternatively or in addition to, the customer may provide the need-clean request to the retail product delivery locker 112 to clean the at least one compartment 116, 122 based on the customer not being satisfied with the previously executed cleaning by the control circuit 102.

In one configuration, in response to the need-clean request by the customer, the control circuit 102 may receive the need-clean request. By one approach, the need-clean request may be communicated to the control circuit 102 through the display device. In one configuration, the display device may be associated with the retail product delivery locker 112 and/or an electronic device associated with the customer and operably coupled to the retail product delivery locker 112 via an electronic device interface and/or a communication network. In one scenario, the electronic device may comprise a tablet, a smartphone, laptop, a desktop, an iPad, and/or the like. In another scenario, the electronic device interface may comprise an application running in the electronic device. In yet another scenario, the communication network may comprise one or more communication protocols over a wireless network, a wired network, a public network, a private network, or the like.

In another configuration, the first sensor 108 may provide first data in response to an opening 120, 124 of the retail product delivery locker 112. In such configuration, the control circuit 102 may receive the first data indicating the opening 120, 124 of the retail product delivery locker 112. In another configuration, in response to the opening 120, 124 of the retail product delivery locker 112, the second sensor 106 may provide second data when the at least one compartment 116, 122 may be empty. In such configuration, the control circuit 102 may receive the second data indicating the at least one compartment 116, 122 is empty. By one approach, the second sensor 106 may comprise infrared sensor, radio frequency identifier, ultrasonic sensor, capacitive sensor, inductive sensor, optical sensor, photoelectric tripwire sensor, contact switches, motion sensor, among other type of sensors capable of detecting presence of an object in a space. In another configuration, the control circuit 102 may determine that the at least one compartment 116, 122 may not be empty based on the second data provided by the second sensor 106. Alternatively or in addition to, the second sensor 106 may periodically provide the second data to the control circuit 102. In response, the control circuit 102 may periodically determine whether the at least one compartment 116, 122 is empty based on the second data. In another configuration, the control circuit 102 may provide the start-clean signal to the cleaning system 104. In yet another configuration, the control circuit 102 may provide the start-clean signal to the cleaning system 104 in response to the receipt of the first and second data and the need-clean request from the customer by the control circuit 102. By one approach, the control circuit 102 may monitor and/or log usage of the retail product delivery locker 112 based on the first data received from the first sensor 108.

In an illustrative, non-limiting example, a user may have submitted an order for the at least one retail product 118, for example, a loaf of bread, a box of pens, and a whole pineapple, through a retailer's online website. A delivery agent may be tasked by the retailer to make a delivery to the delivery destination 114 that is associated with the retail product delivery locker 112 of the user. In one example, the delivery agent may comprise a person associated with the retailer, a crowd source person, a person associated with a third party delivery agent, among other persons that may be capable of making a delivery. By one approach, based on the order, geo-fence data associated with the retail product delivery locker 112 may be provided to a delivery agent electronic device by a main control circuit (not shown) and/or the control circuit 102. In one configuration, the geo-fence data may provide authentication for access and/or direction to the retail product delivery locker 112. In another configuration, upon determining a delivery schedule of the at least one retail product 118, the control circuit 102 may execute the first-tier cleaning process 204 through the cleaning system 104 to clean the at least one compartment 116, 122 in preparation of receiving the at least one retail product 118. As such, the at least one compartment 116, 122 is cleaned based on the first-tier cleaning process 204. In such a configuration, the first-tier cleaning process 204 may be a default cleaning process or a previously executed cleaning process that is stored in the memory device 200. By one approach, the first-tier cleaning process 204 may indicate to the cleaning system 104 to use, for example, Formula 409 Multi-Surface Cleaner to clean the at least one compartment 116, 122. By another approach, the first-tier cleaning process 204 may also indicate to the cleaning system 104 to clean for a first length of time.

Continuing the illustrative, non-limiting example above, when the delivery agent is within the threshold distance, the geo-fence data may provide authentication to the retail product delivery locker 112 to provide access to the at least one compartment 116, 122. By one approach, the delivery agent may place the at least one retail product 118 into the at least one compartment 116, 122. By another approach, the control circuit 102 may, based on product identifier data provided by a product reader (not shown) of the retail product delivery locker 112, determine that the at least one retail product 118 is available for pickup. In one configuration, the control circuit 102 may send a message to an electronic device of the user that the at least one retail product 118 is available for pickup. The user may then access the retail product delivery locker 112 to retrieve the at least one retail product 118. By one approach, after retrieving the at least one retail product 118, the user may that the compartment needs cleaning and/or the user may have determined that the previously executed cleaning process of the control circuit 102 may not be to the user's satisfaction. As such, the user may send a need-clean request to the retail product delivery locker 112 and/or the control circuit 102 to have the at least one compartment 116, 122 cleaned again. In one configuration, the memory device 200 may temporarily store the need-clean request.

By one approach, upon the user accessing the retail product delivery locker 112, the first sensor 108 may provide first data to the control circuit 102 indicating that the retail product delivery locker 112 has been opened. The control circuit 102 may receive that first data. In one configuration, subsequent to retrieval of the at least one retail product 118, the second sensor 106 may provide second data to the control circuit 102 indicating that the at least one compartment 116, 122 is empty. The control circuit 102 may receive the second data. In another configuration, the memory device 200 may temporarily store the first and second data. In yet another configuration, the control circuit 102 may determine that the first and second data and the need-clean request may have been received. By one approach, in response to the receipt of the first and second data and the need-clean request, the control circuit 102 may provide a start-clean signal to the cleaning system 104. By another approach, the cleaning system 104 may initiate a second cleaning of at least a portion of the at least one compartment 116, 122 in response to receiving the start-clean signal from the control circuit 102. In one configuration, the second cleaning may be based on a second level-up cleaning process of the plurality of cleaning process 202. For example, the second level-up cleaning process may indicate to the cleaning system 104 to use Formula 409 Multi-Surface Cleaner to clean the at least one compartment 116, 122 for a second length of time that is longer than the first length of time. By one approach, the second level-up cleaning process may correspond to the second-tier cleaning process 206. In such an approach, in response to the second cleaning, the control circuit 102 may assign the second-tier cleaning process 206 as a new default cleaning process. Thus, at a subsequent time the control circuit 102 may receive a second need-clean request from the user, the control circuit 102 may execute a higher tiered cleaning process than the lower tiered cleaning process last used by the cleaning system 104. Thus, each time a start-clean signal is provided to the cleaning system 104 and/or the user is unsatisfied with a previous cleaning of the at least one compartment 116, 122, a higher tiered cleaning process of the plurality of cleaning processes 202 is executed by the control circuit 102.

Subsequently, the control circuit 102 may assign the higher tiered cleaning process as a default cleaning process to be executed by the control circuit 102 at a subsequent cleaning of the at least one compartment 116, 122. For example, the control circuit 102 may execute the first-tier cleaning process 204 at a first time a need-clean request is received by the control circuit 102. By one approach, subsequent to the execution of the first-tier cleaning process 204, the control circuit 102 may assign the first-tier cleaning process 204 to be a default cleaning process. In one configuration, the default cleaning process may be a cleaning process executed by the control circuit 102 at a predetermined scheduled time, an initial cleaning of the retail product delivery locker 112, and/or anytime a cleaning is performed by the cleaning system 104 that is not initiated by the customer and/or not initiated by the customer due to unsatisfactory cleaning of the at least one compartment 116, 122. As such, a receipt of a subsequent need-clean request, at a second time, by the control circuit 102 may initiate the control circuit 102 to determine a higher tiered cleaning process than the first-tier cleaning process 204 based on the plurality of cleaning processes 202. By one approach, the control circuit 102 may determine that the higher tiered cleaning process may correspond to the second-tier cleaning process 206. Thus, the control circuit 102 may execute the second-tier cleaning process 206 to clean the at least one compartment 116, 122 through the cleaning system 104 at the second time. By another approach, the control circuit 102 may subsequently assign the second-tier cleaning process 206 to be a new default cleaning process.

Continuing the illustrative, non-limiting example above, prior to receiving a second delivery of another one of the at least one retail product 118, the control circuit 102 may automatically execute a cleaning of the at least one compartment 116, 122 through the cleaning system 104 using the second-tier cleaning process 206. Recall that the second-tier cleaning process 206 corresponds to the new default cleaning process, at the second time. As such, during a third time, the cleaning system 104 may initiate a third cleaning of at least a portion of the at least one compartment 116, 122 in response to receiving a second start-clean signal from the control circuit 102. By one approach, the third cleaning may be based on a third level-up cleaning process stored in the memory device 200 such that the third level-up cleaning process may provide a cleaning that is enhanced over the second level-up cleaning process described above. The third level-up cleaning process may correspond to the Nth-tier cleaning process 208. In one configuration, after the second delivery, the user may open the retail product delivery locker 112 to retrieve the at least one retail product 118, In response to the opening 120, 124 of the retail product delivery locker 112, the first sensor 108 may provide third data to the control circuit 102. In one configuration, the control circuit 102 may receive the third data indicating the opening 120, 124 of the retail product delivery locker 112. In another configuration, the second sensor 106 may provide fourth data to the control circuit 102 in response to the at least one compartment 116, 122 being empty resulting from the user retrieving the at least one retail product 118. As such, the control circuit 102 may provide the second start-clean signal to the cleaning system 104 in response to the receipt of the third and fourth data and the second need-clean request from the user. In a scenario where the at least one compartment 116, 122 is not empty, the second sensor 106 may provide fifth data to the control circuit 102. The control circuit 102 may determine based on the received fifth data that the at least one compartment 116, 122 is not empty. As such, the control circuit 102 may send a message to the user electronic device indicating that a cleaning of the at least one compartment 116, 122 may not be performed due to the at least one compartment 116, 122 not being empty.

By one approach, the control circuit 102 may delay for a period of time the third cleaning until the control circuit 102 determines based on data provided by the second sensor 106 that the at least one compartment 116, 122 is empty. Alternatively or in addition to, the control circuit 102 may determine a time to provide the start-clean signal to the cleaning system 104 based on a prediction of a period of time the retail product delivery locker 112 may be empty. By one approach, the prediction may be based on a pattern determined from a plurality of periods of time the retail product delivery locker 112 is empty. For example, the memory device 200 may store the plurality of periods of time the control circuit 102 determines that the at least one compartment 116, 122 is empty based on data provided by the second sensor 106. By one approach, the second sensor 106 may periodically send the data to the control circuit 102. In one configuration, the control circuit 102 may periodically determine whether the at least one compartment 116, 122 is empty based on the data. As such, the control circuit 102 may determine a pattern of when during the period of time the at least one compartment 116, 122 may be empty. Based on the pattern, the control circuit 102 may predict a particular time and/or a period of time the at least one compartment 116, 122 may be empty for cleaning.

In another illustrative, non-limiting example, one or more cleanings (e.g., the first cleaning, the second cleaning, the third cleaning, the fourth cleaning, among other successive cleanings the control circuit 102 may execute) of the at least one compartment 116, 122 may occur at times outside one or more time periods of at least one delivery. By one approach, the delivery agent may provide, via a delivery agent interface operated on an electronic device associated with the delivery agent, the one or more time periods to the retail product delivery locker 112 and/or the control circuit 102.

In some embodiment, the memory device 200 may store information including the partiality information of the user 210 in a form of a plurality of partiality vectors for the user. By one approach, each of the partiality vectors has at least one of a magnitude and an angle that corresponds to a magnitude of the user's belief in an amount of good that comes from an order associated with that partiality. In one configuration, the memory device 200 may store vectorized characterizations for each of a plurality of cleaning products 212 and processes. The plurality of cleaning products may comprise cleaning products that the cleaning system 104 may use to clean the retail product delivery locker 112. Alternatively and/or in addition to, the plurality of cleaning products may comprise cleaning products customized to the retail product delivery locker 112 and/or the user associated with the retail product delivery locker 112 and/or the delivery destination 114. For example, the plurality of partiality vectors for the user may comprise one or more of cleanliness, environmental friendliness, clean smell, cost, natural cleaning agents, non-animal testing or animal friendly, safety, among other types of partiality values that are associated with clean area, space, locker, container, and/or the like. Another example, the vectorized characterizations the plurality of cleaning products 212 may comprise cleaning effectiveness, environmental friendliness, natural cleaning agents, cost, recommendation by environmental group, and/or the like.

By one approach, alignment values between one of the plurality of partiality vectors 210 and each of a plurality of vectorized characterizations of a cleaning product of the plurality of cleaning products 212 may indicate an extent to which the cleaning product accords with the one of the plurality of partiality vectors. For example, a first level-up cleaning process used by the cleaning system 104 may be based on at least one of the plurality of partiality vectors of the user 210. By one approach, the first level-up cleaning process may correspond to one of the plurality of cleaning processes 202. In another example, the control circuit 102 may access the memory device 200 to identify the plurality of partiality vectors of the user 210. In one configuration, the control circuit 102 may access the memory device 200 to identify vectorized characterizations of the cleaning product 212 that are available for use with the cleaning system 104. By one approach, the cleaning system 104 and/or the retail product delivery locker 112 may initially be provided with cleaning products based on the user partiality information 210. In yet another configuration, the control circuit 102 may determine which cleaning products that may be used by the cleaning system 104 that have vectorized characterizations in alignment with the partiality vectors of the user. Thus, the control circuit 102 may determine a particular cleaning process of the plurality of cleaning processes 202 based on the determined cleaning products as described above. By one approach, the control circuit 102 may execute the particular cleaning process to clean the at least one compartment 116, 122 through the cleaning system 104. In yet another configuration, the control circuit 102 may send a replenishing request to a retailer's inventory system to replenish cleaning products available for use by the cleaning system 104 based on the user partiality information 210.

For example, the control circuit 102 may compare a particular one of the partiality vectors of the user 210 to each of a plurality of the vectorized characterizations 212 of the cleaning processes and/or cleaning products to thereby determine an alignment value of a particular one of the plurality of cleaning processes and/or products that reaches a threshold indicating alignment with the particular one of the partiality vectors. In such an approach, the control circuit 102 may determine the alignment value between the particular one of the partiality vectors and one of the plurality of the vectorized characterizations as a function of a vector dot product calculation. In one configuration, the alignment values may be calculated by the control circuit 102 based on the comparison of the particular one of the partiality vectors 210 with each of the plurality of the vectorized characterizations 212.

In an illustrative, non-limiting example, based on the user partiality information 210, the control circuit 102 may determine that the user associated with the delivery destination 114 and/or the retail product delivery locker 112 has a very high magnitude for a first partiality vector for cleanliness. However, the user has a very low magnitude for a second partiality vector for cost. As such, the control circuit 102 may access the memory device 200 to determine, based on the vectorized characterizations of cleaning products 212, which one of the cleaning products has a high value (e.g., magnitude) for cleaning effectiveness and a low value for cost. For example, the control circuit 102 may determine a first alignment value of cleaning effectiveness of Formula 409 Multi-Surface Cleaner with the user's partiality vector for cleanliness. In another example, similarly, the control circuit 102 may determine a second alignment value of a cost associated with Formula 409 Multi-Surface Cleaner with the user's partiality vector for low cost. Thus, when the control circuit 102 determines that the first alignment value reaches a first threshold and the second alignment value reaches a second threshold, the control circuit 102 may determine which one of the plurality of cleaning processes 202 comprises at least the Formula 409 Multi-Surface Cleaner as one of the cleaning products used to clean the at least one compartment 116, 122.

In a scenario where the first alignment value reaches the first threshold but the second alignment value failed to reach the second threshold, the control circuit 102 may not consider the Formula 409 Multi-Surface Cleaner as one of the cleaning products to clean the at least one compartment 116, 122. As such, the control circuit 102 may evaluate the plurality of cleaning products and determine which one or more of the plurality of cleaning products have alignment values that reach particular threshold values. In response, that control circuit 102 may, based on the result of the evaluation and the determination, determine which one of the plurality of cleaning processes 202 comprises the one or more cleaning products that have alignment values that reached the particular threshold values. By one approach, the cleaning system 104 may use the determined cleaning process to clean the at least one compartment 116, 122. In other embodiments, the control circuit 102 identifies the cleaning process that has vectorized characterizations that most closely aligns with a set of user partiality vectors. One or more of the partiality vectors and corresponding vectorized characterizations may be defined as having a greater weight or priority over other partiality vectors and vectorized characterizations.

In some embodiment, the system 100 may include a temperature system, a temperature sensor, a product reader, and/or a security system (all not shown) secured to the retail product delivery locker 112 and operably coupled with the control circuit 102. By one approach, the temperature system comprises a heating and cooling system that maintains a temperature inside the at least one compartment 116, 122 within a temperature threshold using the temperature sensor. The temperature threshold may be based on range of temperatures suitable for storing the at least one retail product 118 in the at least one compartment 116, 122 for a particular period of time. In one configuration, the range of temperatures may be predetermined to generally prevent and/or delay spoilage of perishable products. In such a configuration, the retail product delivery locker 112 may be configured to store the at least one retail product 118 for a short period of time (e.g., less than a day or no more than two days or more). By another approach, the product reader may scan product identifiers associated with the at least one retail product 118. In one configuration, the control circuit 102 may receive the product identifier(s) and determine, based on the product identifiers, whether the at least one retail product 118 is sensitive to a change in temperature inside the at least one compartment 116, 122. If the at least one retail product 118 is not sensitive to the temperature change, the control circuit 102 may maintain the temperature to a default temperature threshold. In another configuration, the control circuit 102 may place the temperature system in a sleep state to conserve energy usage of the retail product delivery locker 112. Alternatively or in addition to, if the at least one retail product 118 is sensitive to the temperature change, the control circuit 102 may determine a temperature range suitable to store the at least one retail product 118 for a particular period of time. The control circuit 102 may access a database including storage temperatures suitable for a plurality of retail products. The control circuit 102 may then determine the temperature range suitable to store the at least one retail product 118 based on data accessed through the database.

By another approach, access to the retail product delivery locker 112 may be based on the security system authorizing entry. A delivery agent and/or the user may gain access to the retail product delivery locker 112 by providing at least one access code to the security system through the display device of the retail product delivery locker 112 and/or an electronic device associated with the delivery agent and/or the user. Alternatively or in addition to, authorization to access the retail product delivery locker 112 may be gained through geo-fence data stored in the electronic device and/or biometric identification, among other possible types of authorization for access and/or entry. For example, when the electronic device including the geo-fence data is within a threshold distance of the retail product delivery locker 112, the electronic device may provide data to the retail product delivery locker 112 to enable the delivery agent and/or the user to gain access/entry to the retail product delivery locker 112 and/or the at least one compartment 116, 122.

In another configuration, the display device may scan one or more biometric identifiers associated with the delivery agent and/or the user. The security system in cooperation with the control circuit 102, the memory device 200, and/or a security database may provide access/entry to the retail product delivery locker 112 based on the scanned one or more biometric identifiers. By one approach, the control circuit 102 may compare biometric data resulting from the scanned one or more biometric identifiers with stored biometric data in the memory device 200 and/or the security database and determine whether there is a match. If there is a match, the security system may provide access to the retail product delivery locker 112 to the delivery agent and/or the user. If there is not a match, the security system may provide a message through the display device of the retail product delivery locker 112 that access is denied and/or a repeat scan of the one or more biometric identifiers is requested.

Figure 3:
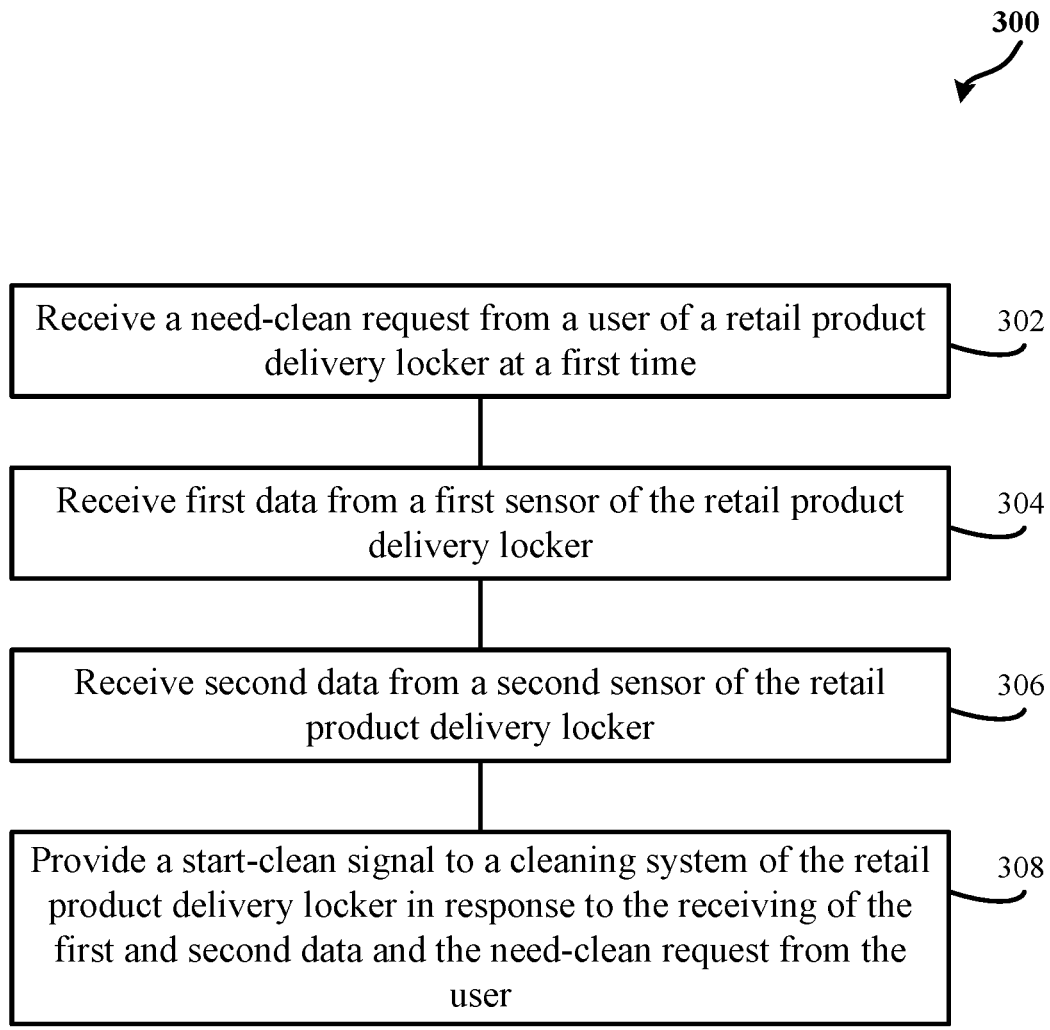
FIG. 3 shows a flow diagram of an exemplary process of receiving retail products at a delivery destination in accordance with some embodiments.

FIG. 3 illustrates a flow diagram of an exemplary method 300 for receiving retail products at a delivery destination in accordance with some embodiments. The exemplary method 300 may be implemented in the system 100, the control circuit 102, the cleaning system 104, the first sensor 108, the second sensor 106 of FIG. 1, and/or the memory 200 of FIG. 2. One or more steps in the method 300 may be implemented and/or applied in the memory device 200 of FIG. 2. The method 300 includes, at step 302, receiving a need-clean request from a user of a retail product delivery locker at a first time. The retail product delivery locker may correspond to the retail product delivery locker 112 of FIG. 1. The method 300 may include, at step 304, receiving first data from a first sensor of the retail product delivery locker. By one approach, the first data may indicate an opening of the retail product delivery locker. For example, the first sensor may correspond to the first sensor 108. The method 300 may include receiving second data from a second sensor of the retail product delivery locker, at step 306. By another approach, the second data may indicate that at least one compartment of the retail product delivery locker is empty. In one configuration, the method 300 may include, at step 308, providing a start-clean signal to a cleaning system of the retail product delivery locker in response to the receiving of the first and second data and the need-clean request from the user. By one approach, the start-clean signal may initiate a first cleaning of at least a portion of the at least one compartment. In one configuration, the first cleaning may be based on a first level-up cleaning process of a plurality of cleaning processes accessed through a memory device of the retail product delivery locker. The memory device may correspond to the memory device 200 of FIG. 1. In another configuration, the first level-up cleaning process may be based on at least one of the plurality of partiality vectors of the user.

Figure 4:
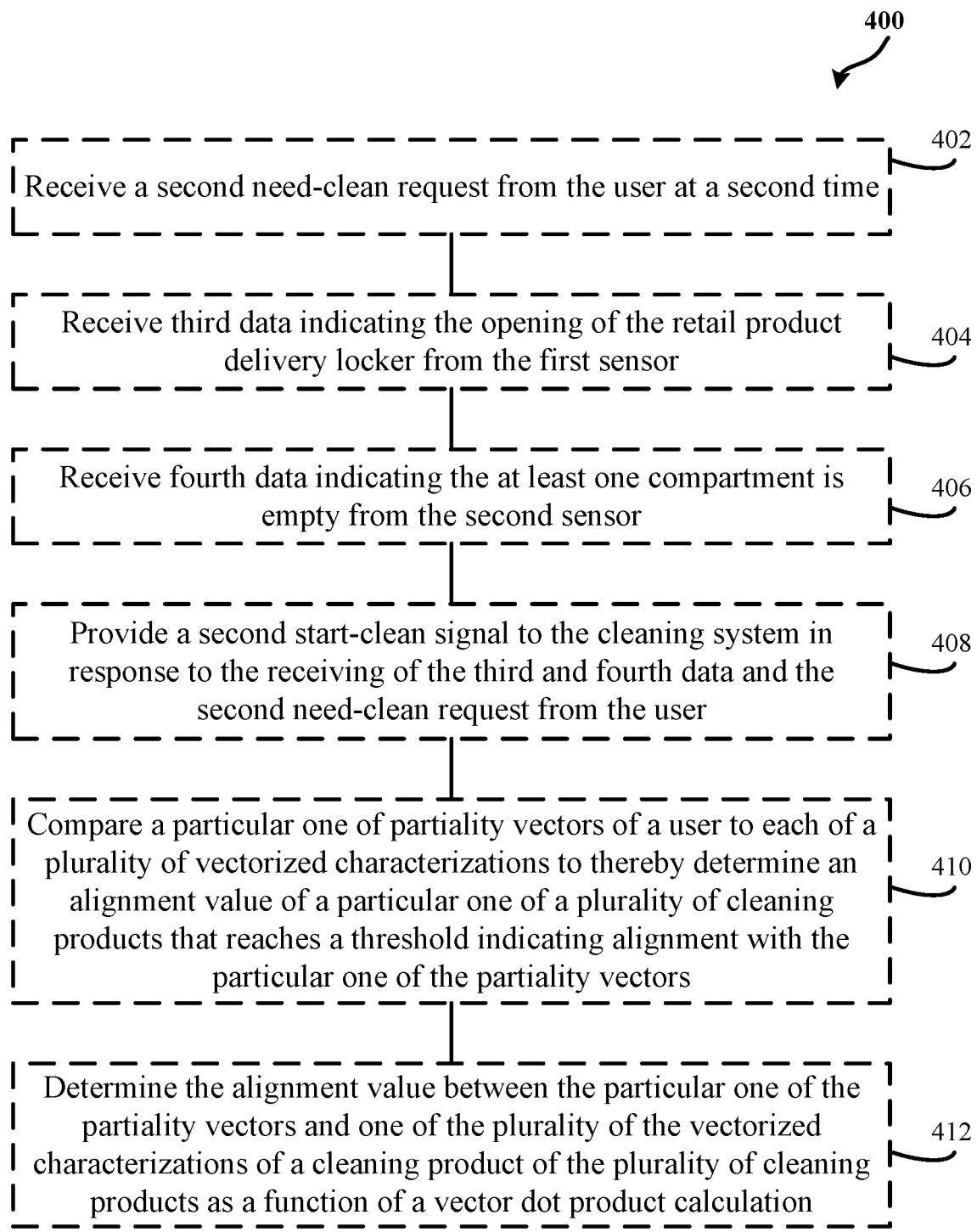
FIG. 4 shows a flow diagram of an exemplary process of receiving retail products at a delivery destination in accordance with some embodiments.

FIG. 4 illustrates a flow diagram of an exemplary method 400 for receiving retail products at a delivery destination in accordance with some embodiments. By one approach, the exemplary method 400 may be implemented in the system 100, the control circuit 102, the cleaning system 104, the first sensor 108, the second sensor 106 of FIG. 1, and/or the memory 200 of FIG. 2. One or more steps in the method 400 may be implemented and/or applied in the memory device 200 of FIG. 2. By another approach, the method 400 and/or one or more steps of the method may optionally be included in and/or performed in cooperation with the method 300 of FIG. 3. The method 400 may include, at step 402, receiving a second need-clean request from the user at a second time. In one configuration, the method 400 may include receiving third data indicating the opening of the retail product delivery locker from the first sensor, at step 404. In another configuration, the method 400 may include receiving fourth data indicating the at least one compartment is empty from the second sensor, at step 406. In yet another configuration, the method 400 may include, at step 408, providing a second start-clean signal to the cleaning system in response to the receiving of the third and fourth data and the second need-clean request from the user.

In some embodiments, the method 400 may include, at step 410, comparing a particular one of partiality vectors of the user to each of a plurality of vectorized characterizations to thereby determine an alignment value of a particular one of a plurality of cleaning products that reaches a threshold indicating alignment with the particular one of the partiality vectors. For example, the partiality vectors of the user may correspond to the user partiality information 210 of FIG. 2. In another example, the plurality of vectorized characterizations may correspond to the vectorized characterizations of cleaning products 212 of FIG. 1. By one approach, the partiality vectors of the user may be accessed through a memory device of the retail product delivery locker. By another approach, each of the partiality vectors may have at least one of a magnitude and an angle that corresponds to a magnitude of the user's belief in an amount of good that comes from an order associated with that partiality. In one configuration, the method 400 may include determining the alignment value between the particular one of the partiality vectors and one of the plurality of the vectorized characterizations of a cleaning product of the plurality of cleaning products as a function of a vector dot product calculation, at step 412. By one approach, the vectorized characterizations for each of the plurality of cleaning products may be accessed through the memory device. By another approach, the alignment value may indicate an extent to which the cleaning product may accord with the particular one of the plurality of partiality vectors.

Figure 5:
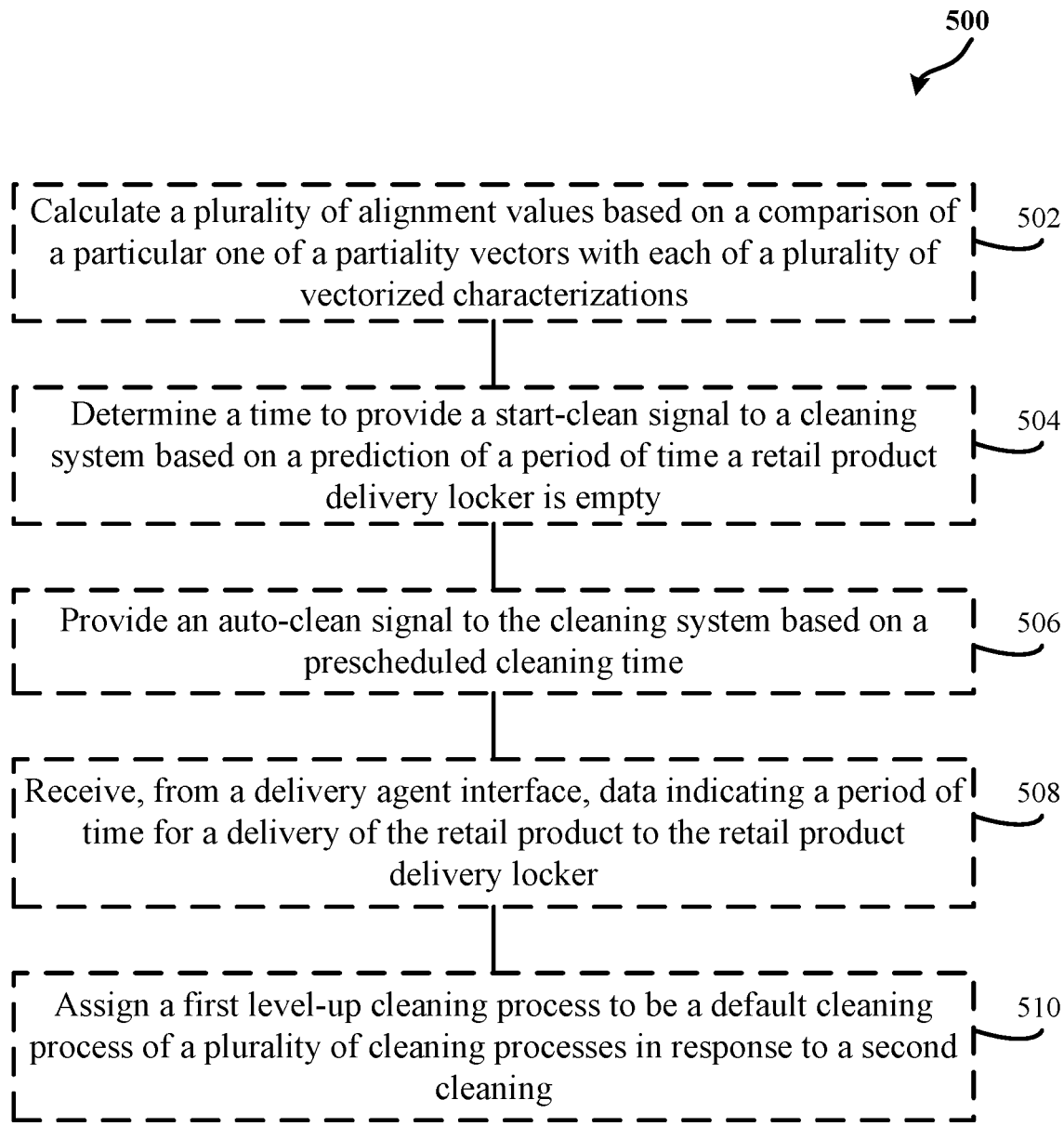
FIG. 5 shows a flow diagram of an exemplary process of receiving retail products at a delivery destination in accordance with some embodiments.

FIG. 5 illustrates a flow diagram of an exemplary method 500 for receiving retail products at a delivery destination in accordance with some embodiments. By one approach, the exemplary method 500 may be implemented in the system 100, the control circuit 102, the cleaning system 104, the first sensor 108, the second sensor 106 of FIG. 1, and/or the memory 200 of FIG. 2. One or more steps in the method 500 may be implemented and/or applied in the memory device 200 of FIG. 2. By another approach, the method 500 and/or one or more steps of the method may optionally be included in and/or performed in cooperation with the method 300 of FIG. 3 and/or the method 400 of FIG. 4. The method 500 may include, at step 502, calculating a plurality of alignment values based on a comparison of a particular one of partiality vectors with each of a plurality of vectorized characterizations. By one approach, the plurality of alignment values may be accessed through a memory device. The memory device may correspond to the memory device 200 of FIG. 2. In one configuration, the method 500 may include determining a time to provide a start-clean signal to a cleaning system based on a prediction of a period of time a retail product delivery locker may be empty, at step 504. By one approach, the prediction may be based on a pattern determined from a plurality of periods of time the retail product delivery locker may be empty. In another configuration, the method 500 may include, at step 506, providing an auto-clean signal to the cleaning system based on a prescheduled cleaning time. By one approach, the auto-clean signal may initiate a first cleaning of the at least one compartment of the retail product delivery locker. By another approach, the first cleaning may be based on a default cleaning process of the plurality of cleaning processes. In yet another configuration, the method 500 may include, at step 508, receiving, from a delivery agent interface, data indicating a period of time for a delivery of the retail product to the retail product delivery locker. By one approach, the delivery agent interface may operate on an electronic device associated with the delivery agent. By another approach, the first cleaning may occur at a time outside the period of time for the delivery. In yet another configuration, the method 500 may include, at step 510, assigning the first level-up cleaning process to be a default cleaning process of the plurality of cleaning processes in response to the second cleaning.

Figure 6:
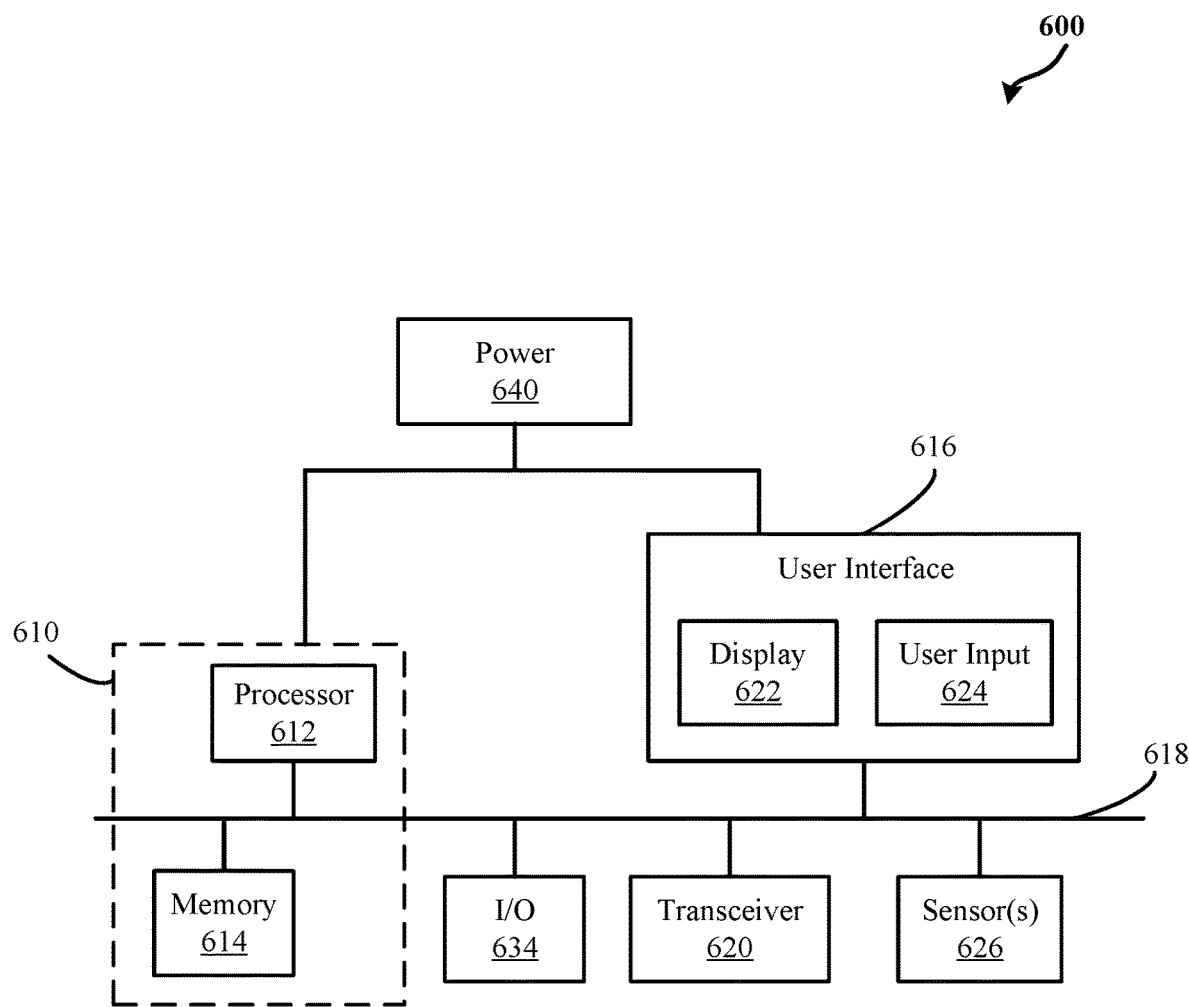
FIG. 6 illustrates an exemplary system for use in implementing methods, techniques, devices, apparatuses, systems, servers, sources and receiving retail products, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the system 100 of FIG. 1, the method 300 of FIG. 3, the method 400 of FIG. 4, the method 500 of FIG. 5, and/or other above or below mentioned systems or devices, or parts of such circuits, circuitry, functionality, systems, apparatuses, processes, or devices. For example, the system 600 may be used to implement some or all of the system 100 for receiving retail products at a delivery destination, the control circuit 102, the cleaning system 104, the memory 200, the first sensor 108, the second sensor 106, and/or other such components, circuitry, functionality and/or devices. However, the use of the system 600 or any portion thereof is certainly not required.

By way of example, the system 600 may comprise a processor module (or a control circuit) 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system 600 may implement the system 100 for receiving retail products at a delivery destination with the control circuit 102 being the control circuit 612.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) interface 634 that allow one or more devices to couple with the system 600. The I/O interface can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Generally speaking, many of these embodiments provide for a memory having information stored therein that includes partiality information for each of a plurality of persons in the form of a plurality of partiality vectors for each of the persons wherein each partiality vector has at least one of a magnitude and an angle that corresponds to a magnitude of the person's belief in an amount of good that comes from an order associated with that partiality. This memory can also contain vectorized characterizations for each of a plurality of products, wherein each of the vectorized characterizations includes a measure regarding an extent to which a corresponding one of the products accords with a corresponding one of the plurality of partiality vectors.

Rules can then be provided that use the aforementioned information in support of a wide variety of activities and results. Although the described vector-based approaches bear little resemblance (if any) (conceptually or in practice) to prior approaches to understanding and/or metricizing a given person's product/service requirements, these approaches yield numerous benefits including, at least in some cases, reduced memory requirements, an ability to accommodate (both initially and dynamically over time) an essentially endless number and variety of partialities and/or product attributes, and processing/comparison capabilities that greatly ease computational resource requirements and/or greatly reduced time-to-solution results.

So configured, these teachings can constitute, for example, a method for automatically correlating a particular product with a particular person by using a control circuit to obtain a set of rules that define the particular product from amongst a plurality of candidate products for the particular person as a function of vectorized representations of partialities for the particular person and vectorized characterizations for the candidate products. This control circuit can also obtain partiality information for the particular person in the form of a plurality of partiality vectors that each have at least one of a magnitude and an angle that corresponds to a magnitude of the particular person's belief in an amount of good that comes from an order associated with that partiality and vectorized characterizations for each of the candidate products, wherein each of the vectorized characterizations indicates a measure regarding an extent to which a corresponding one of the candidate products accords with a corresponding one of the plurality of partiality vectors. The control circuit can then generate an output comprising identification of the particular product by evaluating the partiality vectors and the vectorized characterizations against the set of rules.

The aforementioned set of rules can include, for example, comparing at least some of the partiality vectors for the particular person to each of the vectorized characterizations for each of the candidate products using vector dot product calculations. By another approach, in lieu of the foregoing or in combination therewith, the aforementioned set of rules can include using the partiality vectors and the vectorized characterizations to define a plurality of solutions that collectively form a multi-dimensional surface and selecting the particular product from the multi-dimensional surface. In such a case the set of rules can further include accessing other information (such as objective information) for the particular person comprising information other than partiality vectors and using the other information to constrain a selection area on the multi-dimensional surface from which the particular product can be selected.

People tend to be partial to ordering various aspects of their lives, which is to say, people are partial to having things well arranged per their own personal view of how things should be. As a result, anything that contributes to the proper ordering of things regarding which a person has partialities represents value to that person. Quite literally, improving order reduces entropy for the corresponding person (i.e., a reduction in the measure of disorder present in that particular aspect of that person's life) and that improvement in order/reduction in disorder is typically viewed with favor by the affected person.

Generally speaking a value proposition must be coherent (logically sound) and have "force." Here, force takes the form of an imperative. When the parties to the imperative have a reputation of being trustworthy and the value proposition is perceived to yield a good outcome, then the imperative becomes anchored in the center of a belief that "this is something that I must do because the results will be good for me." With the imperative so anchored, the corresponding material space can be viewed as conforming to the order specified in the proposition that will result in the good outcome.

Pursuant to these teachings a belief in the good that comes from imposing a certain order takes the form of a value proposition. It is a set of coherent logical propositions by a trusted source that, when taken together, coalesce to form an imperative that a person has a personal obligation to order their lives because it will return a good outcome which improves their quality of life. This imperative is a value force that exerts the physical force (effort) to impose the desired order. The inertial effects come from the strength of the belief. The strength of the belief comes from the force of the value argument (proposition). And the force of the value proposition is a function of the perceived good and trust in the source that convinced the person's belief system to order material space accordingly. A belief remains constant until acted upon by a new force of a trusted value argument. This is at least a significant reason why the routine in people's lives remains relatively constant.

Newton's three laws of motion have a very strong bearing on the present teachings. Stated summarily, Newton's first law holds that an object either remains at rest or continues to move at a constant velocity unless acted upon by a force, the second law holds that the vector sum of the forces F on an object equal the mass m of that object multiplied by the acceleration a of the object (i.e., F=ma), and the third law holds that when one body exerts a force on a second body, the second body simultaneously exerts a force equal in magnitude and opposite in direction on the first body.

Relevant to both the present teachings and Newton's first law, beliefs can be viewed as having inertia. In particular, once a person believes that a particular order is good, they tend to persist in maintaining that belief and resist moving away from that belief. The stronger that belief the more force an argument and/or fact will need to move that person away from that belief to a new belief.

Relevant to both the present teachings and Newton's second law, the "force" of a coherent argument can be viewed as equaling the "mass" which is the perceived Newtonian effort to impose the order that achieves the aforementioned belief in the good which an imposed order brings multiplied by the change in the belief of the good which comes from the imposition of that order. Consider that when a change in the value of a particular order is observed then there must have been a compelling value claim influencing that change. There is a proportionality in that the greater the change the stronger the value argument. If a person values a particular activity and is very diligent to do that activity even when facing great opposition, we say they are dedicated, passionate, and so forth. If they stop doing the activity, it begs the question, what made them stop? The answer to that question needs to carry enough force to account for the change.

And relevant to both the present teachings and Newton's third law, for every effort to impose good order there is an equal and opposite good reaction.

Figure 7:
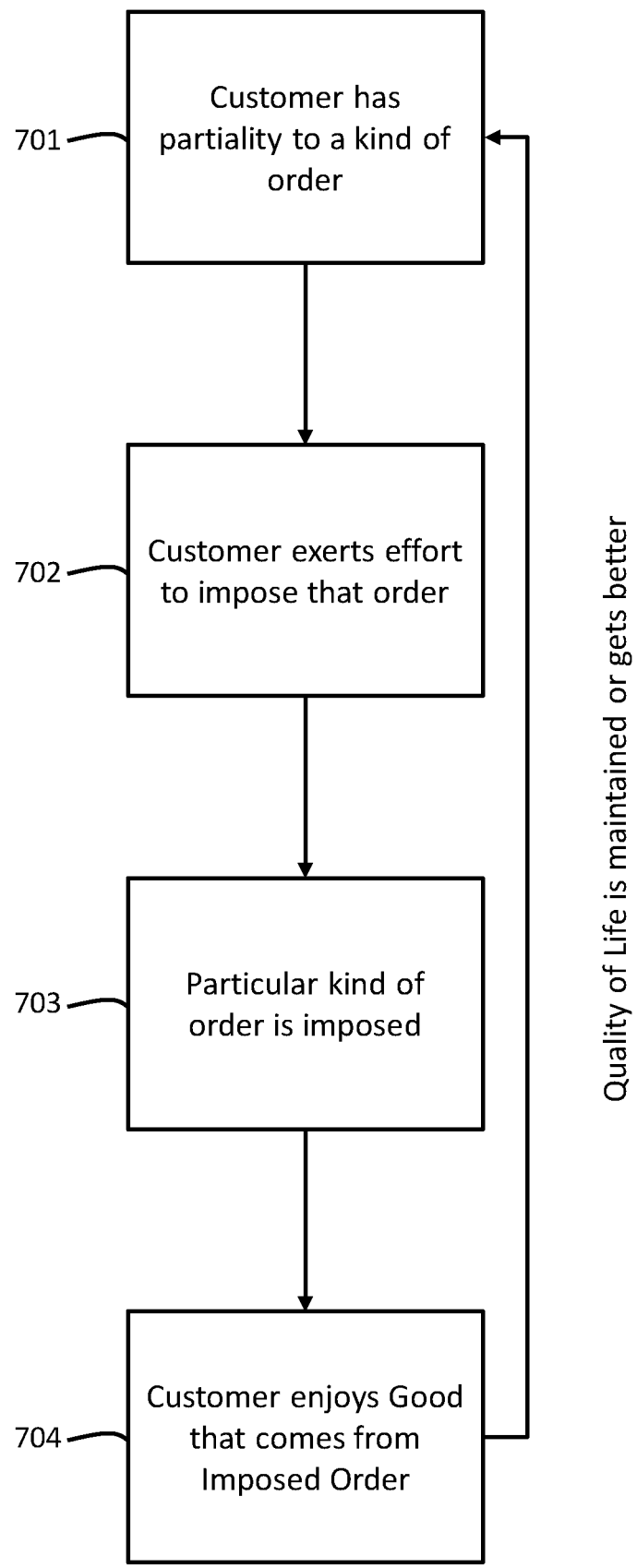
FIG. 7 comprises a flow diagram as configured in accordance with various embodiments of these teachings.

FIG. 7 provides a simple illustrative example in these regards. At block 701 it is understood that a particular person has a partiality (to a greater or lesser extent) to a particular kind of order. At block 702 that person willingly exerts effort to impose that order to thereby, at block 703, achieve an arrangement to which they are partial. And at block 704, this person appreciates the "good" that comes from successfully imposing the order to which they are partial, in effect establishing a positive feedback loop.

Figure 8:
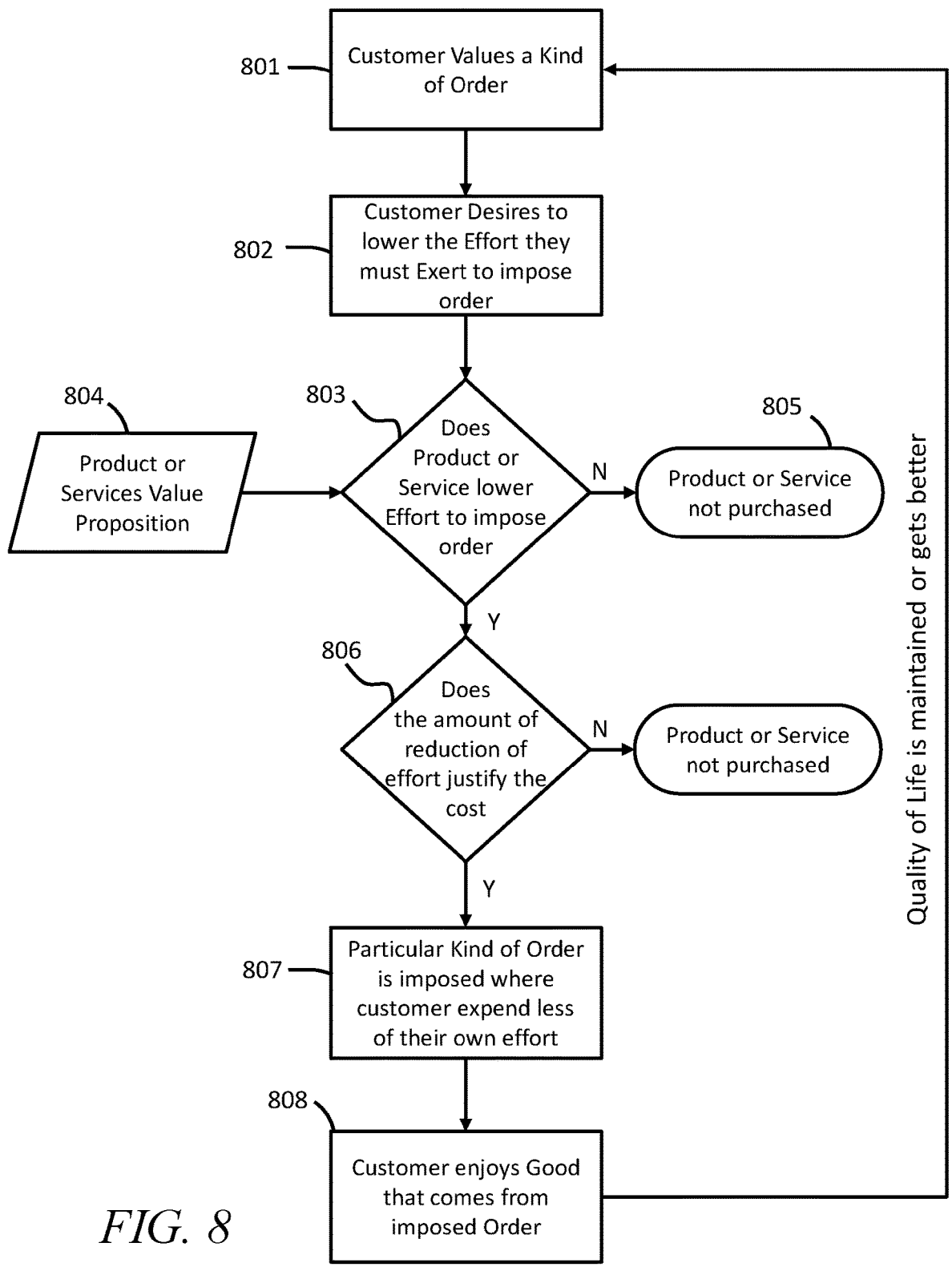
FIG. 8 comprises a flow diagram as configured in accordance with various embodiments of these teachings.

Understanding these partialities to particular kinds of order can be helpful to understanding how receptive a particular person may be to purchasing a given product or service. FIG. 8 provides a simple illustrative example in these regards. At block 801 it is understood that a particular person values a particular kind of order. At block 802 it is understood (or at least presumed) that this person wishes to lower the effort (or is at least receptive to lowering the effort) that they must personally exert to impose that order. At decision block 803 (and with access to information 804 regarding relevant products and or services) a determination can be made whether a particular product or service lowers the effort required by this person to impose the desired order. When such is not the case, it can be concluded that the person will not likely purchase such a product/service 805 (presuming better choices are available).

When the product or service does lower the effort required to impose the desired order, however, at block 806 a determination can be made as to whether the amount of the reduction of effort justifies the cost of purchasing and/or using the proffered product/service. If the cost does not justify the reduction of effort, it can again be concluded that the person will not likely purchase such a product/service 805. When the reduction of effort does justify the cost, however, this person may be presumed to want to purchase the product/service and thereby achieve the desired order (or at least an improvement with respect to that order) with less expenditure of their own personal effort (block 807) and thereby achieve, at block 808, corresponding enjoyment or appreciation of that result.

To facilitate such an analysis, the applicant has determined that factors pertaining to a person's partialities can be quantified and otherwise represented as corresponding vectors (where "vector" will be understood to refer to a geometric object/quantity having both an angle and a length/magnitude). These teachings will accommodate a variety of differing bases for such partialities including, for example, a person's values, affinities, aspirations, and preferences.

A value is a person's principle or standard of behavior, their judgment of what is important in life. A person's values represent their ethics, moral code, or morals and not a mere unprincipled liking or disliking of something. A person's value might be a belief in kind treatment of animals, a belief in cleanliness, a belief in the importance of personal care, and so forth.

An affinity is an attraction (or even a feeling of kinship) to a particular thing or activity. Examples including such a feeling towards a participatory sport such as golf or a spectator sport (including perhaps especially a particular team such as a particular professional or college football team), a hobby (such as quilting, model railroading, and so forth), one or more components of popular culture (such as a particular movie or television series, a genre of music or a particular musical performance group, or a given celebrity, for example), and so forth.

"Aspirations" refer to longer-range goals that require months or even years to reasonably achieve. As used herein "aspirations" does not include mere short term goals (such as making a particular meal tonight or driving to the store and back without a vehicular incident). The aspired-to goals, in turn, are goals pertaining to a marked elevation in one's core competencies (such as an aspiration to master a particular game such as chess, to achieve a particular articulated and recognized level of martial arts proficiency, or to attain a particular articulated and recognized level of cooking proficiency), professional status (such as an aspiration to receive a particular advanced education degree, to pass a professional examination such as a state Bar examination of a Certified Public Accountants examination, or to become Board certified in a particular area of medical practice), or life experience milestone (such as an aspiration to climb Mount Everest, to visit every state capital, or to attend a game at every major league baseball park in the United States). It will further be understood that the goal(s) of an aspiration is not something that can likely merely simply happen of its own accord; achieving an aspiration requires an intelligent effort to order one's life in a way that increases the likelihood of actually achieving the corresponding goal or goals to which that person aspires. One aspires to one day run their own business as versus, for example, merely hoping to one day win the state lottery.

A preference is a greater liking for one alternative over another or others. A person can prefer, for example, that their steak is cooked "medium" rather than other alternatives such as "rare" or "well done" or a person can prefer to play golf in the morning rather than in the afternoon or evening. Preferences can and do come into play when a given person makes purchasing decisions at a retail shopping facility. Preferences in these regards can take the form of a preference for a particular brand over other available brands or a preference for economy-sized packaging as versus, say, individual serving-sized packaging.

Values, affinities, aspirations, and preferences are not necessarily wholly unrelated. It is possible for a person's values, affinities, or aspirations to influence or even dictate their preferences in specific regards. For example, a person's moral code that values non-exploitive treatment of animals may lead them to prefer foods that include no animal-based ingredients and hence to prefer fruits and vegetables over beef and chicken offerings. As another example, a person's affinity for a particular musical group may lead them to prefer clothing that directly or indirectly references or otherwise represents their affinity for that group. As yet another example, a person's aspirations to become a Certified Public Accountant may lead them to prefer business-related media content.

While a value, affinity, or aspiration may give rise to or otherwise influence one or more corresponding preferences, however, is not to say that these things are all one and the same; they are not. For example, a preference may represent either a principled or an unprincipled liking for one thing over another, while a value is the principle itself. Accordingly, as used herein it will be understood that a partiality can include, in context, any one or more of a value-based, affinity-based, aspiration-based, and/or preference-based partiality unless one or more such features is specifically excluded per the needs of a given application setting.

Information regarding a given person's partialities can be acquired using any one or more of a variety of information-gathering and/or analytical approaches. By one simple approach, a person may voluntarily disclose information regarding their partialities (for example, in response to an online questionnaire or survey or as part of their social media presence). By another approach, the purchasing history for a given person can be analyzed to intuit the partialities that led to at least some of those purchases. By yet another approach demographic information regarding a particular person can serve as yet another source that sheds light on their partialities. Other ways that people reveal how they order their lives include but are not limited to: (1) their social networking profiles and behaviors (such as the things they "like" via Facebook, the images they post via Pinterest, informal and formal comments they initiate or otherwise provide in response to third-party postings including statements regarding their own personal long-term goals, the persons/topics they follow via Twitter, the photographs they publish via Picasso, and so forth); (2) their Internet surfing history; (3) their on-line or otherwise-published affinity-based memberships; (4) real-time (or delayed) information (such as steps walked, calories burned, geographic location, activities experienced, and so forth) from any of a variety of personal sensors (such as smart phones, tablet/pad-styled computers, fitness wearables, Global Positioning System devices, and so forth) and the so-called Internet of Things (such as smart refrigerators and pantries, entertainment and information platforms, exercise and sporting equipment, and so forth); (5) instructions, selections, and other inputs (including inputs that occur within augmented-reality user environments) made by a person via any of a variety of interactive interfaces (such as keyboards and cursor control devices, voice recognition, gesture-based controls, and eye tracking-based controls), and so forth.

The present teachings employ a vector-based approach to facilitate characterizing, representing, understanding, and leveraging such partialities to thereby identify products (and/or services) that will, for a particular corresponding consumer, provide for an improved or at least a favorable corresponding ordering for that consumer. Vectors are directed quantities that each have both a magnitude and a direction. Per the applicant's approach these vectors have a real, as versus a metaphorical, meaning in the sense of Newtonian physics. Generally speaking, each vector represents order imposed upon material space-time by a particular partiality.

Figure 9:
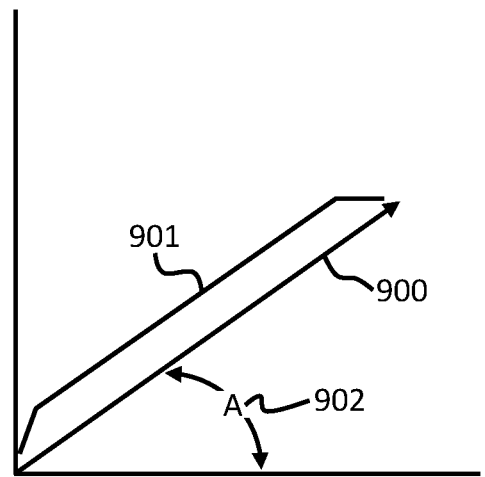
FIG. 9 comprises a graphic representation as configured in accordance with various embodiments of these teachings.

FIG. 9 provides some illustrative examples in these regards. By one approach the vector 900 has a corresponding magnitude 901 (i.e., length) that represents the magnitude of the strength of the belief in the good that comes from that imposed order (which belief, in turn, can be a function, relatively speaking, of the extent to which the order for this particular partiality is enabled and/or achieved). In this case, the greater the magnitude 901, the greater the strength of that belief and vice versa. Per another example, the vector 900 has a corresponding angle A 902 that instead represents the foregoing magnitude of the strength of the belief (and where, for example, an angle of 0° represents no such belief and an angle of 90° represents a highest magnitude in these regards, with other ranges being possible as desired).

Accordingly, a vector serving as a partiality vector can have at least one of a magnitude and an angle that corresponds to a magnitude of a particular person's belief in an amount of good that comes from an order associated with a particular partiality.

Applying force to displace an object with mass in the direction of a certain partiality-based order creates worth for a person who has that partiality. The resultant work (i.e., that force multiplied by the distance the object moves) can be viewed as a worth vector having a magnitude equal to the accomplished work and having a direction that represents the corresponding imposed order. If the resultant displacement results in more order of the kind that the person is partial to then the net result is a notion of "good." This "good" is a real quantity that exists in meta-physical space much like work is a real quantity in material space. The link between the "good" in meta-physical space and the work in material space is that it takes work to impose order that has value.

In the context of a person, this effort can represent, quite literally, the effort that the person is willing to exert to be compliant with (or to otherwise serve) this particular partiality. For example, a person who values animal rights would have a large magnitude worth vector for this value if they exerted considerable physical effort towards this cause by, for example, volunteering at animal shelters or by attending protests of animal cruelty.

While these teachings will readily employ a direct measurement of effort such as work done or time spent, these teachings will also accommodate using an indirect measurement of effort such as expense; in particular, money. In many cases people trade their direct labor for payment. The labor may be manual or intellectual. While salaries and payments can vary significantly from one person to another, a same sense of effort applies at least in a relative sense.

As a very specific example in these regards, there are wristwatches that require a skilled craftsman over a year to make. The actual aggregated amount of force applied to displace the small components that comprise the wristwatch would be relatively very small. That said, the skilled craftsman acquired the necessary skill to so assemble the wristwatch over many years of applying force to displace thousands of little parts when assembly previous wristwatches. That experience, based upon a much larger aggregation of previously-exerted effort, represents a genuine part of the "effort" to make this particular wristwatch and hence is fairly considered as part of the wristwatch's worth.

The conventional forces working in each person's mind are typically more-or-less constantly evaluating the value propositions that correspond to a path of least effort to thereby order their lives towards the things they value. A key reason that happens is because the actual ordering occurs in material space and people must exert real energy in pursuit of their desired ordering. People therefore naturally try to find the path with the least real energy expended that still moves them to the valued order. Accordingly, a trusted value proposition that offers a reduction of real energy will be embraced as being "good" because people will tend to be partial to anything that lowers the real energy they are required to exert while remaining consistent with their partialities.

Figure 10:
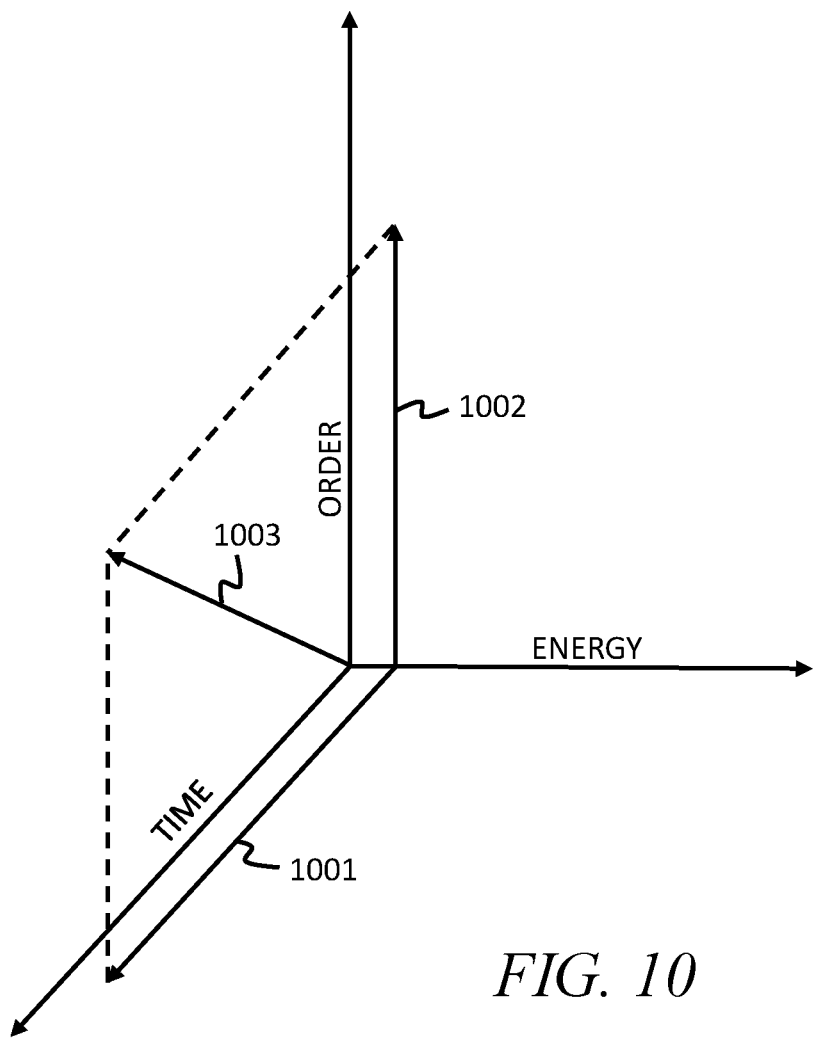
FIG. 10 comprises a graph as configured in accordance with various embodiments of these teachings.

FIG. 10 presents a space graph that illustrates many of the foregoing points. A first vector 1001 represents the time required to make such a wristwatch while a second vector 1002 represents the order associated with such a device (in this case, that order essentially represents the skill of the craftsman). These two vectors 1001 and 1002 in turn sum to form a third vector 1003 that constitutes a value vector for this wristwatch. This value vector 1003, in turn, is offset with respect to energy (i.e., the energy associated with manufacturing the wristwatch).

A person partial to precision and/or to physically presenting an appearance of success and status (and who presumably has the wherewithal) may, in turn, be willing to spend $100,000 for such a wristwatch. A person able to afford such a price, of course, may themselves be skilled at imposing a certain kind of order that other persons are partial to such that the amount of physical work represented by each spent dollar is small relative to an amount of dollars they receive when exercising their skill(s). (Viewed another way, wearing an expensive wristwatch may lower the effort required for such a person to communicate that their own personal success comes from being highly skilled in a certain order of high worth.)

Generally speaking, all worth comes from imposing order on the material space-time. The worth of a particular order generally increases as the skill required to impose the order increases. Accordingly, unskilled labor may exchange $10 for every hour worked where the work has a high content of unskilled physical labor while a highly-skilled data scientist may exchange $75 for every hour worked with very little accompanying physical effort.

Consider a simple example where both of these laborers are partial to a well-ordered lawn and both have a corresponding partiality vector in those regards with a same magnitude. To observe that partiality the unskilled laborer may own an inexpensive push power lawn mower that this person utilizes for an hour to mow their lawn. The data scientist, on the other hand, pays someone else $75 in this example to mow their lawn. In both cases these two individuals traded one hour of worth creation to gain the same worth (to them) in the form of a well-ordered lawn; the unskilled laborer in the form of direct physical labor and the data scientist in the form of money that required one hour of their specialized effort to earn.

This same vector-based approach can also represent various products and services. This is because products and services have worth (or not) because they can remove effort (or fail to remove effort) out of the customer's life in the direction of the order to which the customer is partial. In particular, a product has a perceived effort embedded into each dollar of cost in the same way that the customer has an amount of perceived effort embedded into each dollar earned. A customer has an increased likelihood of responding to an exchange of value if the vectors for the product and the customer's partiality are directionally aligned and where the magnitude of the vector as represented in monetary cost is somewhat greater than the worth embedded in the customer's dollar.

Put simply, the magnitude (and/or angle) of a partiality vector for a person can represent, directly or indirectly, a corresponding effort the person is willing to exert to pursue that partiality. There are various ways by which that value can be determined. As but one non-limiting example in these regards, the magnitude/angle V of a particular partiality vector can be expressed as:

$$V = \begin{bmatrix} X_1 \\ M \\ X_n \end{bmatrix} [W_1 \wedge W_n]$$

where X refers to any of a variety of inputs (such as those described above) that can impact the characterization of a particular partiality (and where these teachings will accommodate either or both subjective and objective inputs as desired) and W refers to weighting factors that are appropriately applied the foregoing input values (and where, for example, these weighting factors can have values that themselves reflect a particular person's consumer personality or otherwise as desired and can be static or dynamically valued in practice as desired).

In the context of a product (or service) the magnitude/angle of the corresponding vector can represent the reduction of effort that must be exerted when making use of this product to pursue that partiality, the effort that was expended in order to create the product/service, the effort that the person perceives can be personally saved while nevertheless promoting the desired order, and/or some other corresponding effort. Taken as a whole the sum of all the vectors must be perceived to increase the overall order to be considered a good product/service.

It may be noted that while reducing effort provides a very useful metric in these regards, it does not necessarily follow that a given person will always gravitate to that which most reduces effort in their life. This is at least because a given person's values (for example) will establish a baseline against which a person may eschew some goods/services that might in fact lead to a greater overall reduction of effort but which would conflict, perhaps fundamentally, with their values. As a simple illustrative example, a given person might value physical activity. Such a person could experience reduced effort (including effort represented via monetary costs) by simply sitting on their couch, but instead will pursue activities that involve that valued physical activity. That said, however, the goods and services that such a person might acquire in support of their physical activities are still likely to represent increased order in the form of reduced effort where that makes sense. For example, a person who favors rock climbing might also favor rock climbing clothing and supplies that render that activity safer to thereby reduce the effort required to prevent disorder as a consequence of a fall (and consequently increasing the good outcome of the rock climber's quality experience).

By forming reliable partiality vectors for various individuals and corresponding product characterization vectors for a variety of products and/or services, these teachings provide a useful and reliable way to identify products/services that accord with a given person's own partialities (whether those partialities are based on their values, their affinities, their preferences, or otherwise).

It is of course possible that partiality vectors may not be available yet for a given person due to a lack of sufficient specific source information from or regarding that person. In this case it may nevertheless be possible to use one or more partiality vector templates that generally represent certain groups of people that fairly include this particular person. For example, if the person's gender, age, academic status/achievements, and/or postal code are known it may be useful to utilize a template that includes one or more partiality vectors that represent some statistical average or norm of other persons matching those same characterizing parameters. (Of course, while it may be useful to at least begin to employ these teachings with certain individuals by using one or more such templates, these teachings will also accommodate modifying (perhaps significantly and perhaps quickly) such a starting point over time as part of developing a more personal set of partiality vectors that are specific to the individual.) A variety of templates could be developed based, for example, on professions, academic pursuits and achievements, nationalities and/or ethnicities, characterizing hobbies, and the like.

Figure 11:
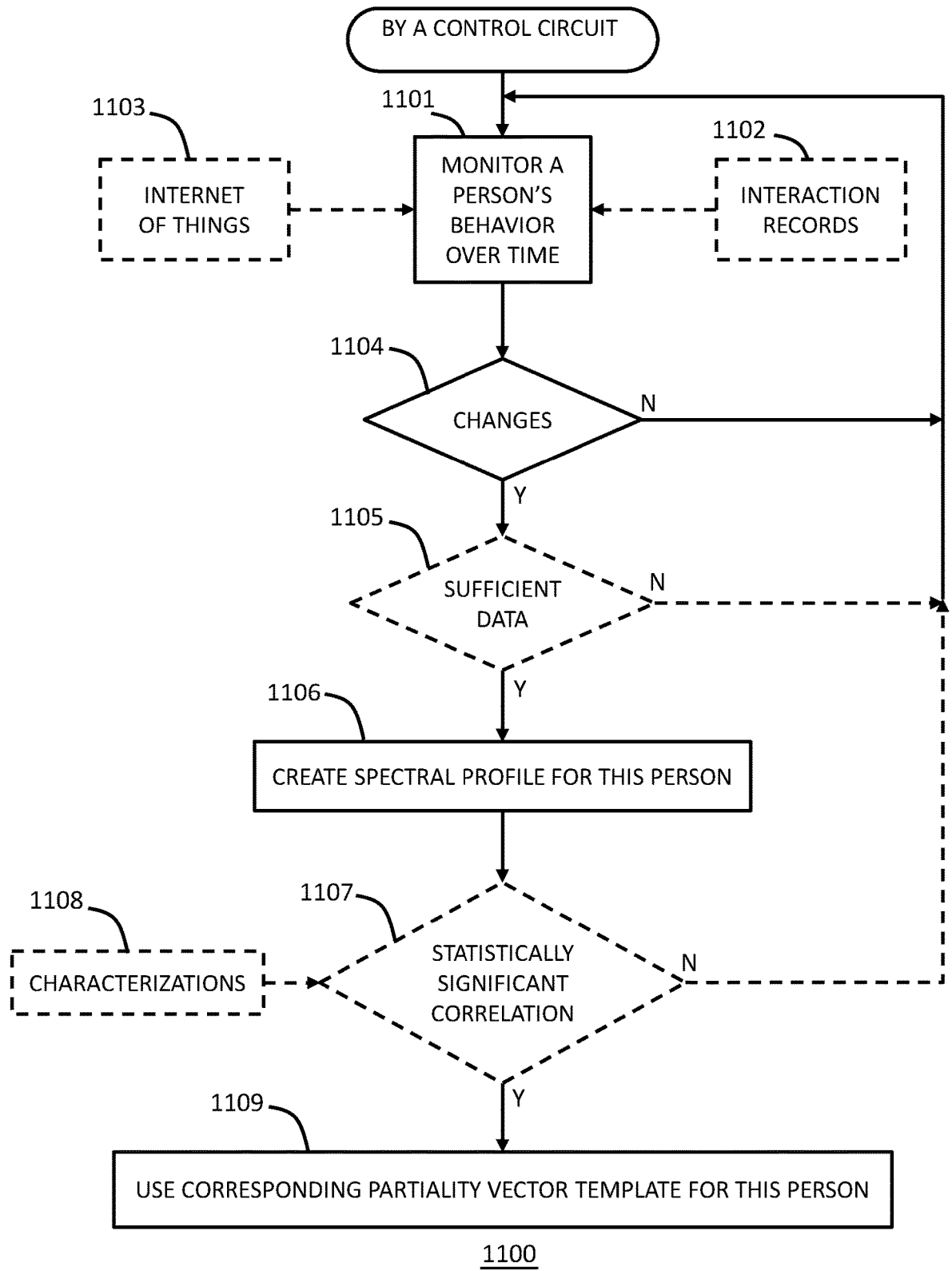
FIG. 11 comprises a flow diagram as configured in accordance with various embodiments of these teachings.

FIG. 11 presents a process 1100 that illustrates yet another approach in these regards. For the sake of an illustrative example it will be presumed here that a control circuit of choice (with useful examples in these regards being presented further below) carries out one or more of the described steps/actions.

At block 1101 the control circuit monitors a person's behavior over time. The range of monitored behaviors can vary with the individual and the application setting. By one approach, only behaviors that the person has specifically approved for monitoring are so monitored.

As one example in these regards, this monitoring can be based, in whole or in part, upon interaction records 1102 that reflect or otherwise track, for example, the monitored person's purchases. This can include specific items purchased by the person, from whom the items were purchased, where the items were purchased, how the items were purchased (for example, at a bricks-and-mortar physical retail shopping facility or via an on-line shopping opportunity), the price paid for the items, and/or which items were returned and when), and so forth.

As another example in these regards the interaction records 1102 can pertain to the social networking behaviors of the monitored person including such things as their "likes," their posted comments, images, and tweets, affinity group affiliations, their on-line profiles, their playlists and other indicated "favorites," and so forth. Such information can sometimes comprise a direct indication of a particular partiality or, in other cases, can indirectly point towards a particular partiality and/or indicate a relative strength of the person's partiality.

Other interaction records of potential interest include but are not limited to registered political affiliations and activities, credit reports, military-service history, educational and employment history, and so forth.

As another example, in lieu of the foregoing or in combination therewith, this monitoring can be based, in whole or in part, upon sensor inputs from the Internet of Things (IOT) 1103. The Internet of Things refers to the Internet-based inter-working of a wide variety of physical devices including but not limited to wearable or carriable devices, vehicles, buildings, and other items that are embedded with electronics, software, sensors, network connectivity, and sometimes actuators that enable these objects to collect and exchange data via the Internet. In particular, the Internet of Things allows people and objects pertaining to people to be sensed and corresponding information to be transferred to remote locations via intervening network infrastructure. Some experts estimate that the Internet of Things will consist of almost 50 billion such objects by 2020. (Further description in these regards appears further herein.)

Depending upon what sensors a person encounters, information can be available regarding a person's travels, lifestyle, calorie expenditure over time, diet, habits, interests and affinities, choices and assumed risks, and so forth. This process 1100 will accommodate either or both real-time or non-real time access to such information as well as either or both push and pull-based paradigms.

By monitoring a person's behavior over time a general sense of that person's daily routine can be established (sometimes referred to herein as a routine experiential base state). As a very simple illustrative example, a routine experiential base state can include a typical daily event timeline for the person that represents typical locations that the person visits and/or typical activities in which the person engages. The timeline can indicate those activities that tend to be scheduled (such as the person's time at their place of employment or their time spent at their child's sports practices) as well as visits/activities that are normal for the person though not necessarily undertaken with strict observance to a corresponding schedule (such as visits to local stores, movie theaters, and the homes of nearby friends and relatives).

At block 1104 this process 1100 provides for detecting changes to that established routine. These teachings are highly flexible in these regards and will accommodate a wide variety of "changes." Some illustrative examples include but are not limited to changes with respect to a person's travel schedule, destinations visited or time spent at a particular destination, the purchase and/or use of new and/or different products or services, a subscription to a new magazine, a new Rich Site Summary (RSS) feed or a subscription to a new blog, a new "friend" or "connection" on a social networking site, a new person, entity, or cause to follow on a Twitter-like social networking service, enrollment in an academic program, and so forth.

Upon detecting a change, at optional block 1105 this process 1100 will accommodate assessing whether the detected change constitutes a sufficient amount of data to warrant proceeding further with the process. This assessment can comprise, for example, assessing whether a sufficient number (i.e., a predetermined number) of instances of this particular detected change have occurred over some predetermined period of time. As another example, this assessment can comprise assessing whether the specific details of the detected change are sufficient in quantity and/or quality to warrant further processing. For example, merely detecting that the person has not arrived at their usual 6 PM-Wednesday dance class may not be enough information, in and of itself, to warrant further processing, in which case the information regarding the detected change may be discarded or, in the alternative, cached for further consideration and use in conjunction or aggregation with other, later-detected changes.

Figure 12:
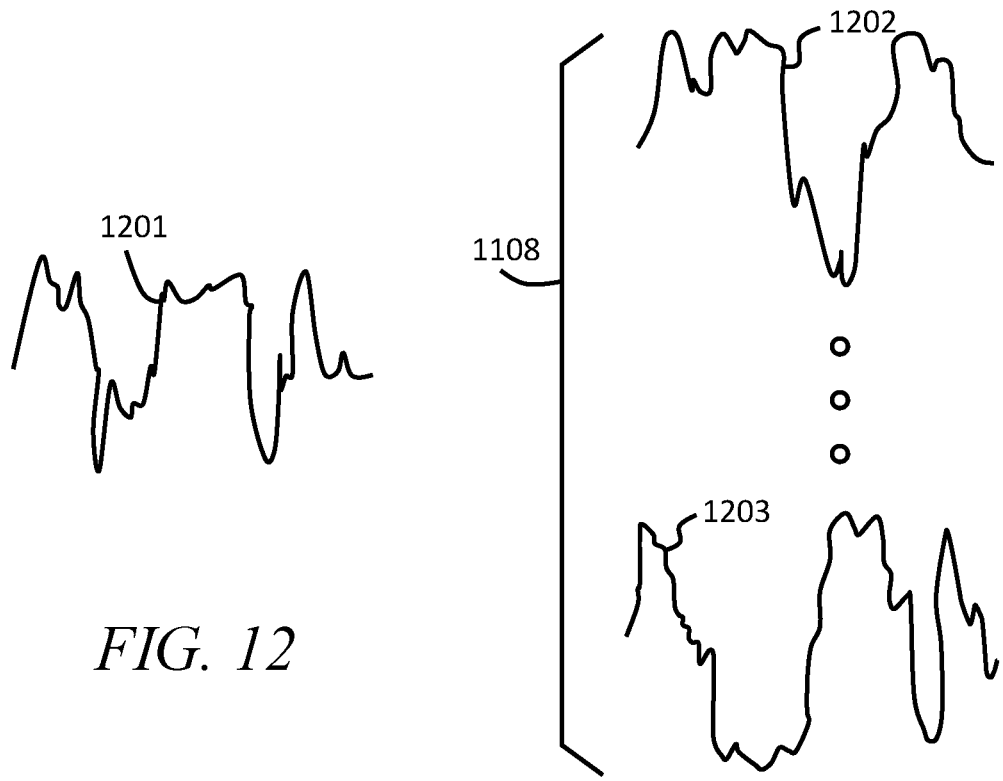
FIG. 12 comprises a graphic representation as configured in accordance with various embodiments of these teachings.

At block 1107 this process 1100 uses these detected changes to create a spectral profile for the monitored person. FIG. 12 provides an illustrative example in these regards with the spectral profile denoted by reference numeral 1201. In this illustrative example the spectral profile 1201 represents changes to the person's behavior over a given period of time (such as an hour, a day, a week, or some other temporal window of choice). Such a spectral profile can be as multidimensional as may suit the needs of a given application setting.

At optional block 1107 this process 1100 then provides for determining whether there is a statistically significant correlation between the aforementioned spectral profile and any of a plurality of like characterizations 1108. The like characterizations 1108 can comprise, for example, spectral profiles that represent an average of groupings of people who share many of the same (or all of the same) identified partialities. As a very simple illustrative example in these regards, a first such characterization 1202 might represent a composite view of a first group of people who have three similar partialities but a dissimilar fourth partiality while another of the characterizations 1203 might represent a composite view of a different group of people who share all four partialities.

The aforementioned "statistically significant" standard can be selected and/or adjusted to suit the needs of a given application setting. The scale or units by which this measurement can be assessed can be any known, relevant scale/unit including, but not limited to, scales such as standard deviations, cumulative percentages, percentile equivalents, Z-scores, T-scores, standard nines, and percentages in standard nines. Similarly, the threshold by which the level of statistical significance is measured/assessed can be set and selected as desired. By one approach the threshold is static such that the same threshold is employed regardless of the circumstances. By another approach the threshold is dynamic and can vary with such things as the relative size of the population of people upon which each of the characterizations 508 are based and/or the amount of data and/or the duration of time over which data is available for the monitored person.

Figure 13:
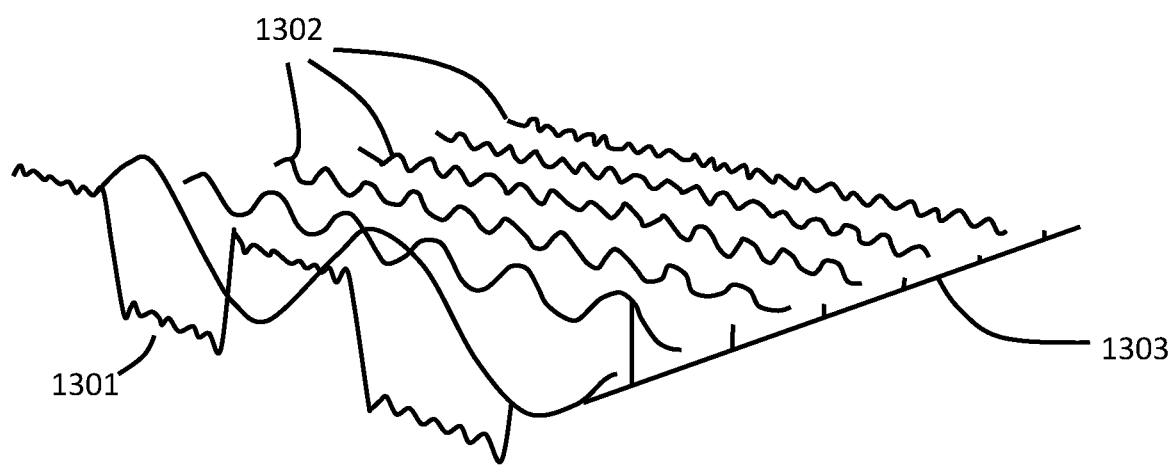
FIG. 13 comprises a graphic representation as configured in accordance with various embodiments of these teachings.

Referring now to FIG. 13, by one approach the selected characterization (denoted by reference numeral 1301 in this figure) comprises an activity profile over time of one or more human behaviors. Examples of behaviors include but are not limited to such things as repeated purchases over time of particular commodities, repeated visits over time to particular locales such as certain restaurants, retail outlets, athletic or entertainment facilities, and so forth, and repeated activities over time such as floor cleaning, dish washing, car cleaning, cooking, volunteering, and so forth. Those skilled in the art will understand and appreciate, however, that the selected characterization is not, in and of itself, demographic data (as described elsewhere herein).

More particularly, the characterization 1301 can represent (in this example, for a plurality of different behaviors) each instance over the monitored/sampled period of time when the monitored/represented person engages in a particular represented behavior (such as visiting a neighborhood gym, purchasing a particular product (such as a consumable perishable or a cleaning product), interacts with a particular affinity group via social networking, and so forth). The relevant overall time frame can be chosen as desired and can range in a typical application setting from a few hours or one day to many days, weeks, or even months or years. (It will be understood by those skilled in the art that the particular characterization shown in FIG. 13 is intended to serve an illustrative purpose and does not necessarily represent or mimic any particular behavior or set of behaviors).

Generally speaking it is anticipated that many behaviors of interest will occur at regular or somewhat regular intervals and hence will have a corresponding frequency or periodicity of occurrence. For some behaviors that frequency of occurrence may be relatively often (for example, oral hygiene events that occur at least once, and often multiple times each day) while other behaviors (such as the preparation of a holiday meal) may occur much less frequently (such as only once, or only a few times, each year). For at least some behaviors of interest that general (or specific) frequency of occurrence can serve as a significant indication of a person's corresponding partialities.

By one approach, these teachings will accommodate detecting and timestamping each and every event/activity/behavior or interest as it happens. Such an approach can be memory intensive and require considerable supporting infrastructure.

The present teachings will also accommodate, however, using any of a variety of sampling periods in these regards. In some cases, for example, the sampling period per se may be one week in duration. In that case, it may be sufficient to know that the monitored person engaged in a particular activity (such as cleaning their car) a certain number of times during that week without known precisely when, during that week, the activity occurred. In other cases it may be appropriate or even desirable, to provide greater granularity in these regards. For example, it may be better to know which days the person engaged in the particular activity or even the particular hour of the day. Depending upon the selected granularity/resolution, selecting an appropriate sampling window can help reduce data storage requirements (and/or corresponding analysis/processing overhead requirements).

Although a given person's behaviors may not, strictly speaking, be continuous waves (as shown in FIG. 13) in the same sense as, for example, a radio or acoustic wave, it will nevertheless be understood that such a behavioral characterization 1301 can itself be broken down into a plurality of sub-waves 1302 that, when summed together, equal or at least approximate to some satisfactory degree the behavioral characterization 1301 itself. (The more-discrete and sometimes less-rigidly periodic nature of the monitored behaviors may introduce a certain amount of error into the corresponding sub-waves. There are various mathematically satisfactory ways by which such error can be accommodated including by use of weighting factors and/or expressed tolerances that correspond to the resultant sub-waves.)

It should also be understood that each such sub-wave can often itself be associated with one or more corresponding discrete partialities. For example, a partiality reflecting concern for the environment may, in turn, influence many of the included behavioral events (whether they are similar or dissimilar behaviors or not) and accordingly may, as a sub-wave, comprise a relatively significant contributing factor to the overall set of behaviors as monitored over time. These sub-waves (partialities) can in turn be clearly revealed and presented by employing a transform (such as a Fourier transform) of choice to yield a spectral profile 1303 wherein the X axis represents frequency and the Y axis represents the magnitude of the response of the monitored person at each frequency/sub-wave of interest.

Figure 14:
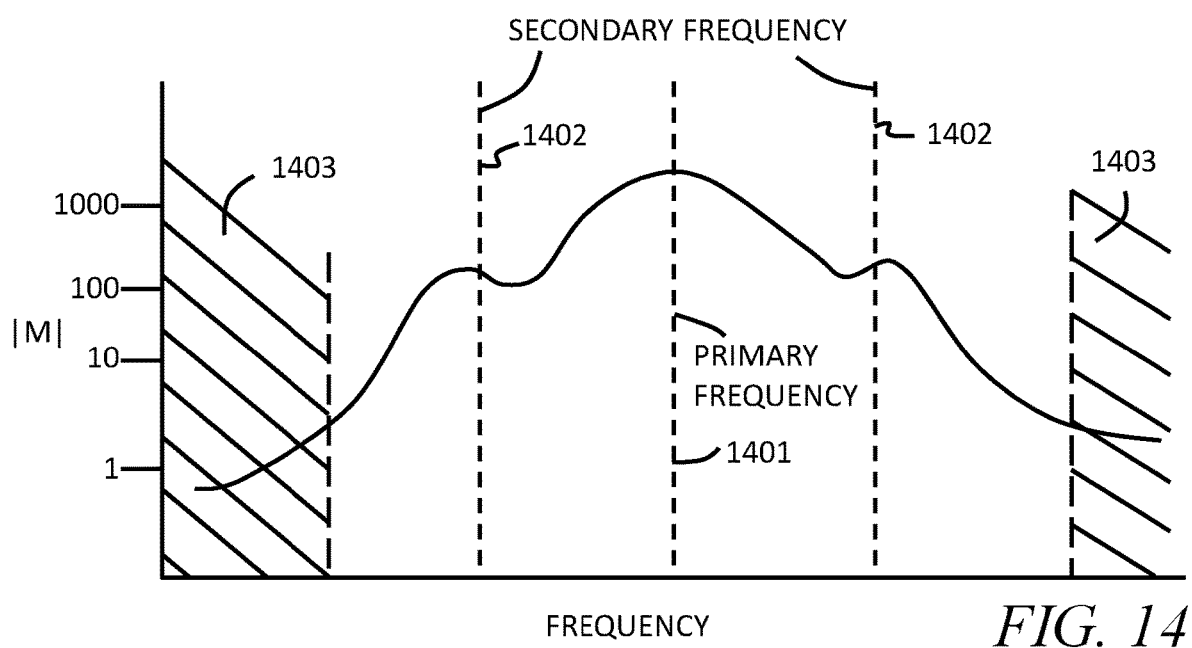
FIG. 14 comprises a graphic representation as configured in accordance with various embodiments of these teachings.

This spectral response of a given individual—which is generated from a time series of events that reflect/track that person's behavior—yields frequency response characteristics for that person that are analogous to the frequency response characteristics of physical systems such as, for example, an analog or digital filter or a second order electrical or mechanical system. Referring to FIG. 14, for many people the spectral profile of the individual person will exhibit a primary frequency 1401 for which the greatest response (perhaps many orders of magnitude greater than other evident frequencies) to life is exhibited and apparent. In addition, the spectral profile may also possibly identify one or more secondary frequencies 1402 above and/or below that primary frequency 1401. (It may be useful in many application settings to filter out more distant frequencies 1403 having considerably lower magnitudes because of a reduced likelihood of relevance and/or because of a possibility of error in those regards; in effect, these lower-magnitude signals constitute noise that such filtering can remove from consideration.)

As noted above, the present teachings will accommodate using sampling windows of varying size. By one approach the frequency of events that correspond to a particular partiality can serve as a basis for selecting a particular sampling rate to use when monitoring for such events. For example, Nyquist-based sampling rules (which dictate sampling at a rate at least twice that of the frequency of the signal of interest) can lead one to choose a particular sampling rate (and the resultant corresponding sampling window size).

As a simple illustration, if the activity of interest occurs only once a week, then using a sampling of half-a-week and sampling twice during the course of a given week will adequately capture the monitored event. If the monitored person's behavior should change, a corresponding change can be automatically made. For example, if the person in the foregoing example begins to engage in the specified activity three times a week, the sampling rate can be switched to six times per week (in conjunction with a sampling window that is resized accordingly).

By one approach, the sampling rate can be selected and used on a partiality-by-partiality basis. This approach can be especially useful when different monitoring modalities are employed to monitor events that correspond to different partialities. If desired, however, a single sampling rate can be employed and used for a plurality (or even all) partialities/behaviors. In that case, it can be useful to identify the behavior that is exemplified most often (i.e., that behavior which has the highest frequency) and then select a sampling rate that is at least twice that rate of behavioral realization, as that sampling rate will serve well and suffice for both that highest-frequency behavior and all lower-frequency behaviors as well.

It can be useful in many application settings to assume that the foregoing spectral profile of a given person is an inherent and inertial characteristic of that person and that this spectral profile, in essence, provides a personality profile of that person that reflects not only how but why this person responds to a variety of life experiences. More importantly, the partialities expressed by the spectral profile for a given person will tend to persist going forward and will not typically change significantly in the absence of some powerful external influence (including but not limited to significant life events such as, for example, marriage, children, loss of job, promotion, and so forth).

In any event, by knowing a priori the particular partialities (and corresponding strengths) that underlie the particular characterization 1301, those partialities can be used as an initial template for a person whose own behaviors permit the selection of that particular characterization 1301. In particular, those particularities can be used, at least initially, for a person for whom an amount of data is not otherwise available to construct a similarly rich set of partiality information.

As a very specific and non-limiting example, per these teachings the choice to make a particular product can include consideration of one or more value systems of potential customers. When considering persons who value animal rights, a product conceived to cater to that value proposition may require a corresponding exertion of additional effort to order material space-time such that the product is made in a way that (A) does not harm animals and/or (even better) (B) improves life for animals (for example, eggs obtained from free range chickens). The reason a person exerts effort to order material space-time is because they believe it is good to do and/or not good to not do so. When a person exerts effort to do good (per their personal standard of "good") and if that person believes that a particular order in material space-time (that includes the purchase of a particular product) is good to achieve, then that person will also believe that it is good to buy as much of that particular product (in order to achieve that good order) as their finances and needs reasonably permit (all other things being equal).

The aforementioned additional effort to provide such a product can (typically) convert to a premium that adds to the price of that product. A customer who puts out extra effort in their life to value animal rights will typically be willing to pay that extra premium to cover that additional effort exerted by the company. By one approach a magnitude that corresponds to the additional effort exerted by the company can be added to the person's corresponding value vector because a product or service has worth to the extent that the product/service allows a person to order material space-time in accordance with their own personal value system while allowing that person to exert less of their own effort in direct support of that value (since money is a scalar form of effort).

By one approach there can be hundreds or even thousands of identified partialities. In this case, if desired, each product/service of interest can be assessed with respect to each and every one of these partialities and a corresponding partiality vector formed to thereby build a collection of partiality vectors that collectively characterize the product/service. As a very simple example in these regards, a given laundry detergent might have a cleanliness partiality vector with a relatively high magnitude (representing the effectiveness of the detergent), a ecology partiality vector that might be relatively low or possibly even having a negative magnitude (representing an ecologically disadvantageous effect of the detergent post usage due to increased disorder in the environment), and a simple-life partiality vector with only a modest magnitude (representing the relative ease of use of the detergent but also that the detergent presupposes that the user has a modern washing machine). Other partiality vectors for this detergent, representing such things as nutrition or mental acuity, might have magnitudes of zero.

As mentioned above, these teachings can accommodate partiality vectors having a negative magnitude. Consider, for example, a partiality vector representing a desire to order things to reduce one's so-called carbon footprint. A magnitude of zero for this vector would indicate a completely neutral effect with respect to carbon emissions while any positive-valued magnitudes would represent a net reduction in the amount of carbon in the atmosphere, hence increasing the ability of the environment to be ordered. Negative magnitudes would represent the introduction of carbon emissions that increases disorder of the environment (for example, as a result of manufacturing the product, transporting the product, and/or using the product)

Figure 15:
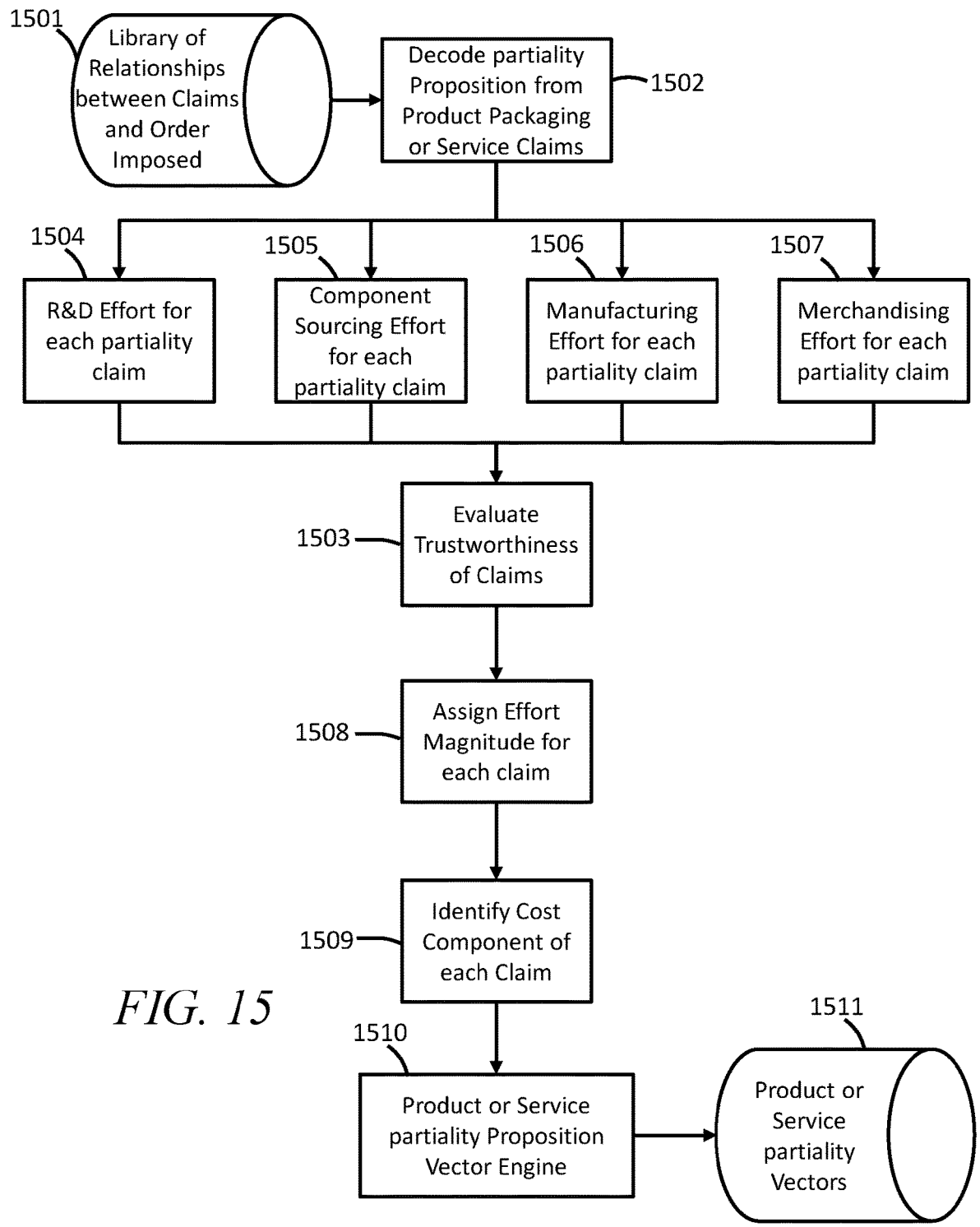
FIG. 15 comprises a flow diagram as configured in accordance with various embodiments of these teachings.

FIG. 15 presents one non-limiting illustrative example in these regards. The illustrated process presumes the availability of a library 1501 of correlated relationships between product/service claims and particular imposed orders. Examples of product/service claims include such things as claims that a particular product results in cleaner laundry or household surfaces, or that a particular product is made in a particular political region (such as a particular state or country), or that a particular product is better for the environment, and so forth. The imposed orders to which such claims are correlated can reflect orders as described above that pertain to corresponding partialities.

At block 1502 this process provides for decoding one or more partiality propositions from specific product packaging (or service claims). For example, the particular textual/graphics-based claims presented on the packaging of a given product can be used to access the aforementioned library 1501 to identify one or more corresponding imposed orders from which one or more corresponding partialities can then be identified.

At block 1503 this process provides for evaluating the trustworthiness of the aforementioned claims. This evaluation can be based upon any one or more of a variety of data points as desired. FIG. 15 illustrates four significant possibilities in these regards. For example, at block 1504 an actual or estimated research and development effort can be quantified for each claim pertaining to a partiality. At block 1505 an actual or estimated component sourcing effort for the product in question can be quantified for each claim pertaining to a partiality. At block 1506 an actual or estimated manufacturing effort for the product in question can be quantified for each claim pertaining to a partiality. And at block 1507 an actual or estimated merchandising effort for the product in question can be quantified for each claim pertaining to a partiality.

If desired, a product claim lacking sufficient trustworthiness may simply be excluded from further consideration. By another approach the product claim can remain in play but a lack of trustworthiness can be reflected, for example, in a corresponding partiality vector direction or magnitude for this particular product.

At block 1508 this process provides for assigning an effort magnitude for each evaluated product/service claim. That effort can constitute a one-dimensional effort (reflecting, for example, only the manufacturing effort) or can constitute a multidimensional effort that reflects, for example, various categories of effort such as the aforementioned research and development effort, component sourcing effort, manufacturing effort, and so forth.

At block 1509 this process provides for identifying a cost component of each claim, this cost component representing a monetary value. At block 1510 this process can use the foregoing information with a product/service partiality propositions vector engine to generate a library 1511 of one or more corresponding partiality vectors for the processed products/services. Such a library can then be used as described herein in conjunction with partiality vector information for various persons to identify, for example, products/services that are well aligned with the partialities of specific individuals.

Figure 16:
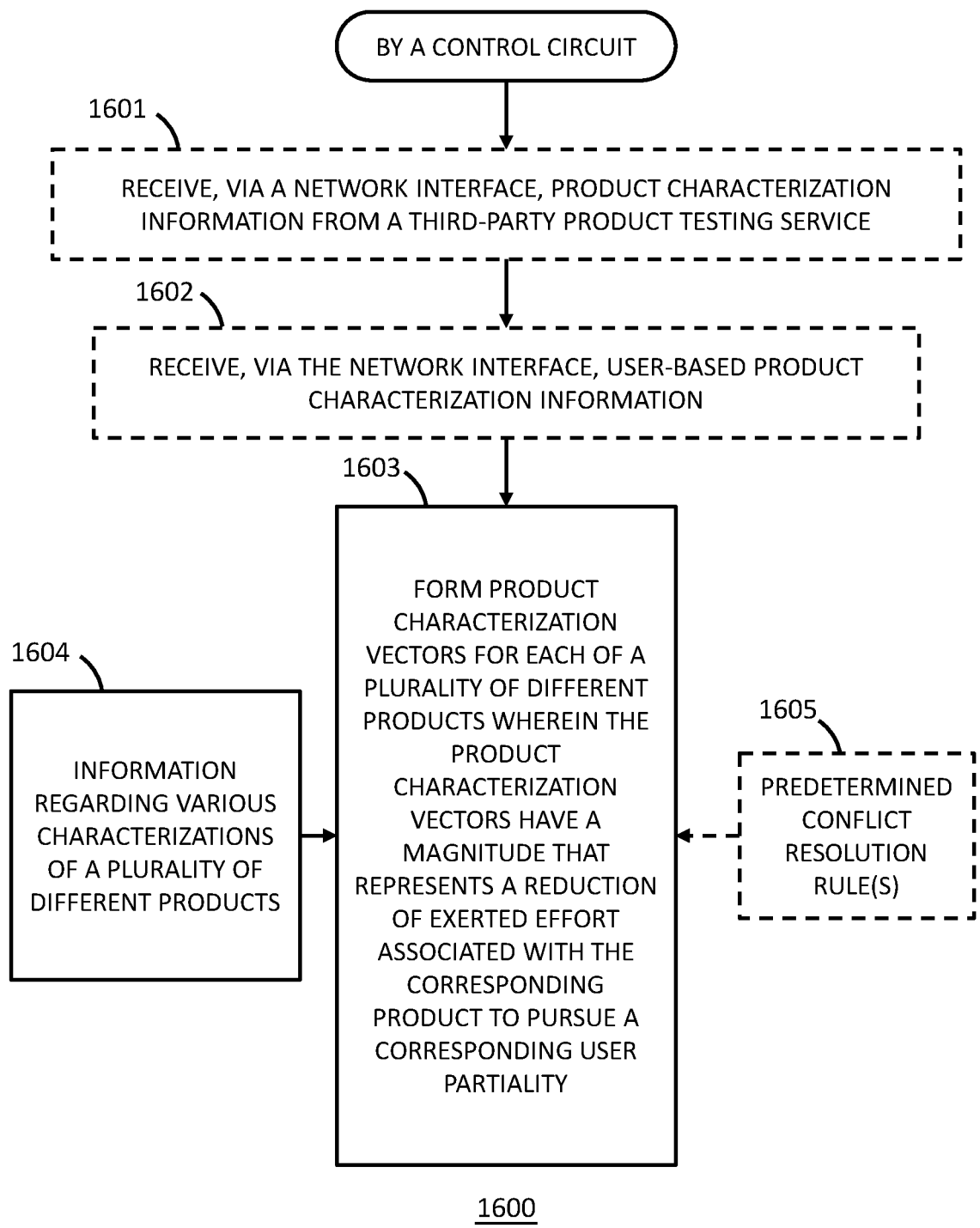
FIG. 16 comprises a flow diagram as configured in accordance with various embodiments of these teachings.

FIG. 16 provides another illustrative example in these same regards and may be employed in lieu of the foregoing or in total or partial combination therewith. Generally speaking, this process 1600 serves to facilitate the formation of product characterization vectors for each of a plurality of different products where the magnitude of the vector length (and/or the vector angle) has a magnitude that represents a reduction of exerted effort associated with the corresponding product to pursue a corresponding user partiality.

By one approach, and as illustrated in FIG. 16, this process 1600 can be carried out by a control circuit of choice. Specific examples of control circuits are provided elsewhere herein.

As described further herein in detail, this process 1600 makes use of information regarding various characterizations of a plurality of different products. These teachings are highly flexible in practice and will accommodate a wide variety of possible information sources and types of information. By one optional approach, and as shown at optional block 1601, the control circuit can receive (for example, via a corresponding network interface of choice) product characterization information from a third-party product testing service. The magazine/web resource Consumers Report provides one useful example in these regards. Such a resource provides objective content based upon testing, evaluation, and comparisons (and sometimes also provides subjective content regarding such things as aesthetics, ease of use, and so forth) and this content, provided as-is or pre-processed as desired, can readily serve as useful third-party product testing service product characterization information.

As another example, any of a variety of product-testing blogs that are published on the Internet can be similarly accessed and the product characterization information available at such resources harvested and received by the control circuit. (The expression "third party" will be understood to refer to an entity other than the entity that operates/controls the control circuit and other than the entity that provides the corresponding product itself.)

As another example, and as illustrated at optional block 1602, the control circuit can receive (again, for example, via a network interface of choice) user-based product characterization information. Examples in these regards include but are not limited to user reviews provided on-line at various retail sites for products offered for sale at such sites. The reviews can comprise metricized content (for example, a rating expressed as a certain number of stars out of a total available number of stars, such as 3 stars out of 5 possible stars) and/or text where the reviewers can enter their objective and subjective information regarding their observations and experiences with the reviewed products. In this case, "user-based" will be understood to refer to users who are not necessarily professional reviewers (though it is possible that content from such persons may be included with the information provided at such a resource) but who presumably purchased the product being reviewed and who have personal experience with that product that forms the basis of their review. By one approach the resource that offers such content may constitute a third party as defined above, but these teachings will also accommodate obtaining such content from a resource operated or sponsored by the enterprise that controls/operates this control circuit.

In any event, this process 1600 provides for accessing (see block 1604) information regarding various characterizations of each of a plurality of different products. This information 1604 can be gleaned as described above and/or can be obtained and/or developed using other resources as desired. As one illustrative example in these regards, the manufacturer and/or distributor of certain products may source useful content in these regards.

These teachings will accommodate a wide variety of information sources and types including both objective characterizing and/or subjective characterizing information for the aforementioned products.

Examples of objective characterizing information include, but are not limited to, ingredients information (i.e., specific components/materials from which the product is made), manufacturing locale information (such as country of origin, state of origin, municipality of origin, region of origin, and so forth), efficacy information (such as metrics regarding the relative effectiveness of the product to achieve a particular end-use result), cost information (such as per product, per ounce, per application or use, and so forth), availability information (such as present in-store availability, on-hand inventory availability at a relevant distribution center, likely or estimated shipping date, and so forth), environmental impact information (regarding, for example, the materials from which the product is made, one or more manufacturing processes by which the product is made, environmental impact associated with use of the product, and so forth), and so forth.

Examples of subjective characterizing information include but are not limited to user sensory perception information (regarding, for example, heaviness or lightness, speed of use, effort associated with use, smell, and so forth), aesthetics information (regarding, for example, how attractive or unattractive the product is in appearance, how well the product matches or accords with a particular design paradigm or theme, and so forth), trustworthiness information (regarding, for example, user perceptions regarding how likely the product is perceived to accomplish a particular purpose or to avoid causing a particular collateral harm), trendiness information, and so forth.

This information 1604 can be curated (or not), filtered, sorted, weighted (in accordance with a relative degree of trust, for example, accorded to a particular source of particular information), and otherwise categorized and utilized as desired. As one simple example in these regards, for some products it may be desirable to only use relatively fresh information (i.e., information not older than some specific cut-off date) while for other products it may be acceptable (or even desirable) to use, in lieu of fresh information or in combination therewith, relatively older information. As another simple example, it may be useful to use only information from one particular geographic region to characterize a particular product and to therefore not use information from other geographic regions.

At block 1603 the control circuit uses the foregoing information 1604 to form product characterization vectors for each of the plurality of different products. By one approach these product characterization vectors have a magnitude (for the length of the vector and/or the angle of the vector) that represents a reduction of exerted effort associated with the corresponding product to pursue a corresponding user partiality (as is otherwise discussed herein).

It is possible that a conflict will become evident as between various ones of the aforementioned items of information 1604. In particular, the available characterizations for a given product may not all be the same or otherwise in accord with one another. In some cases it may be appropriate to literally or effectively calculate and use an average to accommodate such a conflict. In other cases it may be useful to use one or more other predetermined conflict resolution rules 1605 to automatically resolve such conflicts when forming the aforementioned product characterization vectors.

These teachings will accommodate any of a variety of rules in these regards. By one approach, for example, the rule can be based upon the age of the information (where, for example the older (or newer, if desired) data is preferred or weighted more heavily than the newer (or older, if desired) data. By another approach, the rule can be based upon a number of user reviews upon which the user-based product characterization information is based (where, for example, the rule specifies that whichever user-based product characterization information is based upon a larger number of user reviews will prevail in the event of a conflict). By another approach, the rule can be based upon information regarding historical accuracy of information from a particular information source (where, for example, the rule specifies that information from a source with a better historical record of accuracy shall prevail over information from a source with a poorer historical record of accuracy in the event of a conflict).

By yet another approach, the rule can be based upon social media. For example, social media-posted reviews may be used as a tie-breaker in the event of a conflict between other more-favored sources. By another approach, the rule can be based upon a trending analysis. And by yet another approach the rule can be based upon the relative strength of brand awareness for the product at issue (where, for example, the rule specifies resolving a conflict in favor of a more favorable characterization when dealing with a product from a strong brand that evidences considerable consumer goodwill and trust).

It will be understood that the foregoing examples are intended to serve an illustrative purpose and are not offered as an exhaustive listing in these regards. It will also be understood that any two or more of the foregoing rules can be used in combination with one another to resolve the aforementioned conflicts.

By one approach the aforementioned product characterization vectors are formed to serve as a universal characterization of a given product. By another approach, however, the aforementioned information 1604 can be used to form product characterization vectors for a same characterization factor for a same product to thereby correspond to different usage circumstances of that same product. Those different usage circumstances might comprise, for example, different geographic regions of usage, different levels of user expertise (where, for example, a skilled, professional user might have different needs and expectations for the product than a casual, lay user), different levels of expected use, and so forth. In particular, the different vectorized results for a same characterization factor for a same product may have differing magnitudes from one another to correspond to different amounts of reduction of the exerted effort associated with that product under the different usage circumstances.

Figure 17:
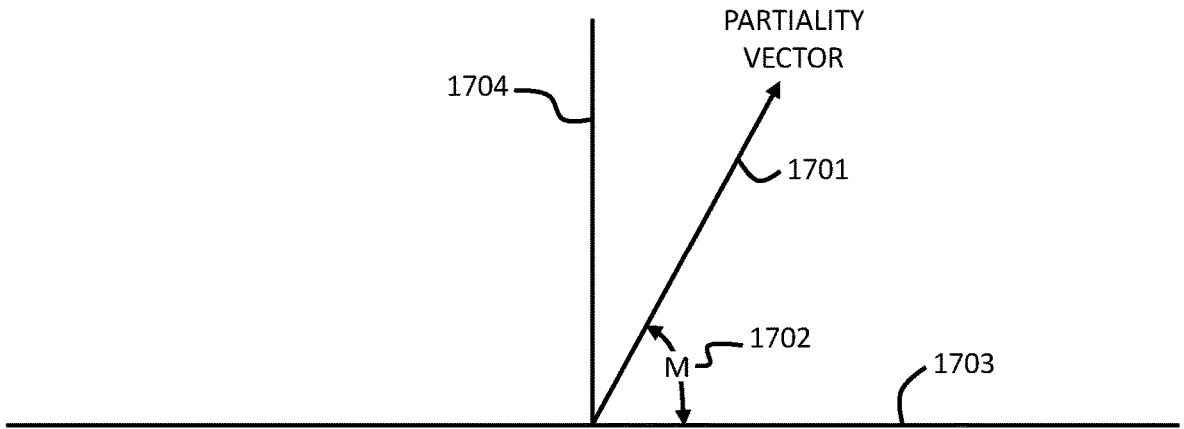
FIG. 17 comprises a graphic representation as configured in accordance with various embodiments of these teachings.

As noted above, the magnitude corresponding to a particular partiality vector for a particular person can be expressed by the angle of that partiality vector. FIG. 17 provides an illustrative example in these regards. In this example the partiality vector 1701 has an angle M 1702 (and where the range of available positive magnitudes range from a minimal magnitude represented by 0° (as denoted by reference numeral 1703) to a maximum magnitude represented by 90° (as denoted by reference numeral 1704)). Accordingly, the person to whom this partiality vector 1601 pertains has a relatively strong (but not absolute) belief in an amount of good that comes from an order associated with that partiality.

Figure 18:
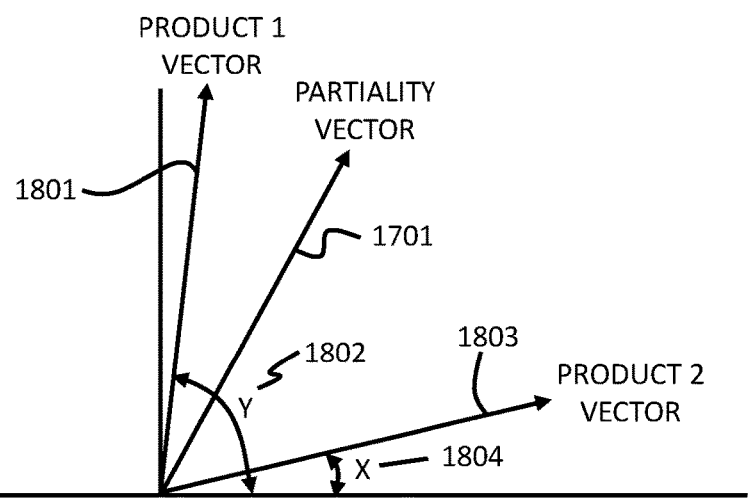
FIG. 18 comprises a graphic representation as configured in accordance with various embodiments of these teachings.

FIG. 18, in turn, presents that partiality vector 1701 in context with the product characterization vectors 1801 and 1803 for a first product and a second product, respectively. In this example the product characterization vector 1801 for the first product has an angle Y 1802 that is greater than the angle M 1702 for the aforementioned partiality vector 1701 by a relatively small amount while the product characterization vector 1803 for the second product has an angle X 1804 that is considerably smaller than the angle M 1702 for the partiality vector 1701.

Since, in this example, the angles of the various vectors represent the magnitude of the person's specified partiality or the extent to which the product aligns with that partiality, respectively, vector dot product calculations can serve to help identify which product best aligns with this partiality. Such an approach can be particularly useful when the lengths of the vectors are allowed to vary as a function of one or more parameters of interest. As those skilled in the art will understand, a vector dot product is an algebraic operation that takes two equal-length sequences of numbers (in this case, coordinate vectors) and returns a single number.

This operation can be defined either algebraically or geometrically. Algebraically, it is the sum of the products of the corresponding entries of the two sequences of numbers. Geometrically, it is the product of the Euclidean magnitudes of the two vectors and the cosine of the angle between them. The result is a scalar rather than a vector. As regards the present illustrative example, the resultant scaler value for the vector dot product of the product 1 vector 1801 with the partiality vector 1701 will be larger than the resultant scaler value for the vector dot product of the product 2 vector 1803 with the partiality vector 1701. Accordingly, when using vector angles to impart this magnitude information, the vector dot product operation provides a simple and convenient way to determine proximity between a particular partiality and the performance/properties of a particular product to thereby greatly facilitate identifying a best product amongst a plurality of candidate products.

By way of further illustration, consider an example where a particular consumer as a strong partiality for organic produce and is financially able to afford to pay to observe that partiality. A dot product result for that person with respect to a product characterization vector(s) for organic apples that represent a cost of $10 on a weekly basis (i.e., Cv·P1v) might equal (1,1), hence yielding a scalar result of $\|1\|$ (where Cv refers to the corresponding partiality vector for this person and P1v represents the corresponding product characterization vector for these organic apples). Conversely, a dot product result for this same person with respect to a product characterization vector(s) for non-organic apples that represent a cost of $5 on a weekly basis (i.e., Cv·P2v) might instead equal (1,0), hence yielding a scalar result of $\|½\|$. Accordingly, although the organic apples cost more than the non-organic apples, the dot product result for the organic apples exceeds the dot product result for the non-organic apples and therefore identifies the more expensive organic apples as being the best choice for this person.

To continue with the foregoing example, consider now what happens when this person subsequently experiences some financial misfortune (for example, they lose their job and have not yet found substitute employment). Such an event can present the "force" necessary to alter the previously-established "inertia" of this person's steady-state partialities; in particular, these negatively-changed financial circumstances (in this example) alter this person's budget sensitivities (though not, of course their partiality for organic produce as compared to non-organic produce). The scalar result of the dot product for the $5/week non-organic apples may remain the same (i.e., in this example, $\|½\|$), but the dot product for the $10/week organic apples may now drop (for example, to $\|½\|$ as well). Dropping the quantity of organic apples purchased, however, to reflect the tightened financial circumstances for this person may yield a better dot product result. For example, purchasing only $5 (per week) of organic apples may produce a dot product result of $\|1\|$. The best result for this person, then, under these circumstances, is a lesser quantity of organic apples rather than a larger quantity of non-organic apples.

In a typical application setting, it is possible that this person's loss of employment is not, in fact, known to the system. Instead, however, this person's change of behavior (i.e., reducing the quantity of the organic apples that are purchased each week) might well be tracked and processed to adjust one or more partialities (either through an addition or deletion of one or more partialities and/or by adjusting the corresponding partiality magnitude) to thereby yield this new result as a preferred result.

The foregoing simple examples clearly illustrate that vector dot product approaches can be a simple yet powerful way to quickly eliminate some product options while simultaneously quickly highlighting one or more product options as being especially suitable for a given person.

Such vector dot product calculations and results, in turn, help illustrate another point as well. As noted above, sine waves can serve as a potentially useful way to characterize and view partiality information for both people and products/services. In those regards, it is worth noting that a vector dot product result can be a positive, zero, or even negative value. That, in turn, suggests representing a particular solution as a normalization of the dot product value relative to the maximum possible value of the dot product. Approached this way, the maximum amplitude of a particular sine wave will typically represent a best solution.

Taking this approach further, by one approach the frequency (or, if desired, phase) of the sine wave solution can provide an indication of the sensitivity of the person to product choices (for example, a higher frequency can indicate a relatively highly reactive sensitivity while a lower frequency can indicate the opposite). A highly sensitive person is likely to be less receptive to solutions that are less than fully optimum and hence can help to narrow the field of candidate products while, conversely, a less sensitive person is likely to be more receptive to solutions that are less than fully optimum and can help to expand the field of candidate products.

Figure 19:
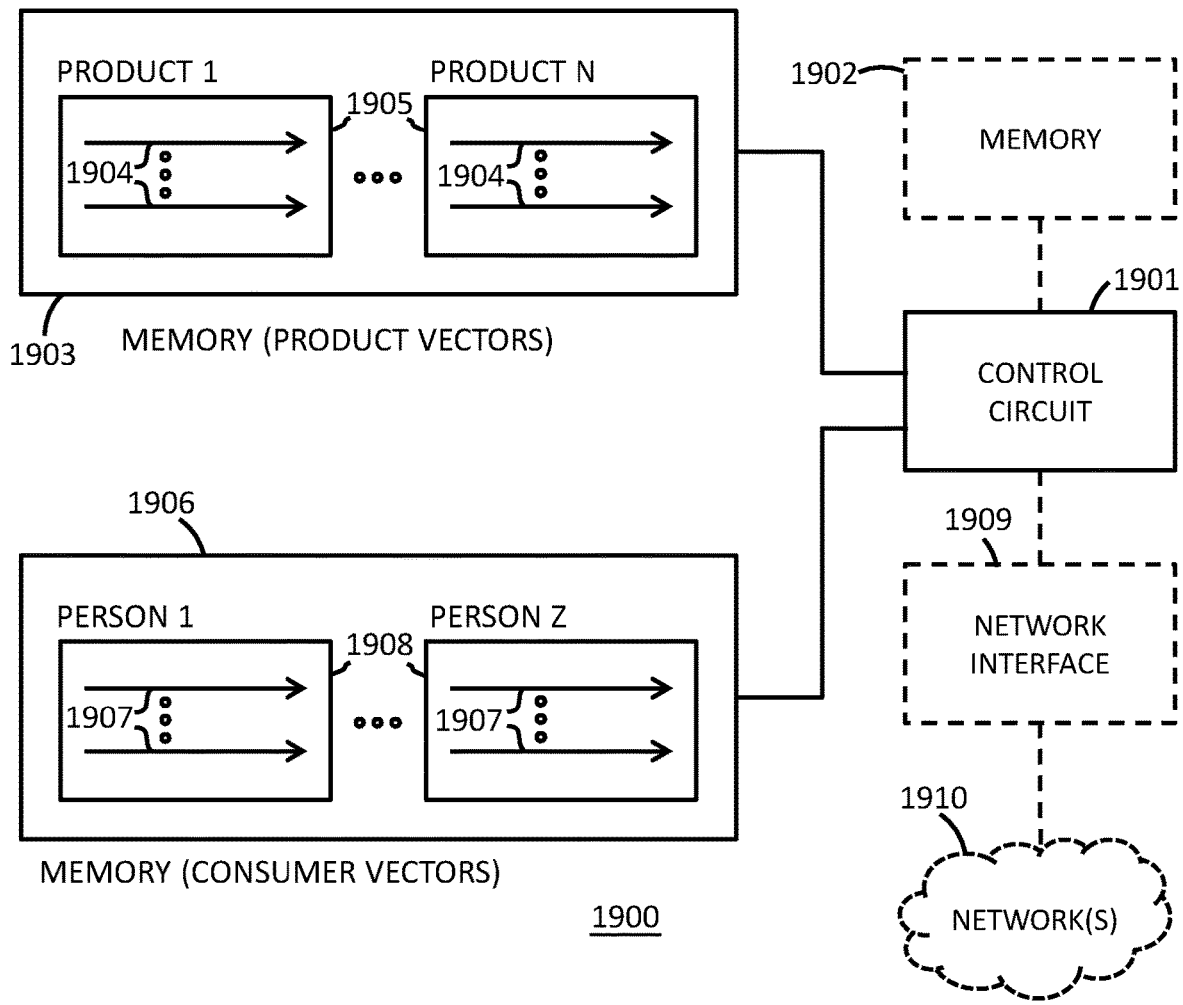
FIG. 19 comprises a block diagram as configured in accordance with various embodiments of these teachings.

FIG. 19 presents an illustrative apparatus 1900 for conducting, containing, and utilizing the foregoing content and capabilities. In this particular example, the enabling apparatus 1900 includes a control circuit 1901. Being a "circuit," the control circuit 1901 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 1901 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 1901 is configured (for example, by using corresponding programming as will be well understood by those skilled in the art) to carry out one or more of the steps, actions, and/or functions described herein.

By one optional approach the control circuit 1901 operably couples to a memory 1902. This memory 1902 may be integral to the control circuit 1901 or can be physically discrete (in whole or in part) from the control circuit 1901 as desired. This memory 1902 can also be local with respect to the control circuit 1901 (where, for example, both share a common circuit board, chassis, power supply, and/or housing) or can be partially or wholly remote with respect to the control circuit 1901 (where, for example, the memory 1902 is physically located in another facility, metropolitan area, or even country as compared to the control circuit 1901).

This memory 1902 can serve, for example, to non-transitorily store the computer instructions that, when executed by the control circuit 1901, cause the control circuit 1901 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Either stored in this memory 1902 or, as illustrated, in a separate memory 1903 are the vectorized characterizations 1904 for each of a plurality of products 1905 (represented here by a first product through an Nth product where "N" is an integer greater than "1"). In addition, and again either stored in this memory 1902 or, as illustrated, in a separate memory 1906 are the vectorized characterizations 1907 for each of a plurality of individual persons 1908 (represented here by a first person through a Zth person wherein "Z" is also an integer greater than "1").

In this example the control circuit 1901 also operably couples to a network interface 1909. So configured the control circuit 1901 can communicate with other elements (both within the apparatus 1900 and external thereto) via the network interface 1909. Network interfaces, including both wireless and non-wireless platforms, are well understood in the art and require no particular elaboration here. This network interface 1909 can compatibly communicate via whatever network or networks 1910 may be appropriate to suit the particular needs of a given application setting. Both communication networks and network interfaces are well understood areas of prior art endeavor and therefore no further elaboration will be provided here in those regards for the sake of brevity.

Figure 20:
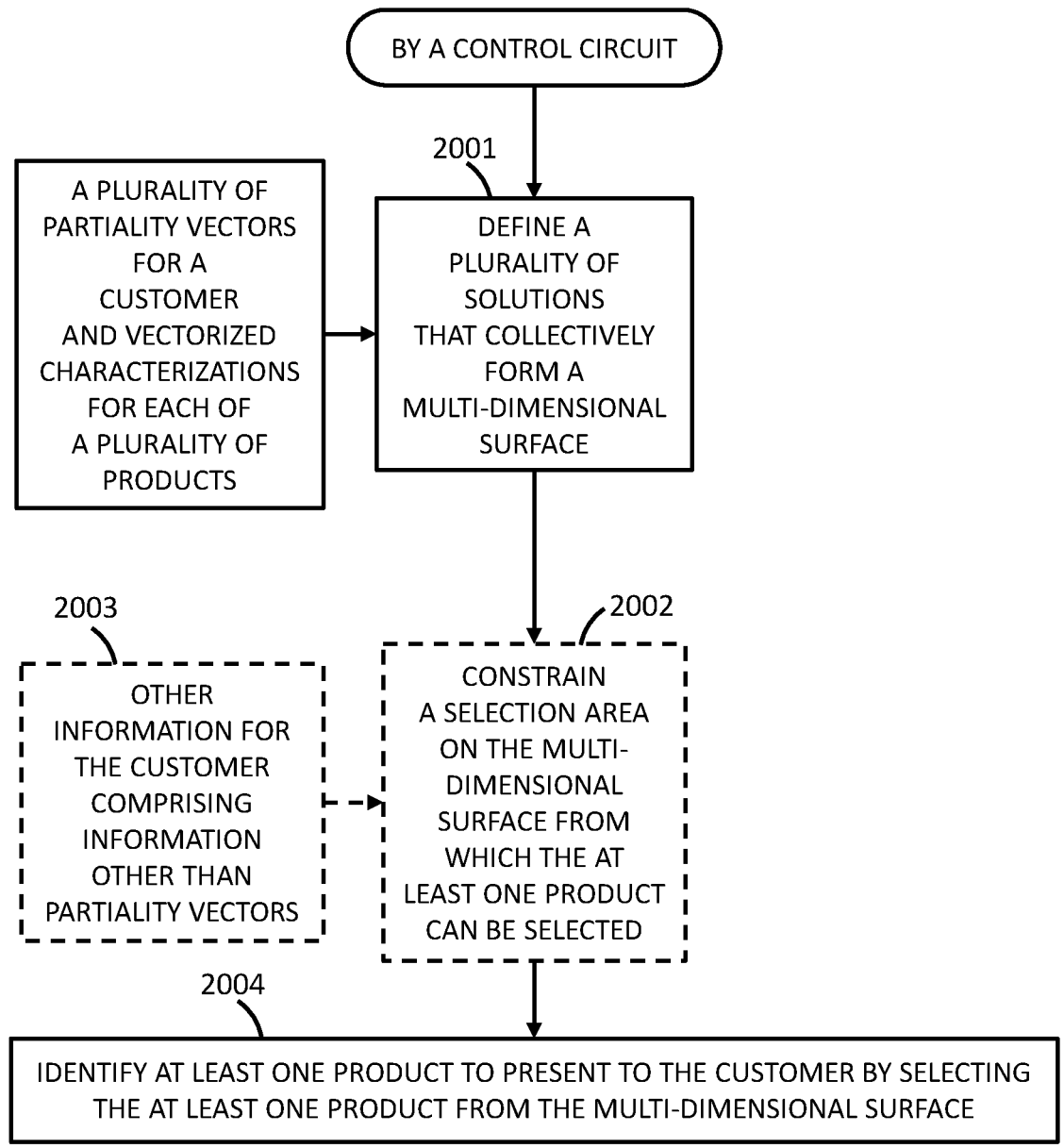
FIG. 20 comprises a flow diagram as configured in accordance with various embodiments of these teachings.
Figure 21:
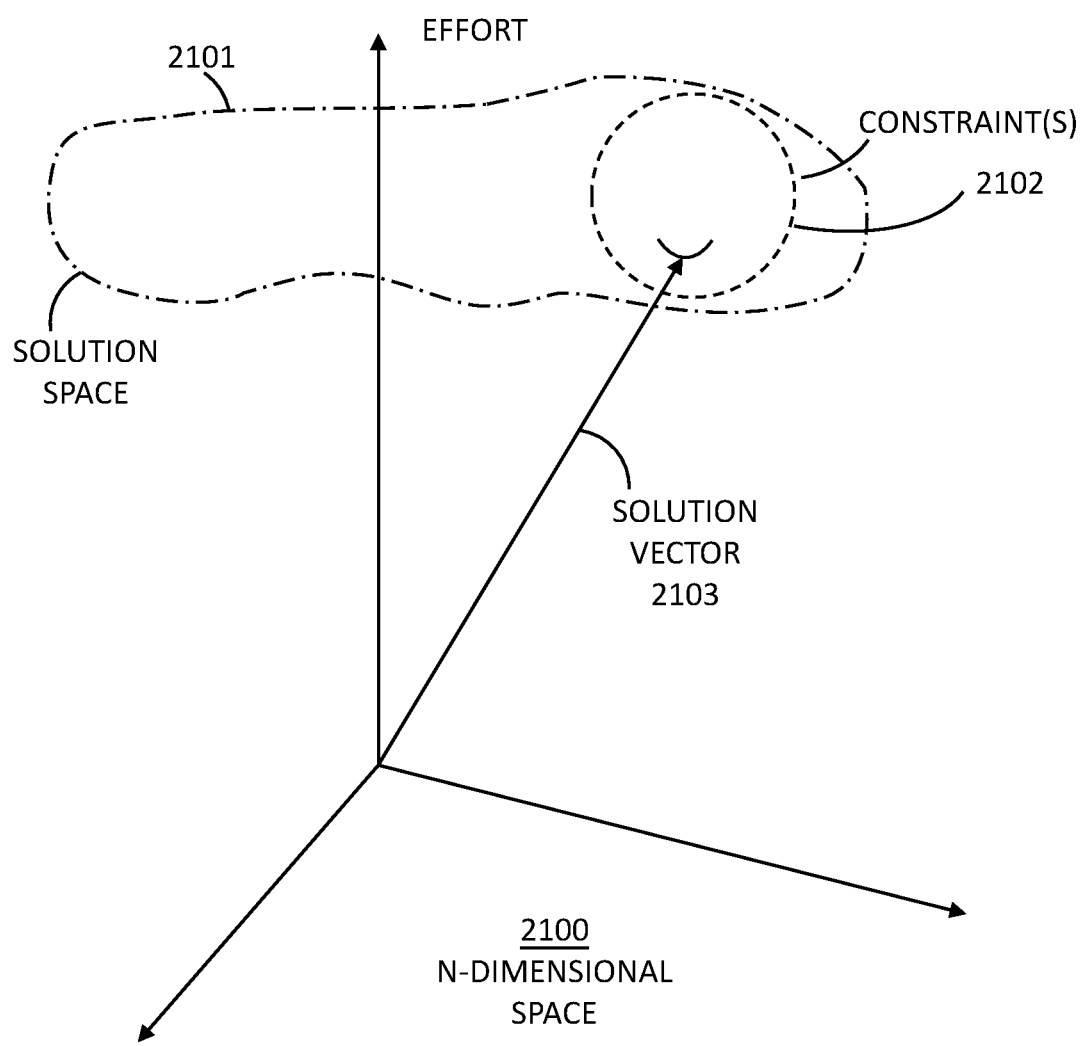
FIG. 21 comprises a graph as configured in accordance with various embodiments of these teachings.
Figure 22:
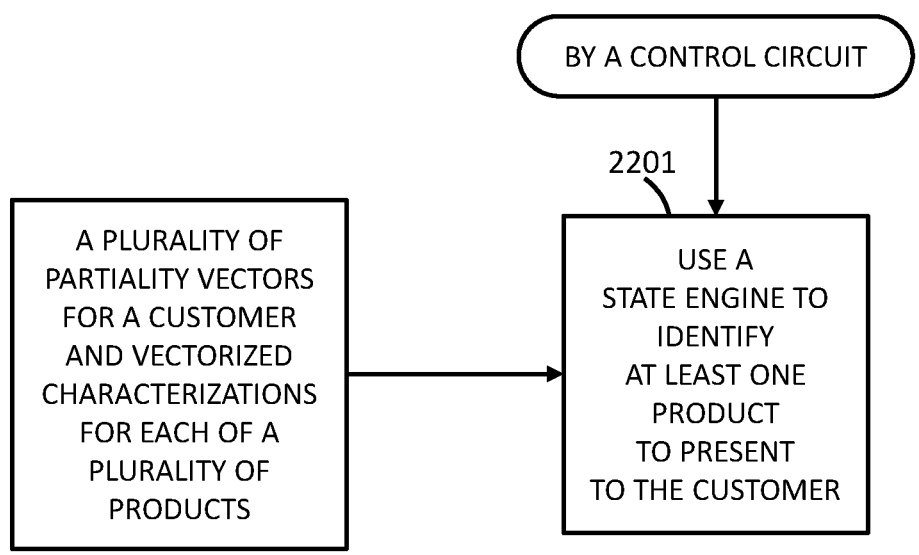
FIG. 22 comprises a flow diagram as configured in accordance with various embodiments of these teachings.

By one approach, and referring now to FIG. 20, the control circuit 1901 is configured to use the aforementioned partiality vectors 1907 and the vectorized product characterizations 1904 to define a plurality of solutions that collectively form a multidimensional surface (per block 2001). FIG. 21 provides an illustrative example in these regards. FIG. 21 represents an N-dimensional space 2100 and where the aforementioned information for a particular customer yielded a multi-dimensional surface denoted by reference numeral 2101. (The relevant value space is an N-dimensional space where the belief in the value of a particular ordering of one's life only acts on value propositions in that space as a function of a least-effort functional relationship.)

Generally speaking, this surface 2101 represents all possible solutions based upon the foregoing information. Accordingly, in a typical application setting this surface 2101 will contain/represent a plurality of discrete solutions. That said, and also in a typical application setting, not all of those solutions will be similarly preferable. Instead, one or more of those solutions may be particularly useful/appropriate at a given time, in a given place, for a given customer.

With continued reference to FIGS. 20 and 21, at optional block 2002 the control circuit 1301 can be configured to use information for the customer 2003 (other than the aforementioned partiality vectors 1907) to constrain a selection area 2102 on the multi-dimensional surface 2101 from which at least one product can be selected for this particular customer. By one approach, for example, the constraints can be selected such that the resultant selection area 2102 represents the best 95th percentile of the solution space. Other target sizes for the selection area 2102 are of course possible and may be useful in a given application setting.

The aforementioned other information 2003 can comprise any of a variety of information types. By one approach, for example, this other information comprises objective information. (As used herein, "objective information" will be understood to constitute information that is not influenced by personal feelings or opinions and hence constitutes unbiased, neutral facts.)

One particularly useful category of objective information comprises objective information regarding the customer. Examples in these regards include, but are not limited to, location information regarding a past, present, or planned/scheduled future location of the customer, budget information for the customer or regarding which the customer must strive to adhere (such that, by way of example, a particular product/solution area may align extremely well with the customer's partialities but is well beyond that which the customer can afford and hence can be reasonably excluded from the selection area 2102), age information for the customer, and gender information for the customer. Another example in these regards is information comprising objective logistical information regarding providing particular products to the customer. Examples in these regards include but are not limited to current or predicted product availability, shipping limitations (such as restrictions or other conditions that pertain to shipping a particular product to this particular customer at a particular location), and other applicable legal limitations (pertaining, for example, to the legality of a customer possessing or using a particular product at a particular location).

At block 2004 the control circuit 1901 can then identify at least one product to present to the customer by selecting that product from the multi-dimensional surface 2101. In the example of FIG. 21, where constraints have been used to define a reduced selection area 2102, the control circuit 1901 is constrained to select that product from within that selection area 2102. For example, and in accordance with the description provided herein, the control circuit 1901 can select that product via solution vector 2103 by identifying a particular product that requires a minimal expenditure of customer effort while also remaining compliant with one or more of the applied objective constraints based, for example, upon objective information regarding the customer and/or objective logistical information regarding providing particular products to the customer.

So configured, and as a simple example, the control circuit 1901 may respond per these teachings to learning that the customer is planning a party that will include seven other invited individuals. The control circuit 1901 may therefore be looking to identify one or more particular beverages to present to the customer for consideration in those regards. The aforementioned partiality vectors 1907 and vectorized product characterizations 1904 can serve to define a corresponding multi-dimensional surface 2101 that identifies various beverages that might be suitable to consider in these regards.

Objective information regarding the customer and/or the other invited persons, however, might indicate that all or most of the participants are not of legal drinking age. In that case, that objective information may be utilized to constrain the available selection area 2102 to beverages that contain no alcohol. As another example in these regards, the control circuit 1901 may have objective information that the party is to be held in a state park that prohibits alcohol and may therefore similarly constrain the available selection area 2102 to beverages that contain no alcohol.

As described above, the aforementioned control circuit 1901 can utilize information including a plurality of partiality vectors for a particular customer along with vectorized product characterizations for each of a plurality of products to identify at least one product to present to a customer. By one approach 2200, and referring to FIG. 22, the control circuit 1901 can be configured as (or to use) a state engine to identify such a product (as indicated at block 2201). As used herein, the expression "state engine" will be understood to refer to a finite-state machine, also sometimes known as a finite-state automaton or simply as a state machine.

Generally speaking, a state engine is a basic approach to designing both computer programs and sequential logic circuits. A state engine has only a finite number of states and can only be in one state at a time. A state engine can change from one state to another when initiated by a triggering event or condition often referred to as a transition. Accordingly, a particular state engine is defined by a list of its states, its initial state, and the triggering condition for each transition.

Figure 23:
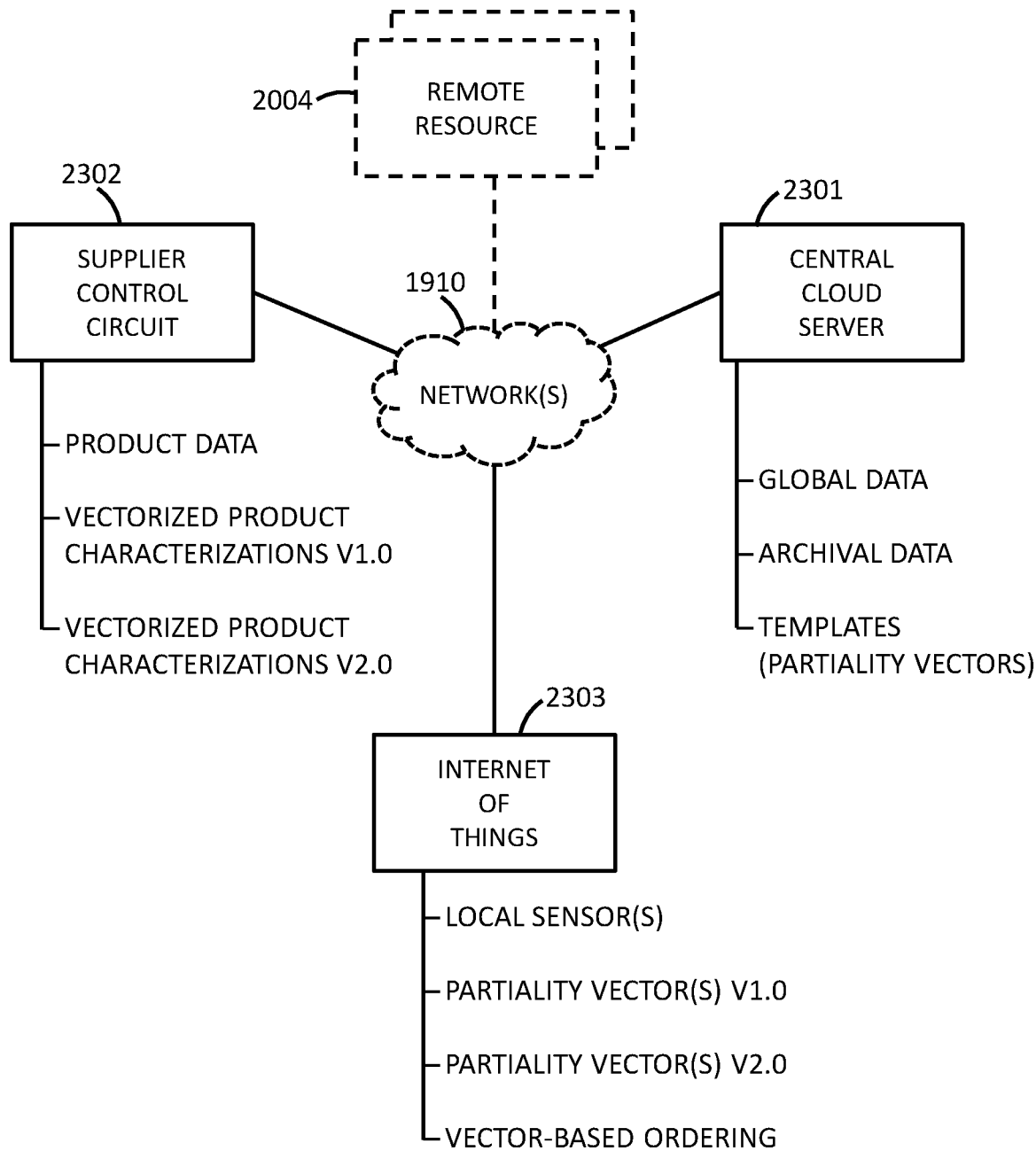
FIG. 23 comprises a block diagram as configured in accordance with various embodiments of these teachings.

It will be appreciated that the apparatus 1900 described above can be viewed as a literal physical architecture or, if desired, as a logical construct. For example, these teachings can be enabled and operated in a highly centralized manner (as might be suggested when viewing that apparatus 1900 as a physical construct) or, conversely, can be enabled and operated in a highly decentralized manner. FIG. 23 provides an example as regards the latter.

In this illustrative example a central cloud server 2301, a supplier control circuit 2302, and the aforementioned Internet of Things 2303 communicate via the aforementioned network 1910.

The central cloud server 2301 can receive, store, and/or provide various kinds of global data (including, for example, general demographic information regarding people and places, profile information for individuals, product descriptions and reviews, and so forth), various kinds of archival data (including, for example, historical information regarding the aforementioned demographic and profile information and/or product descriptions and reviews), and partiality vector templates as described herein that can serve as starting point general characterizations for particular individuals as regards their partialities. Such information may constitute a public resource and/or a privately-curated and accessed resource as desired. (It will also be understood that there may be more than one such central cloud server 2301 that store identical, overlapping, or wholly distinct content.)

The supplier control circuit 2302 can comprise a resource that is owned and/or operated on behalf of the suppliers of one or more products (including but not limited to manufacturers, wholesalers, retailers, and even resellers of previously-owned products). This resource can receive, process and/or analyze, store, and/or provide various kinds of information. Examples include but are not limited to product data such as marketing and packaging content (including textual materials, still images, and audio-video content), operators and installers manuals, recall information, professional and non-professional reviews, and so forth.

Another example comprises vectorized product characterizations as described herein. More particularly, the stored and/or available information can include both prior vectorized product characterizations (denoted in FIG. 23 by the expression "vectorized product characterizations V1.0") for a given product as well as subsequent, updated vectorized product characterizations (denoted in FIG. 23 by the expression "vectorized product characterizations V2.0") for the same product. Such modifications may have been made by the supplier control circuit 1702 itself or may have been made in conjunction with or wholly by an external resource as desired.

The Internet of Things 2303 can comprise any of a variety of devices and components that may include local sensors that can provide information regarding a corresponding user's circumstances, behaviors, and reactions back to, for example, the aforementioned central cloud server 2301 and the supplier control circuit 2302 to facilitate the development of corresponding partiality vectors for that corresponding user. Again, however, these teachings will also support a decentralized approach. In many cases devices that are fairly considered to be members of the Internet of Things 2303 constitute network edge elements (i.e., network elements deployed at the edge of a network). In some case the network edge element is configured to be personally carried by the person when operating in a deployed state. Examples include but are not limited to so-called smart phones, smart watches, fitness monitors that are worn on the body, and so forth. In other cases, the network edge element may be configured to not be personally carried by the person when operating in a deployed state. This can occur when, for example, the network edge element is too large and/or too heavy to be reasonably carried by an ordinary average person. This can also occur when, for example, the network edge element has operating requirements ill-suited to the mobile environment that typifies the average person.

For example, a so-called smart phone can itself include a suite of partiality vectors for a corresponding user (i.e., a person that is associated with the smart phone which itself serves as a network edge element) and employ those partiality vectors to facilitate vector-based ordering (either automated or to supplement the ordering being undertaken by the user) as is otherwise described herein. In that case, the smart phone can obtain corresponding vectorized product characterizations from a remote resource such as, for example, the aforementioned supplier control circuit 2302 and use that information in conjunction with local partiality vector information to facilitate the vector-based ordering.

Also, if desired, the smart phone in this example can itself modify and update partiality vectors for the corresponding user. To illustrate this idea in FIG. 23, this device can utilize, for example, information gained at least in part from local sensors to update a locally-stored partiality vector (represented in FIG. 23 by the expression "partiality vector V1.0") to obtain an updated locally-stored partiality vector (represented in FIG. 23 by the expression "partiality vector V2.0"). Using this approach, a user's partiality vectors can be locally stored and utilized. Such an approach may better comport with a particular user's privacy concerns.

It will be understood that the smart phone employed in the immediate example is intended to serve in an illustrative capacity and is not intended to suggest any particular limitations in these regards. In fact, any of a wide variety of Internet of Things devices/components could be readily configured in the same regards. As one simple example in these regards, a computationally-capable networked refrigerator could be configured to order appropriate perishable items for a corresponding user as a function of that user's partialities.

Presuming a decentralized approach, these teachings will accommodate any of a variety of other remote resources 2304. These remote resources 2304 can, in turn, provide static or dynamic information and/or interaction opportunities or analytical capabilities that can be called upon by any of the above-described network elements. Examples include but are not limited to voice recognition, pattern and image recognition, facial recognition, statistical analysis, computational resources, encryption and decryption services, fraud and misrepresentation detection and prevention services, digital currency support, and so forth.

As already suggested above, these approaches provide powerful ways for identifying products and/or services that a given person, or a given group of persons, may likely wish to buy to the exclusion of other options. When the magnitude and direction of the relevant/required meta-force vector that comes from the perceived effort to impose order is known, these teachings will facilitate, for example, engineering a product or service containing potential energy in the precise ordering direction to provide a total reduction of effort. Since people generally take the path of least effort (consistent with their partialities) they will typically accept such a solution.

As one simple illustrative example, a person who exhibits a partiality for food products that emphasize health, natural ingredients, and a concern to minimize sugars and fats may be presumed to have a similar partiality for pet foods because such partialities may be based on a value system that extends beyond themselves to other living creatures within their sphere of concern. If other data is available to indicate that this person in fact has, for example, two pet dogs, these partialities can be used to identify dog food products having well-aligned vectors in these same regards. This person could then be solicited to purchase such dog food products using any of a variety of solicitation approaches (including but not limited to general informational advertisements, discount coupons or rebate offers, sales calls, free samples, and so forth).

As another simple example, the approaches described herein can be used to filter out products/services that are not likely to accord well with a given person's partiality vectors. In particular, rather than emphasizing one particular product over another, a given person can be presented with a group of products that are available to purchase where all of the vectors for the presented products align to at least some predetermined degree of alignment/accord and where products that do not meet this criterion are simply not presented.

And as yet another simple example, a particular person may have a strong partiality towards both cleanliness and orderliness. The strength of this partiality might be measured in part, for example, by the physical effort they exert by consistently and promptly cleaning their kitchen following meal preparation activities. If this person were looking for lawn care services, their partiality vector(s) in these regards could be used to identify lawn care services who make representations and/or who have a trustworthy reputation or record for doing a good job of cleaning up the debris that results when mowing a lawn. This person, in turn, will likely appreciate the reduced effort on their part required to locate such a service that can meaningfully contribute to their desired order.

These teachings can be leveraged in any number of other useful ways. As one example in these regards, various sensors and other inputs can serve to provide automatic updates regarding the events of a given person's day. By one approach, at least some of this information can serve to help inform the development of the aforementioned partiality vectors for such a person. At the same time, such information can help to build a view of a normal day for this particular person. That baseline information can then help detect when this person's day is going experientially awry (i.e., when their desired "order" is off track). Upon detecting such circumstances these teachings will accommodate employing the partiality and product vectors for such a person to help make suggestions (for example, for particular products or services) to help correct the day's order and/or to even effect automatically-engaged actions to correct the person's experienced order.

When this person's partiality (or relevant partialities) are based upon a particular aspiration, restoring (or otherwise contributing to) order to their situation could include, for example, identifying the order that would be needed for this person to achieve that aspiration. Upon detecting, (for example, based upon purchases, social media, or other relevant inputs) that this person is aspiring to be a gourmet chef, these teachings can provide for plotting a solution that would begin providing/offering additional products/services that would help this person move along a path of increasing how they order their lives towards being a gourmet chef.

By one approach, these teachings will accommodate presenting the consumer with choices that correspond to solutions that are intended and serve to test the true conviction of the consumer as to a particular aspiration. The reaction of the consumer to such test solutions can then further inform the system as to the confidence level that this consumer holds a particular aspiration with some genuine conviction. In particular, and as one example, that confidence can in turn influence the degree and/or direction of the consumer value vector(s) in the direction of that confirmed aspiration.

All the above approaches are informed by the constraints the value space places on individuals so that they follow the path of least perceived effort to order their lives to accord with their values which results in partialities. People generally order their lives consistently unless and until their belief system is acted upon by the force of a new trusted value proposition. The present teachings are uniquely able to identify, quantify, and leverage the many aspects that collectively inform and define such belief systems.

A person's preferences can emerge from a perception that a product or service removes effort to order their lives according to their values. The present teachings acknowledge and even leverage that it is possible to have a preference for a product or service that a person has never heard of before in that, as soon as the person perceives how it will make their lives easier they will prefer it. Most predictive analytics that use preferences are trying to predict a decision the customer is likely to make. The present teachings are directed to calculating a reduced effort solution that can/will inherently and innately be something to which the person is partial.

This application is related to, and incorporates herein by reference in its entirety, each of the following U.S. applications listed as follows by application number and filing date: 62/323,026 filed Apr. 15, 2016; 62/341,993 filed May 26, 2016; 62/348,444 filed Jun. 10, 2016; 62/350,312 filed Jun. 15, 2016; 62/350,315 filed Jun. 15, 2016; 62/351,467 filed Jun. 17, 2016; 62/351,463 filed Jun. 17, 2016; 62/352,858 filed Jun. 21, 2016; 62/356,387 filed Jun. 29, 2016; 62/356,374 filed Jun. 29, 2016; 62/356,439 filed Jun. 29, 2016; 62/356,375 filed Jun. 29, 2016; 62/358,287 filed Jul. 5, 2016; 62/360,356 filed Jul. 9, 2016; 62/360,629 filed Jul. 11, 2016; 62/365,047 filed Jul. 21, 2016; 62/367,299 filed Jul. 27, 2016; 62/370,853 filed Aug. 4, 2016; 62/370,848 filed Aug. 4, 2016; 62/377,298 filed Aug. 19, 2016; 62/377,113 filed Aug. 19, 2016; 62/380,036 filed Aug. 26, 2016; 62/381,793 filed Aug. 31, 2016; 62/395,053 filed Sep. 15, 2016; 62/397,455 filed Sep. 21, 2016; 62/400,302 filed Sep. 27, 2016; 62/402,068 filed Sep. 30, 2016; 62/402,164 filed Sep. 30, 2016; 62/402,195 filed Sep. 30, 2016; 62/402,651 filed Sep. 30, 2016; 62/402,692 filed Sep. 30, 2016; 62/402,711 filed Sep. 30, 2016; 62/406,487 filed Oct. 11, 2016; 62/408,736 filed Oct. 15, 2016; 62/409,008 filed Oct. 17, 2016; 62/410,155 filed Oct. 19, 2016; 62/413,312 filed Oct. 26, 2016; 62/413,304 filed Oct. 26, 2016; 62/413,487 filed Oct. 27, 2016; 62/422,837 filed Nov. 16, 2016; 62/423,906 filed Nov. 18, 2016; 62/424,661 filed Nov. 21, 2016; 62/427,478 filed Nov. 29, 2016; 62/436,842 filed Dec. 20, 2016; 62/436,885 filed Dec. 20, 2016; 62/436,791 filed Dec. 20, 2016; 62/439,526 filed Dec. 28, 2016; 62/442,631 filed Jan. 5, 2017; 62/445,552 filed Jan. 12, 2017; 62/463,103 filed Feb. 24, 2017; 62/465,932 filed Mar. 2, 2017; 62/467,546 filed Mar. 6, 2017; 62/467,968 filed Mar. 7, 2017; 62/467,999 filed Mar. 7, 2017; 62/471,089 filed Mar. 14, 2017; 62/471,804 filed Mar. 15, 2017; 62/471,830 filed Mar. 15, 2017; 62/479,106 filed Mar. 30, 2017; 62/479,525 filed Mar. 31, 2017; 62/480,733 filed Apr. 3, 2017; 62/482,863 filed Apr. 7, 2017; 62/482,855 filed Apr. 7, 2017; 62/485,045 filed Apr. 13, 2017; Ser. No. 15/487,760 filed Apr. 14, 2017; Ser. No. 15/487,538 filed Apr. 14, 2017; Ser. No. 15/487,775 filed Apr. 14, 2017; Ser. No. 15/488,107 filed Apr. 14, 2017; Ser. No. 15/488,015 filed Apr. 14, 2017; Ser. No. 15/487,728 filed Apr. 14, 2017; Ser. No. 15/487,882 filed Apr. 14, 2017; Ser. No. 15/487,826 filed Apr. 14, 2017; Ser. No. 15/487,792 filed Apr. 14, 2017; Ser. No. 15/488,004 filed Apr. 14, 2017; Ser. No. 15/487,894 filed Apr. 14, 2017; 62/486,801 filed Apr. 18, 2017; 62/491,455 filed Apr. 28, 2018; 62/502,870 filed May 8, 2017; 62/510,322 filed May 24, 2017; 62/510,317 filed May 24, 2017; Ser. No. 15/606,602 filed May 26, 2017; 62/511,559 filed May 26, 2017; 62/513,490 filed Jun. 1, 2017; 62/515,675 filed Jun. 6, 2018; Ser. No. 15/624,030 filed Jun. 15, 2017; Ser. No. 15/625,599 filed Jun. 16, 2017; Ser. No. 15/628,282 filed Jun. 20, 2017; 62/523,148 filed Jun. 21, 2017; 62/525,304 filed Jun. 27, 2017; Ser. No. 15/634,862 filed Jun. 27, 2017; 62/527,445 filed Jun. 30, 2017; Ser. No. 15/655,339 filed Jul. 20, 2017; Ser. No. 15/669,546 filed Aug. 4, 2017; and 62/542,664 filed Aug. 8, 2017; 62/542,896 filed Aug. 9, 2017; Ser. No. 15/678,608 filed Aug. 16, 2017; 62/548,503 filed Aug. 22, 2017; 62/549,484 filed Aug. 24, 2017; Ser. No. 15/685,981 filed Aug. 24, 2017; 62/558,420 filed Sep. 14, 2017; Ser. No. 15/704,878 filed Sep. 14, 2017; 62/559,128 filed Sep. 15, 2017; Ser. No. 15/783,787 filed Oct. 13, 2017; Ser. No. 15/783,929 filed Oct. 13, 2017; Ser. No. 15/783,825 filed Oct. 13, 2017; Ser. No. 15/783,551 filed Oct. 13, 2017; Ser. No. 15/783,645 filed Oct. 13, 2017; Ser. No. 15/782,555 filed Oct. 13, 2017; 62/571,867 filed Oct. 13, 2017; Ser. No. 15/783,668 filed Oct. 13, 2017; Ser. No. 15/783,960 filed Oct. 13, 2017; Ser. No. 15/782,559 filed Oct. 13, 2017; Ser. No. 15/921,540 filed Mar. 14, 2018; Ser. No. 15/939,788 filed Mar. 29, 2018; and Ser. No. 15/947,380 filed Apr. 6, 2018.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail product delivery locker system for receiving retail products at a delivery destination comprising:
   a housing;
   a retail product delivery locker formed within the housing and comprising at least one compartment configured to store at least one retail product delivered to a delivery destination;
   a cleaning system positioned relative to the retail product delivery locker, the cleaning system configured to:
      initiate a first cleaning of at least a portion of the at least one compartment of the retail product delivery locker, wherein the first cleaning is based on a default cleaning process of a plurality of cleaning processes stored in a memory device of the retail product delivery locker, wherein the memory device comprises the default cleaning process; and
      initiate a second cleaning of at least the portion of the at least one compartment in response to receiving a start-clean signal, wherein the second cleaning is based on a first level-up cleaning process of the plurality of cleaning process;
   a first sensor secured to the retail product delivery locker and configured to provide first data in response to an opening of the retail product delivery locker;
   a second sensor secured to the retail product delivery locker and configured to provide second data when the at least one compartment is empty in response to the opening of the retail product delivery locker; and
   a control circuit operably coupled to the first and second sensors and the cleaning system, the control circuit configured to:

receive a need-clean request from a user of the retail product delivery locker at a first time;

receive the first data indicating the opening of the retail product delivery locker;

receive the second data indicating the at least one compartment is empty; and provide the start-clean signal to the cleaning system in response to the receipt of the first and second data and the need-clean request from the user.

2. The retail product delivery locker system of claim 1, wherein a difference of the first level-up cleaning process from the default cleaning process is at least one of: length of cleaning time, amount of each of cleaning products used by the cleaning system to clean the at least one compartment, number of the cleaning products available for use by the cleaning system, type of cleaning products used by the cleaning system, and a particular combination of the cleaning products used by the cleaning system.

3. The retail product delivery locker system of claim 1, wherein the cleaning system is further configured to initiate a third cleaning of at least the portion of the at least one compartment in response to receiving a second start-clean signal, wherein the third cleaning is based on a second level-up cleaning process stored in the memory device, wherein the second level-up cleaning process provides a cleaning that is enhanced over the first level-up cleaning process, and wherein the control circuit is further configured to:

receive a second need-clean request from the user at a second time;

receive third data indicating the opening of the retail product delivery locker from the first sensor;

receive fourth data indicating the at least one compartment is empty from the second sensor; and provide the second start-clean signal to the cleaning system in response to the receipt of the third and fourth data and the second need-clean request from the user.

4. The retail product delivery locker system of claim 1, wherein the memory device is further configured to store:

information including partiality information of the user in a form of a plurality of partiality vectors for the user, wherein each of the plurality of partiality vectors has at least one of a magnitude and an angle that corresponds to a magnitude of the user's belief in an amount of good that comes from an order associated with that partiality; and vectorized characterizations for each of a plurality of cleaning products, wherein alignment values between one of the plurality of partiality vectors and each of a plurality of vectorized characterizations of a cleaning product of the plurality of cleaning products indicate an extent to which the cleaning product accords with the one of the plurality of partiality vectors.

5. The retail product delivery locker system of claim 4, wherein the control circuit is further configured to:

compare a particular one of the plurality of partiality vectors of the user to each of a plurality of the vectorized characterizations to thereby determine an alignment value of a particular one of the plurality of cleaning products that reaches a threshold indicating alignment with the particular one of the plurality of partiality vectors; and determine the alignment value between the particular one of the plurality of partiality vectors and one of the plurality of the vectorized characterizations as a function of a vector dot product calculation.

6. The retail product delivery locker system of claim 5, wherein the alignment values are calculated based on the comparison of the particular one of the plurality of partiality vectors with each of the plurality of the vectorized characterizations.

7. The retail product delivery locker system of claim 4, wherein the first level-up cleaning process is based on at least one of the plurality of partiality vectors of the user.

8. The retail product delivery locker system of claim 1, wherein the control circuit is further configured to determine a time to provide the start-clean signal to the cleaning system based on a prediction of a period of time the retail product delivery locker is empty, and wherein the prediction is based on a pattern determined from a plurality of periods of time the retail product delivery locker is empty.

9. The retail product delivery locker system of claim 1, wherein the initiation of the first cleaning is in response to a receipt of an auto-clean signal by the cleaning system, and wherein the control circuit is further configured to provide the auto-clean signal to the cleaning system based on a prescheduled cleaning time.

10. The retail product delivery locker system of claim 1, wherein the control circuit is operably coupled to a delivery agent interface configured to operate on an electronic device associated with a delivery agent, and wherein the delivery agent interface is configured to provide a period of time for a delivery of a retail product to the retail product delivery locker such that the first cleaning and the second cleaning occur at times outside the period of time for the delivery.

11. The retail product delivery locker system of claim 1, wherein the control circuit is further configured to assign the first level-up cleaning process to be the default cleaning process in response to the second cleaning.

12. The retail product delivery locker system of claim 8, further comprising a memory device configured to store a third data comprising one or more time periods that the control circuit determined that the at least one compartment is empty based on the second data provided by the second sensor over the plurality of periods of time.

13. The retail product delivery locker system of claim 8, wherein the second sensor is further configured to periodically send the second data to the control circuit, and wherein the control circuit is further configured to periodically determine whether the at least one compartment is empty based on the second data and, in response, determine the pattern over the plurality of periods of time.

14. The retail product delivery locker system of claim 8, wherein the control circuit is further configured to provide a start-clean signal to the cleaning system to clean the at least one compartment at the determined time.

* * * * *